US012792640B1

(12) United States Patent
Roudebush

(10) Patent No.: US 12,792,640 B1
(45) Date of Patent: Nov. 10, 2026

(54) ARTIFICIAL INTELLIGENCE-BASED NETWORKING USING AGENTS BUILT ON LARGE LANGUAGE MODELS (LLMs)

(71) Applicant: keepwith, Inc., Mt. Prospect, IL (US)

(72) Inventor: Megan Burke Roudebush, Mount Prospect, IL (US)

(73) Assignee: keepwith, Inc., Mt. Prospect, IL (US)

( * ) Notice: Subject to any disclaimer, the term of this patent is extended or adjusted under 35 U.S.C. 154(b) by 0 days.

(21) Appl. No.: 19/544,810

(22) Filed: Feb. 19, 2026

Related U.S. Application Data

(63) Continuation-in-part of application No. 18/055,608, filed on Nov. 15, 2022.

(60) Provisional application No. 63/279,981, filed on Nov. 16, 2021.

(51) Int. Cl.
*G06F 16/332* (2025.01)
*G06F 16/334* (2025.01)

(52) U.S. Cl.
CPC ...... *G06F 16/3322* (2019.01); *G06F 16/3347* (2019.01)

(58) Field of Classification Search
CPC ............. G06F 16/3322; G06F 16/3347; G06F 16/9535; G06F 16/335; G06F 16/9536; G06F 16/3329; G06F 16/90332; G06F 16/24578; G06F 16/24575; G06F 40/30; G06F 40/40; G06N 20/00; G06N 3/08; G06Q 10/40; G06Q 10/48
USPC .......................... 707/736, 769, 770; 705/319
See application file for complete search history.

(56) References Cited

U.S. PATENT DOCUMENTS 9,326,130 B2 4/2016 Sako et al.
12,248,525 B1 * 3/2025 Dufour ............... G06F 16/9535
12,254,966 B1 * 3/2025 Gharpure ............... G16H 15/00
12,602,470 B1 * 4/2026 Morgan ................ G06F 21/552
(Continued)

FOREIGN PATENT DOCUMENTS

CN 110378726 A 10/2019
CN 118536147 A * 8/2024 ........... G06F 18/214
(Continued)

*Primary Examiner* — Dennis Truong
(74) *Attorney, Agent, or Firm* — FP; Sikander M. Khan

(57) ABSTRACT

Systems and methods for an AI-driven networking platform generate policy-controlled introductions via an LLM agent. User accounts store profile text, network strategy elements (goals, tasks, events, candidate introductions), and primary connections defining relationships and spheres of influence with connection types and strength rankings. For a target account, processors identify a first account having a primary relationship and determine candidate second accounts connected to the first but lacking a primary relationship with the target. The agent constructs an augmented model input comprising a system prompt specifying constraints and privacy rules, retrieved context, and a query derived from the target's strategy. The agent performs retrieval-augmented generation by embedding and semantically searching sources permitted by privacy rules, executes an LLM with low-rank adaptation modules, and outputs a recommendation. Using a tool-interface protocol, the agent automatically transmits notifications and orchestrates a double-opt-in introduction workflow. Outcomes and feedback update matching models, agent memory, and policies.

19 Claims, 40 Drawing Sheets

(56) References Cited

U.S. PATENT DOCUMENTS

| | | | | |
|---|---|---|---|---|
| 2006/0064739 | A1 | 3/2006 | Guthrie et al. | |
| 2007/0192299 | A1* | 8/2007 | Zuckerberg | G06F 16/9535 |
| 2010/0306249 | A1* | 12/2010 | Hill | G06Q 10/40 707/769 |
| 2015/0100576 | A1 | 4/2015 | Zent et al. | |
| 2015/0112880 | A1* | 4/2015 | Blaylock, IV | G06Q 10/40 726/4 |
| 2016/0092588 | A1 | 3/2016 | Li | |
| 2016/0283500 | A1 | 9/2016 | Han et al. | |
| 2018/0107665 | A1 | 4/2018 | Yang et al. | |
| 2021/0182976 | A1 | 6/2021 | Poslavsky | |
| 2021/0304087 | A1 | 9/2021 | Martin, Jr. et al. | |
| 2021/0400050 | A1 | 12/2021 | Rex | |
| 2022/0101159 | A1 | 3/2022 | Nigam et al. | |
| 2024/0267344 | A1* | 8/2024 | Mulligan | H04L 51/02 |
| 2024/0303711 | A1* | 9/2024 | Tan | G06Q 30/0635 |
| 2024/0356873 | A1* | 10/2024 | Brewer | H04L 51/216 |
| 2025/0053430 | A1* | 2/2025 | Jones | G06F 9/453 |
| 2025/0094506 | A1* | 3/2025 | Sachindran | G06F 16/9536 |
| 2025/0238411 | A1* | 7/2025 | Padilha | G06F 11/3409 |
| 2025/0272314 | A1* | 8/2025 | Melamed | G06F 16/313 |
| 2025/0278563 | A1* | 9/2025 | Yan | G06F 40/279 |
| 2025/0284750 | A1* | 9/2025 | Sachindran | G06F 16/9577 |
| 2025/0285025 | A1* | 9/2025 | Moghaddam | G06N 3/006 |
| 2025/0378381 | A1* | 12/2025 | Lizzo | G06N 20/00 |
| 2026/0003480 | A1* | 1/2026 | Wilson | G06F 3/0484 |
| 2026/0003881 | A1* | 1/2026 | Wilson | G06F 16/248 |

FOREIGN PATENT DOCUMENTS

| | | | | | |
|---|---|---|---|---|---|
| CN | 119939265 | A | * | 5/2025 | |
| CN | 120610988 | A | * | 9/2025 | G06N 3/096 |

* cited by examiner

Inference Logic
100

```
batch_size = tf.shape (x) [0]
x = self.rescale(x)
patches = self.extract_patches (x)
x = self.patch_proj (patches)

class_emb = tf.broadcast_to(
     self.class_emb, [batch_size, 1, self.d_model]
)
x = tf.concat([class_emb, x], axis=1)
x = x + self.pos_emb

for layer in self.enc_layers:
     x = layer (x, training)

return   self.mlp_head(x[:, 0])
```

FIG. 10

ARTIFICIAL INTELLIGENCE-BASED NETWORKING USING AGENTS BUILT ON LARGE LANGUAGE MODELS (LLMs)

FIELD OF THE TECHNOLOGY DISCLOSED

This U.S. Patent Application claims priority under 35 U.S.C. §119(e) to U.S. Provisional Application 63/279,981, filed on Nov. 16, 2021 and under 35 U.S.C. §120 to U.S. Non-Provisional application 18/055,608, filed on Nov. 15, 2022. The disclosure of this these prior applications is considered part of the disclosure of this application and is hereby incorporated by reference in its entirety.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The technology disclosed relates generally to network computing systems, and more particularly, to systems and methods for intelligent content curation and user interaction optimization utilizing machine learning models trained through human-in-the-loop active learning methodologies.

Deep learning architectures have emerged as a transformative force in network computing, enabling advanced capabilities in content recommendation, user behavior prediction, natural language processing for user-generated content, image and video recognition, and intelligent notification systems. The efficacy of these deep learning systems in network applications is directly correlated with model complexity, with state-of-the-art architectures comprising hundreds of millions of parameters that provide sufficient degrees of freedom for capturing nuanced patterns in user interactions and content engagement.

However, the deployment of such large-scale models within network platforms presents substantial challenges related to training data requirements. The parametric complexity of modem deep learning architectures necessitates correspondingly massive quantities of labeled training data to achieve acceptable performance metrics. In network contexts, this labeled data may comprise user engagement signals, content categorizations, sentiment annotations, community classifications, and behavioral pattern identifications.

Conventional approaches to addressing data scarcity in network machine learning systems have included the generation of synthetic training samples to accelerate model iteration cycles and reduce annotation costs. Pre-training methodologies utilizing transformer architectures, including but not limited to BERT (Bidirectional Encoder Representations from Transformers) and GPT (Generative Pre-trained Transformer) variants, have demonstrated considerable success in transfer learning contexts applicable to network content analysis.

Notwithstanding these advances, generated and pre-trained data remain limited in their applicability, serving primarily as initialization mechanisms for model parameters. The attainment of production-grade precision in network applications, such as content moderation, personalized feed curation, friend recommendation engines, and advertisement targeting systems, invariably requires task-specific labeled data reflecting the unique characteristics of the target user population and content ecosystem.

The prior art exhibits several critical deficiencies when applied to network computing environments. First, the rate of growth of available labeled data substantially lags behind the rate of growth of model parameters, creating a fundamental impediment to model performance optimization. In dynamic network environments where user behaviors, content trends, and interaction patterns evolve continuously, this data deficit is particularly acute.

Second, the proliferation of novel features, content modalities, and interaction paradigms within network platforms far exceeds the capacity for comprehensive data annotation. Emerging functionalities such as ephemeral content formats, augmented reality integrations, live streaming interactions, and cross-platform sharing mechanisms each require distinct training datasets that cannot be produced at the requisite pace through conventional annotation workflows.

Third, existing supervised learning paradigms exhibit a high degree of coupling between task specification and training data composition. Each discrete classification, recommendation, or prediction task within a network platform traditionally requires an independent corpus of labeled examples, resulting in substantial redundancy of annotation effort and inefficient utilization of human expertise.

Fourth, conventional approaches fail to leverage the rich a priori knowledge possessed by human domain experts in network content analysis, community dynamics, and user behavior interpretation. This knowledge, accumulated through years of platform operation and user research, represents an underutilized resource that could substantially reduce dependence on exhaustive labeled datasets.

Human-in-the-loop (HITL) machine learning methodologies have emerged as a promising approach for addressing the foregoing deficiencies. HITL frameworks integrate human cognitive capabilities and domain expertise directly into the model training pipeline, enabling the construction of accurate prediction models with minimized annotation costs. In network contexts, human annotators can provide not only discrete labels but also nuanced judgments regarding content quality, community norms, cultural context, and emergent behavioral patterns that resist algorithmic detection.

Unlike weak supervision and automated annotation approaches, HITL methodologies emphasize the strategic identification of key samples that exercise disproportionate influence on model performance. This targeted approach is particularly advantageous in network applications characterized by long-tail distributions of content types, user behaviors, and edge cases that define the boundaries of acceptable platform conduct.

Core set methodologies provide a theoretical foundation for efficient data selection in network machine learning systems. A core set constitutes a weighted subset of a larger dataset, constructed such that a model fitted to the core set maintains fidelity to the statistical properties of the complete dataset. Core set construction algorithms perform importance sampling with respect to sensitivity scores, providing high-probability approximation guarantees for clustering operations (k-means, k-median), classification tasks (naïve Bayes, nearest-neighbors), mixture model estimation, low-rank matrix approximation, spectral methods, Nyström approximations, and Bayesian inference procedures.

Active learning represents a complementary approach wherein the learning system iteratively selects maximally informative unlabeled examples for oracle annotation. By querying labels only for examples with highest estimated utility for model improvement, active learning systems can achieve target performance levels with substantially reduced annotation budgets. The central challenge in active learning lies in the accurate estimation of example utility: a quantity that must be inferred from the current model state and the structure of the unlabeled data distribution.

In view of the foregoing, there exists a need in the art for improved systems and methods for training machine learning models in network computing environments that overcome the limitations of prior approaches. Specifically, there is a need for systems that integrate human-in-the-loop active learning with core set discovery techniques to enable accelerated model training with minimal annotation requirements. There is further a need for such systems to be specifically adapted to the unique characteristics of network data, including the continuous generation of user content, the temporal dynamics of engagement patterns, the heterogeneity of content modalities, and the importance of real-time model updates for platform integrity and user experience optimization.

Accordingly, the technology disclosed addresses these and other needs by providing novel systems and methods for human-in-the-loop active learning applied to core set discovery in network machine learning applications, as will be described in detail in the following sections.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 10 shows example software code that implements a Transformer block of the networking platform.

DETAILED DESCRIPTION

Figure 1:
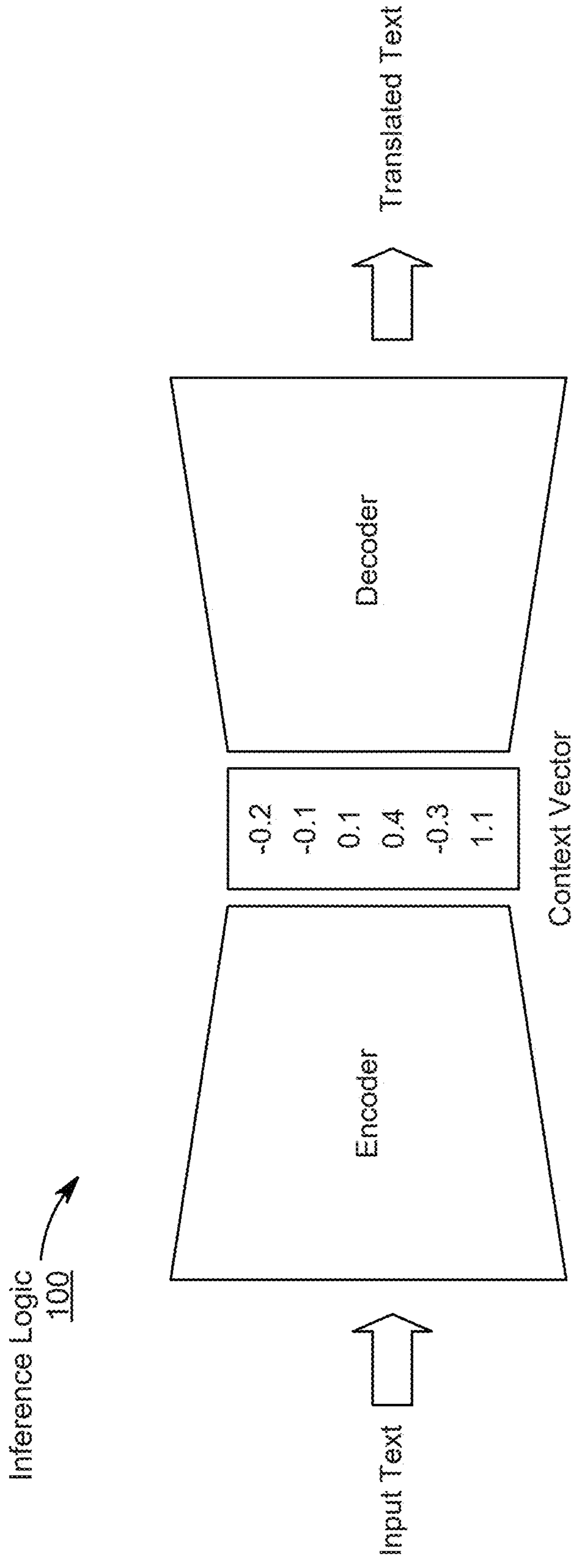
FIG. 1 is a schematic representation of an encoder-decoder architecture of the networking platform.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between Machine Learning Techniques The machine learning models, transformer architectures, attention mechanisms, and inference workflows described in this section are provided as exemplary enabling technologies that may be employed by the networking platform to perform analytics, orchestration, and decision support, and are not intended to define the invention itself.

The machine learning models, transformer architectures, attention mechanisms, and inference workflows described in this section are provided as exemplary enabling technologies that may be employed by the networking platform to perform analytics, orchestration, and decision support, and are not intended to define the invention itself. Some implementations of the technology disclosed relate to using a Transformer model to provide an AI system. In particular, the technology disclosed proposes an AI management system based on the Transformer architecture. The Transformer model relies on a self-attention mechanism to compute a series of context-informed vector-space representations of elements in the input sequence and the output sequence, which are then used to predict distributions over subsequent elements as the model predicts the output sequence element-by-element. Not only is this mechanism straightforward to parallelize, but as each input's representation is also directly informed by all other inputs' representations, this results in an effectively global receptive field across the whole input sequence. This stands in contrast to, e.g., convolutional architectures which typically only have a limited receptive field.

In one implementation, the disclosed AI system is a multilayer perceptron (MLP). In another implementation, the disclosed AI system is a feed-forward neural network. In yet another implementation, the disclosed AI system is a fully connected neural network. In a further implementation, the disclosed AI system is a fully convolution neural network. In a yet further implementation, the disclosed AI system is a semantic segmentation neural network. In a yet another further implementation, the disclosed AI system is a generative adversarial network (GAN) (e.g., CycleGAN, StyleGAN, pixelRNN, text-2-image, DiscoGAN, IsGAN). In a yet another implementation, the disclosed AI system includes self-attention mechanisms like Transformer, Vision Transformer (ViT), Bi-directional Transformer (BERT), Detection Transformer (DETR), Deformable DETR, UP-DETR, DeiT, Swin, GPT, iGPT, GPT-2, GPT-3, various ChatGPT versions, various LLaMA versions, BERT, SpanBERT, RoBERTa, XLNet, ELECTRA, UniLM, BART, T5, ERNIE (THU), KnowBERT, DeiT-Ti, DeiT-S, DeiT-B, T2T-ViT-14, T2T-ViT-19, T2T-ViT-24, PVT-Small, PVT-Medium, PVT-Large, TNT-S, TNT-B, CPVT-S, CPVT-S-GAP, CPVT-B, Swin-T, Swin-S, Swin-B, Twins-SVT-S, Twins-SVT-B, Twins-SVT-L, Shuffle-T, Shuffle-S, Shuffle-B, XCiT-S12/16, CMT-S, CMT-B, VOLO-D1, VOLO-D2, VOLO-D3, VOLO-D4, MoCo v3, ACT, TSP, Max-DeepLab, VisTR, SETR, Hand-Transformer, HOT-Net, METRO, Image Transformer, Taming transformer, TransGAN, IPT, TTSR, STTN, Masked Transformer, CLIP, DALL-E, Cogview, UniT, ASH, TinyBert, FullyQT, ConvBert, FCOS, Faster R-CNN+FPN, DETR-DC5, TSP-FCOS, TSP-RCNN, ACT+MKDD (L=32), ACT+MKDD (L=16), SMCA, Efficient DETR, UP-DETR, UP-DETR, ViTB/16-FRCNN, ViT-B/16-FRCNN, PVT-Small+RetinaNet, Swin-T+RetinaNet, Swin-T+ATSS, PVT-Small+DETR, TNT-S+DETR, YOLOS-Ti, YOLOS-S, and YOLOS-B.

In one implementation, the disclosed AI system is a convolution neural network (CNN) with a plurality of convolution layers. In another implementation, the disclosed AI system is a recurrent neural network (RNN) such as a long short-term memory network (LSTM), bi-directional LSTM (Bi-LSTM), or a gated recurrent unit (GRU). In yet another implementation, the disclosed AI system includes both a CNN and an RNN.

In yet other implementations, the disclosed AI system can use 1D convolutions, 2D convolutions, 3D convolutions, 4D convolutions, 5D convolutions, dilated or atrous convolutions, transpose convolutions, depthwise separable convolutions, pointwise convolutions, 1×1 convolutions, group convolutions, flattened convolutions, spatial and cross-channel convolutions, shuffled grouped convolutions, spatial separable convolutions, and deconvolutions. The disclosed AI system can use one or more loss functions such as logistic regression/log loss, multi-class cross-entropy/softmax loss, binary cross-entropy loss, mean-squared error loss, L1 loss, L2 loss, smooth L1 loss, and Huber loss. The disclosed AI system can use any parallelism, efficiency, and compression schemes such TFRecords, compressed encoding (e.g., PNG), sharding, parallel calls for map transformation, batching, prefetching, model parallelism, data parallelism, and synchronous/asynchronous stochastic gradient descent (SGD). The disclosed AI system can include upsampling layers, downsampling layers, recurrent connections, gates and gated memory units (like an LSTM or GRU), residual blocks, residual connections, highway connections, skip connections, peephole connections, activation functions (e.g., non-linear transformation functions like rectifying linear unit (ReLU), leaky ReLU, exponential liner unit (ELU), sigmoid and hyperbolic tangent (tanh)), batch normalization layers, regularization layers, dropout, pooling layers (e.g., max or average pooling), global average pooling layers, and attention mechanisms.

The disclosed AI system can be a linear regression model, a logistic regression model, an Elastic Net model, a support vector machine (SVM), a random forest (RF), a decision tree, and a boosted decision tree (e.g., XGBoost), or some other tree-based logic (e.g., metric trees, kd-trees, R-trees, universal B-trees, X-trees, ball trees, locality sensitive hashes, and inverted indexes). The disclosed AI system can be an ensemble of multiple models, in some implementations.

In some implementations, the disclosed AI system can be trained using backpropagation-based gradient update techniques. Example gradient descent techniques that can be used for training the disclosed AI system include stochastic gradient descent, batch gradient descent, and mini-batch gradient descent. Some examples of gradient descent optimization algorithms that can be used to train the disclosed AI system are Momentum, Nesterov accelerated gradient, Adagrad, Adadelta, RMSprop, Adam, AdaMax, Nadam, and AMSGrad.

Transformer Logic

Machine learning is the use and development of computer systems that can learn and adapt without following explicit instructions, by using algorithms and statistical models to analyze and draw inferences from patterns in data. Some of the state-of-the-art models use Transformers, a more powerful and faster model than neural networks alone. Transformers originate from the field of natural language processing (NLP), but can be used in computer vision and many other fields. Neural networks process input in series and weight relationships by distance in the series. Transformers can process input in parallel and do not necessarily weigh by distance. For example, in natural language processing, neural networks process a sentence from beginning to end with the weights of words close to each other being higher than those further apart. This leaves the end of the sentence very disconnected from the beginning causing an effect called the vanishing gradient problem. Transformers look at each word in parallel and determine weights for the relationships to each of the other words in the sentence. These relationships are called hidden states because they are later condensed for use into one vector called the context vector. Transformers can be used in addition to neural networks. This architecture is described here.

Encoder-Decoder Architecture

FIG. 1 is a schematic representation of an encoder-decoder architecture. This architecture is often used for NLP and has two main building blocks. The first building block is the encoder that encodes an input into a fixed-size vector. In the system we describe here, the encoder is based on a recurrent neural network (RNN). At each time step, t, a hidden state of time step, t−1, is combined with the input value at time step t to compute the hidden state at timestep t. The hidden state at the last time step, encoded in a context vector, contains relationships encoded at all previous time steps. For NLP, each step corresponds to a word. Then the context vector contains information about the grammar and the sentence structure. The context vector can be considered a low-dimensional representation of the entire input space. For NLP, the input space is a sentence, and a training set consists of many sentences. Inference logic 100 (as shown throughout the figures) may generally refer to one or more processors or modules configured to execute operations used by, but not defining, the networking platform as described herein. Inference logic 100 (as shown throughout the figures) may optionally implement machine learning, artificial intelligence, agents, or other such techniques.

The context vector is then passed to the second building block, the decoder. For translation, the decoder has been trained on a second language. Conditioned on the input context vector, the decoder generates an output sequence. At each time step, t, the decoder is fed the hidden state of time step, t−1, and the output generated at time step, t−1. The first hidden state in the decoder is the context vector, generated by the encoder. The context vector is used by the decoder to perform the translation.

The whole model is optimized end-to-end by using backpropagation, a method of training a neural network in which the initial system output is compared to the desired output and the system is adjusted until the difference is minimized. In backpropagation, the encoder is trained to extract the right information from the input sequence, the decoder is trained to capture the grammar and vocabulary of the output language. This results in a fluent model that uses context and generalizes well. When training an encoder-decoder model, the real output sequence is used to train the model to prevent mistakes from stacking. When testing the model, the previously predicted output value is used to predict the next one.

When performing a translation task using the encoder-decoder architecture, all information about the input sequence is forced into one vector, the context vector. Information connecting the beginning of the sentence with the end is lost, the vanishing gradient problem. Also, different parts of the input sequence are important for different parts of the output sequence, information that cannot be learned using only RNNs in an encoder-decoder architecture.

Attention Mechanism and Role of Attention Mechanism in Networking Analytics

Within the networking platform, attention mechanisms enable selective weighting of multimodal signals across evaluators, products, and outcomes to support targeted and recursive analytics.

Figure 2:
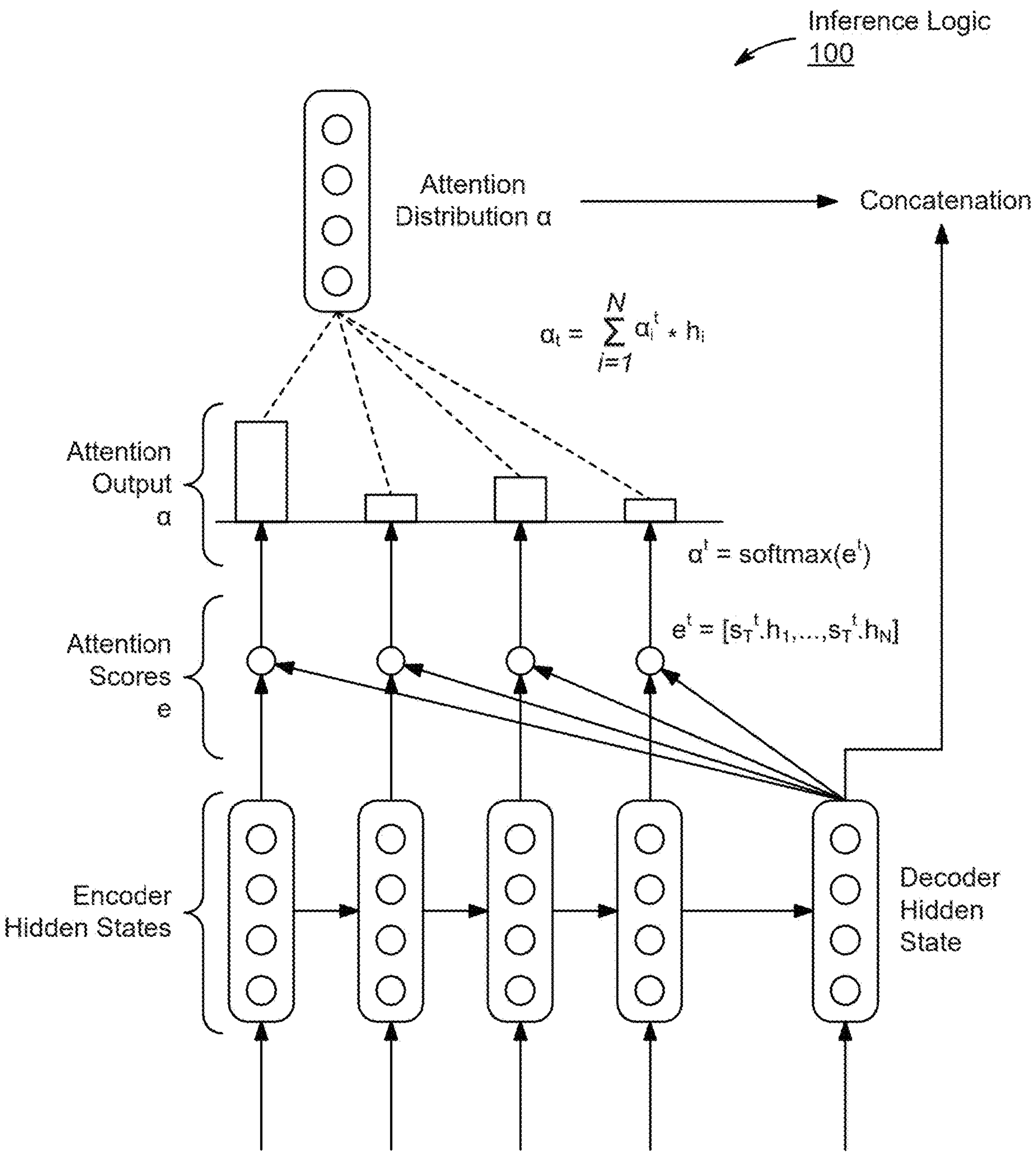
FIG. 2 shows an overview of an attention mechanism added onto an RNN encoder-decoder architecture of the networking platform.

Attention mechanisms distinguish Transformers from other machine learning models. The attention mechanism provides a solution for the vanishing gradient problem. FIG. 2 shows an overview of an attention mechanism added onto an RNN encoder-decoder architecture. At every step, the decoder is given an attention score, e, for each encoder hidden state. In other words, the decoder is given weights for each relationship between words in a sentence. The decoder uses the attention score concatenated with the context vector during decoding. The output of the decoder at time step t is based on all encoder hidden states and the attention outputs. The attention output captures the relevant context for time step t from the original sentence. Thus, words at the end of a sentence may now have a strong relationship with words at the beginning of the sentence. In the sentence "The quick brown fox, upon arriving at the doghouse, jumped over the lazy dog," fox and dog can be closely related despite being far apart in this complex sentence.

To weight encoder hidden states, a dot product between the decoder hidden state of the current time step, and all encoder hidden states, is calculated. This results in an attention score for every encoder hidden state. The attention scores are higher for those encoder hidden states that are similar to the decoder hidden state of the current time step. Higher values for the dot product indicate the vectors are pointing more closely in the same direction. The attention scores are converted to fractions that sum to one using the SoftMax function.

The SoftMax scores provide an attention distribution. The x-axis of the distribution is position in a sentence. The y-axis is attention weight. The scores show which encoder hidden states are most closely related. The SoftMax scores specify which encoder hidden states are the most relevant for the decoder hidden state of the current time step.

The elements of the attention distribution are used as weights to calculate a weighted sum over the different encoder hidden states. The outcome of the weighted sum is called the attention output. The attention output is used to predict the output, often in combination (concatenation) with the decoder hidden states. Thus, both information about the inputs, as well as the already generated outputs, can be used to predict the next outputs.

By making it possible to focus on specific parts of the input in every decoder step, the attention mechanism solves the vanishing gradient problem. By using attention, information flows more directly to the decoder. It does not pass through many hidden states. Interpreting the attention step can give insights into the data. Attention can be thought of as a soft alignment. The words in the input sequence with a high attention score align with the current target word. Attention describes long-range dependencies better than RNN alone. This enables analysis of longer, more complex sentences.

The attention mechanism can be generalized as: given a set of vector values and a vector query, attention is a technique to compute a weighted sum of the vector values, dependent on the vector query. The vector values are the encoder hidden states, and the vector query is the decoder hidden state at the current time step.

The weighted sum can be considered a selective summary of the information present in the vector values. The vector query determines on which of the vector values to focus. Thus, a fixed-size representation of the vector values can be created, in dependence upon the vector query.

The attention scores can be calculated by the dot product, or by weighing the different values (multiplicative attention).

Embeddings

For most machine learning models, the input to the model needs to be numerical. The input to a translation model is a sentence, and words are not numerical. multiple methods exist for the conversion of words into numerical vectors. These numerical vectors are called the embeddings of the words. Embeddings can be used to convert any type of symbolic representation into a numerical one.

Embeddings can be created by using one-hot encoding. The one-hot vector representing the symbols has the same length as the total number of possible different symbols. Each position in the one-hot vector corresponds to a specific symbol. For example, when converting colors to a numerical vector, the length of the one-hot vector would be the total number of different colors present in the dataset. For each input, the location corresponding to the color of that value is one, whereas all the other locations are valued at zero. This works well for working with images. For NLP, this becomes problematic, because the number of words in a language is very large. This results in enormous models and the need for a lot of computational power. Furthermore, no specific information is captured with one-hot encoding. From the numerical representation, it is not clear that orange and red are more similar than orange and green. For this reason, other methods exist.

A second way of creating embeddings is by creating feature vectors. Every symbol has its specific vector representation, based on features. With colors, a vector of three elements could be used, where the elements represent the amount of yellow, red, and/or blue needed to create the color. Thus, all colors can be represented by only using a vector of three elements. Also, similar colors have similar representation vectors.

For NLP, embeddings based on context, as opposed to words, are small and can be trained. The reasoning behind this concept is that words with similar meanings occur in similar contexts. Different methods take the context of words into account. Some methods, like GloVe, base their context embedding on co-occurrence statistics from corpora (large texts) such as Wikipedia. Words with similar co-occurrence statistics have similar word embeddings. Other methods use neural networks to train the embeddings. For example, they train their embeddings to predict the word based on the context (Common Bag of Words), and/or to predict the context based on the word (Skip-Gram). Training these contextual embeddings is time intensive. For this reason, pre-trained libraries exist. Other deep learning methods can be used to create embeddings. For example, the latent space of a variational autoencoder (VAE) can be used as the embedding of the input. Another method is to use 1D convolutions to create embeddings. This causes a sparse, high-dimensional input space to be converted to a denser, low-dimensional feature space.

Self-Attention: Queries (Q), Keys (K), Values (V)

Transformer models are based on the principle of self-attention. Self-attention allows each element of the input sequence to look at all other elements in the input sequence and search for clues that can help it to create a more meaningful encoding. It is a way to look at which other sequence elements are relevant for the current element. The Transformer can grab context from both before and after the currently processed element.

When performing self-attention, three vectors need to be created for each element of the encoder input: the query vector (Q), the key vector (K), and the value vector (V). These vectors are created by performing matrix multiplications between the input embedding vectors using three unique weight matrices.

After this, self-attention scores are calculated. When calculating self-attention scores for a given element, the dot products between the query vector of this element and the key vectors of all other input elements are calculated. To make the model mathematically more stable, these self-attention scores are divided by the root of the size of the vectors. This has the effect of reducing the importance of the scalar thus emphasizing the importance of the direction of the vector. Just as before, these scores are normalized with a SoftMax layer. This attention distribution is then used to calculate a weighted sum of the value vectors, resulting in a vector z for every input element. In the attention principle explained above, the vector to calculate attention scores and to perform the weighted sum was the same, in self-attention two different vectors are created and used. As the self-attention needs to be calculated for all elements (thus a query for every element), one formula can be created to calculate a Z matrix. The rows of this Z matrix are the z vectors for every sequence input element, giving the matrix a size length sequence dimension QKV.

Figure 3:
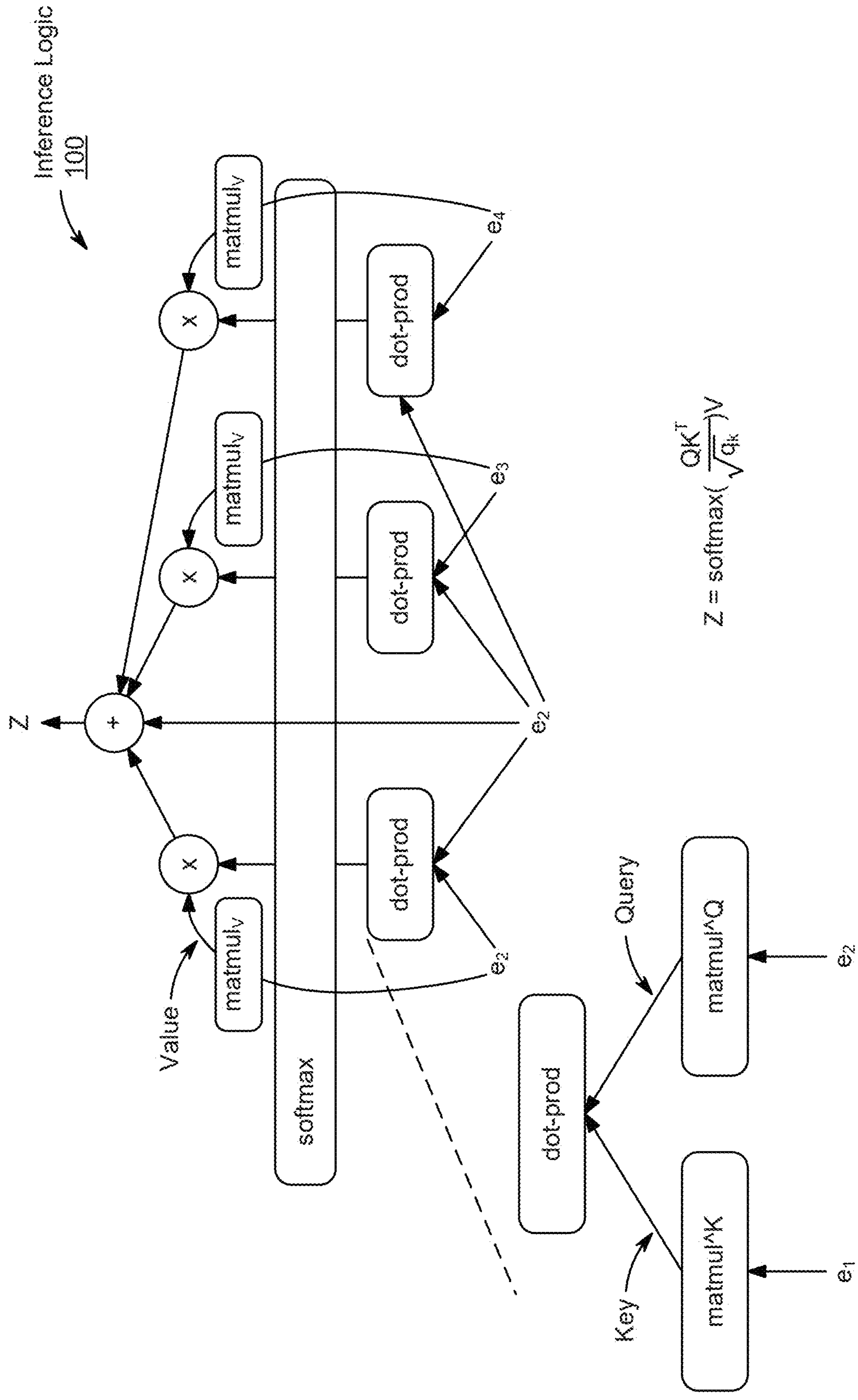
FIG. 3 is a schematic representation of the calculation of self-attention showing one attention head of the networking platform.

Multi-headed attention is executed in the Transformer. FIG. 3 is a schematic representation of the calculation of self-attention showing one attention head. For every attention head, different weight matrices are trained to calculate Q, K, and V. Every attention head outputs a matrix Z. Different attention heads can capture different types of information. The different Z matrices of the different attention heads are concatenated. This matrix can become large when multiple attention heads are used. To reduce dimensionality, an extra weight matrix W is trained to condense the different attention heads into a matrix with the same size as one Z matrix. This way, the amount of data given to the next step does not enlarge every time self-attention is performed.

When performing self-attention, information about the order of the different elements within the sequence is lost. To address this problem, positional encodings are added to the embedding vectors. Every position has its unique positional encoding vector. These vectors follow a specific pattern, which the Transformer model can learn to recognize. This way, the model can consider distances between the different elements.

As discussed above, in the core of self-attention are three objects: queries (Q), keys (K), and values (V). Each of these objects has an inner semantic meaning of their purpose. One can think of these as analogous to databases. We have a user-defined query of what the user wants to know. Then we have the relations in the database, i.e., the values which are the weights. More advanced database management systems create some apt representation of its relations to retrieve values more efficiently from the relations. This can be achieved by using indexes, which represent information about what is stored in the database. In the context of attention, indexes can be thought of as keys. So instead of running the query against values directly, the query is first executed on the indexes to retrieve where the relevant values or weights are stored. Lastly, these weights are run against the original values to retrieve data that is most relevant to the initial query.

Figure 4:
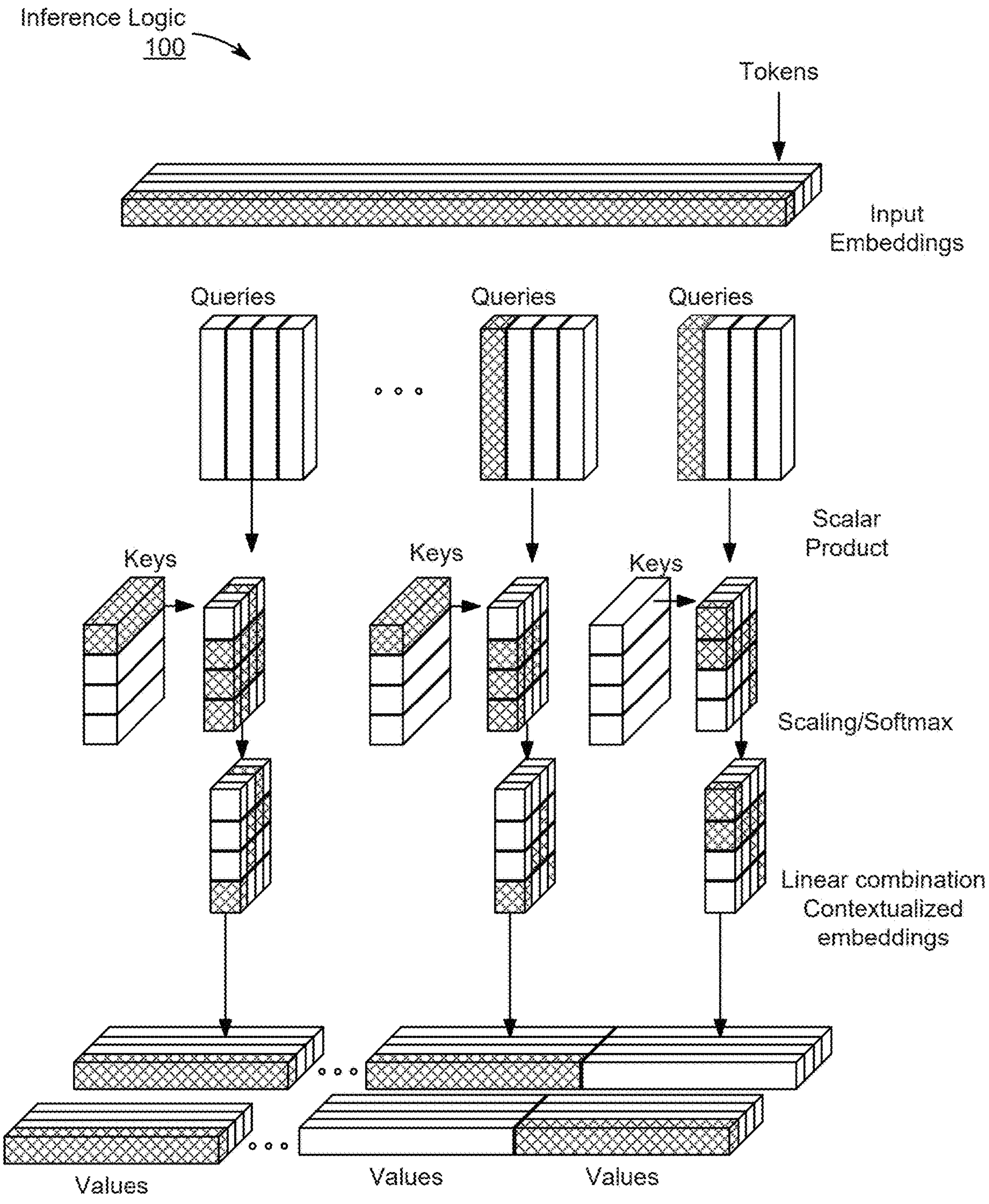
FIG. 4 is a depiction of several attention heads in a Transformer block of the networking platform.

FIG. 4 depicts several attention heads in a Transformer block. We can see that the outputs of queries and keys dot products in different attention heads are differently colored. This depicts the capability of the multi-head attention to focus on different aspects of the input and aggregate the obtained information by multiplying the input with different attention weights.

Examples of attention calculation include scaled dot-product attention and additive attention. There are several reasons why scaled dot-product attention is used in the Transformers. Firstly, the scaled dot-product attention is relatively fast to compute, since its main parts are matrix operations that can be run on modern hardware accelerators. Secondly, it performs similarly well for smaller dimensions of the K matrix, dk, as the additive attention. For larger dk, the scaled dot-product attention performs a bit worse because dot products can cause the vanishing gradient problem. This is compensated via the scaling factor, which is defined as √dk.

As discussed above, the attention function takes as input three objects: key, value, and query. In the context of Transformers, these objects are matrices of shapes (n, d), where n is the number of elements in the input sequence and d is the hidden representation of each element (also called the hidden vector). Attention is then computed as:

$$\text{Attention}(Q, K, V) = Soft\text{Max}\left((QK^{\wedge}T)/\sqrt{dk}\right)V$$

where Q, K, V are computed as:

$$X\cdot\text{W\_Q}, X\cdot\text{W\_K}, X\cdot\text{W\_V}$$

X is the input matrix and WQ, WK, WV are learned weights to project the input matrix into the representations. The dot products appearing in the attention function are exploited for their geometrical interpretation where higher values of their results mean that the inputs are more similar, i.e., pointing in the geometrical space in the same direction. Since the attention function now works with matrices, the dot product becomes matrix multiplication. The SoftMax function is used to normalize the attention weights into the value of 1 prior to being multiplied by the values matrix. The resulting matrix is used either as input into another layer of attention or becomes the output of the Transformer.

Multi-Head Attention

Transformers become even more powerful when multi-head attention is used. Queries, keys, and values are computed the same way as above, though they are now projected into h different representations of smaller dimensions using a set of h learned weights. Each representation is passed into a different scaled dot-product attention block called a head. The head then computes its output using the same procedure as described above.

Formally, the multi-head attention is defined as:

$$MultiHeadAttention(Q, K, V) = [\text{head1}, \ldots, \text{head}h]W0 \text{ where head}i = \text{Attention}\left(\text{QW\_i}^{\wedge}Q, \text{KW\_i}^{\wedge}K, \text{VW\_i}^{\wedge}V\right)$$

The outputs of all heads are concatenated together and projected again using the learned weights matrix W0 to match the dimensions expected by the next block of heads or the output of the Transformer. Using the multi-head attention instead of the simpler scaled dot-product attention enables Transformers to jointly attend to information from different representation subspaces at different positions.

Figure 5:
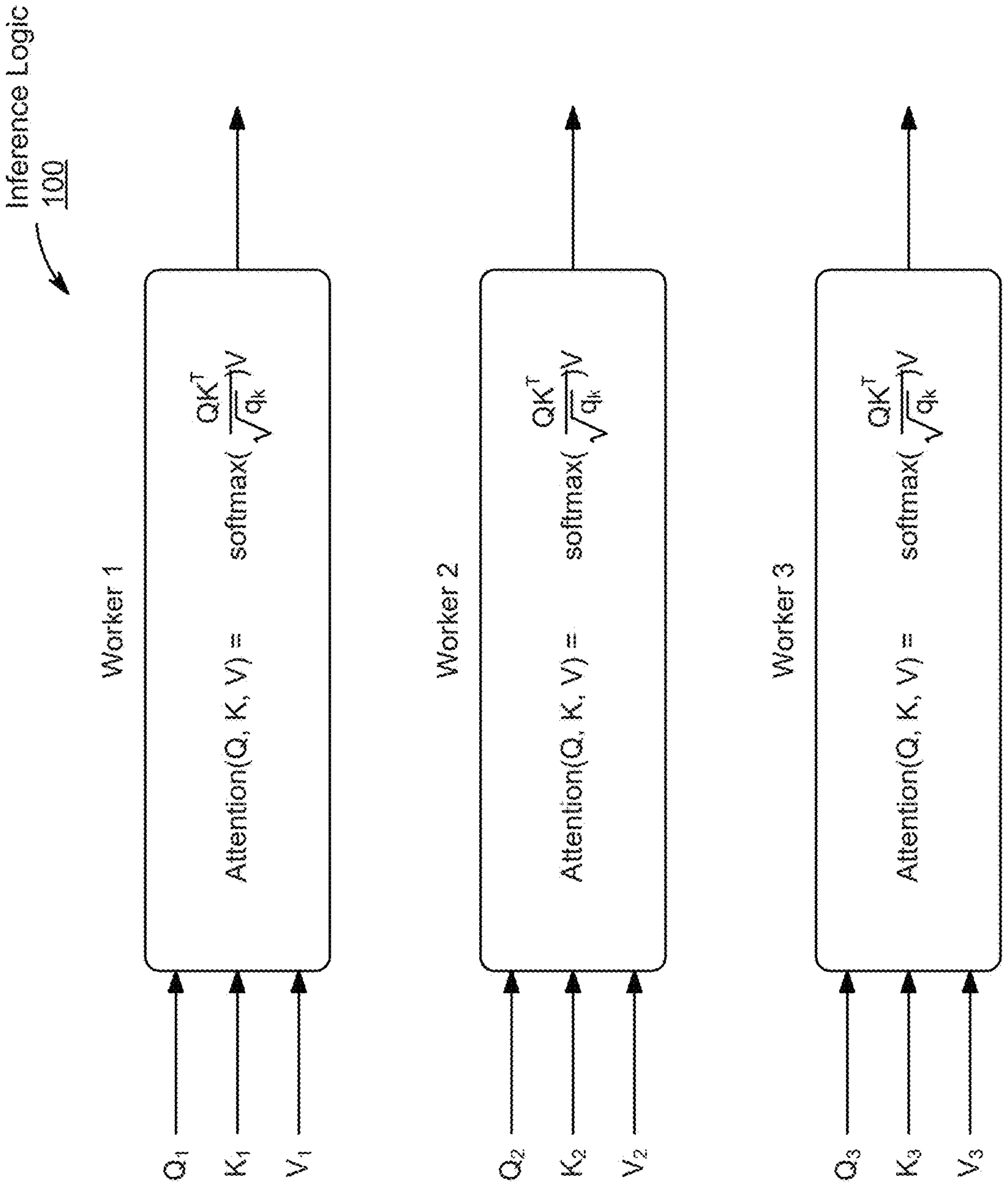
FIG. 5 is an illustration that shows how one can use multiple workers to compute the multi-head attention in parallel, as the respective heads compute their outputs independently of one another.

As shown in FIG. 5, one can use multiple workers to compute the multi-head attention in parallel, as the respective heads compute their outputs independently of one another. Parallel processing is one of the advantages of Transformers over RNNs.

Assuming the naive matrix multiplication algorithm which has a complexity of:

$$a\cdot b\cdot c$$

For matrices of shape (a, b) and (c, d), to obtain values Q, K, V, we need to compute the operations:

$$X\cdot WQ, X\cdot WK, X\cdot WV$$

The matrix X is of shape (n, d) where n is the number of patches and d is the hidden vector dimension. The weights WQ, WK, WV are all of shape (d, d). Omitting the constant factor 3, the resulting complexity is:

$$n\cdot d2$$

We can proceed to the estimation of the complexity of the attention function itself, i.e., of SoftMax ((QK^T)/√dk)V. The matrices Q and K are both of shape (n, d). The transposition operation does not influence the asymptotic complexity of computing the dot product of matrices of shapes (n, d)·(d, n), therefore its complexity is:

$$n2\cdot d$$

Scaling by a constant factor of √dk, where dk is the dimension of the keys vector, as well as applying the SoftMax function, both have the complexity of a·b for a matrix of shape (a, b), hence they do not influence the asymptotic complexity. Lastly the dot product SoftMax ((QK^T)/√)·V is between matrices of shapes (n, n) and (n, d) and so its complexity is:

$$n2 \cdot d$$

The final asymptotic complexity of scaled dot-product attention is obtained by summing the complexities of computing Q, K, V, and of the following attention function:

$$n \cdot d2 + n2 \cdot d.$$

The asymptotic complexity of multi-head attention is the same since the original input matrix X is projected into h matrices of shapes (n, d/h), where h is the number of heads. From the point of view of asymptotic complexity, h is constant, therefore we would arrive at the same estimate of asymptotic complexity using a similar approach as for the scaled dot-product attention.

Transformer models often have the encoder-decoder architecture, although this is not necessarily the case. The encoder is built out of different encoder layers which are all constructed in the same way. The positional encodings are added to the embedding vectors. Afterward, self-attention is performed.

Encoder Block of Transformer

Figure 6:
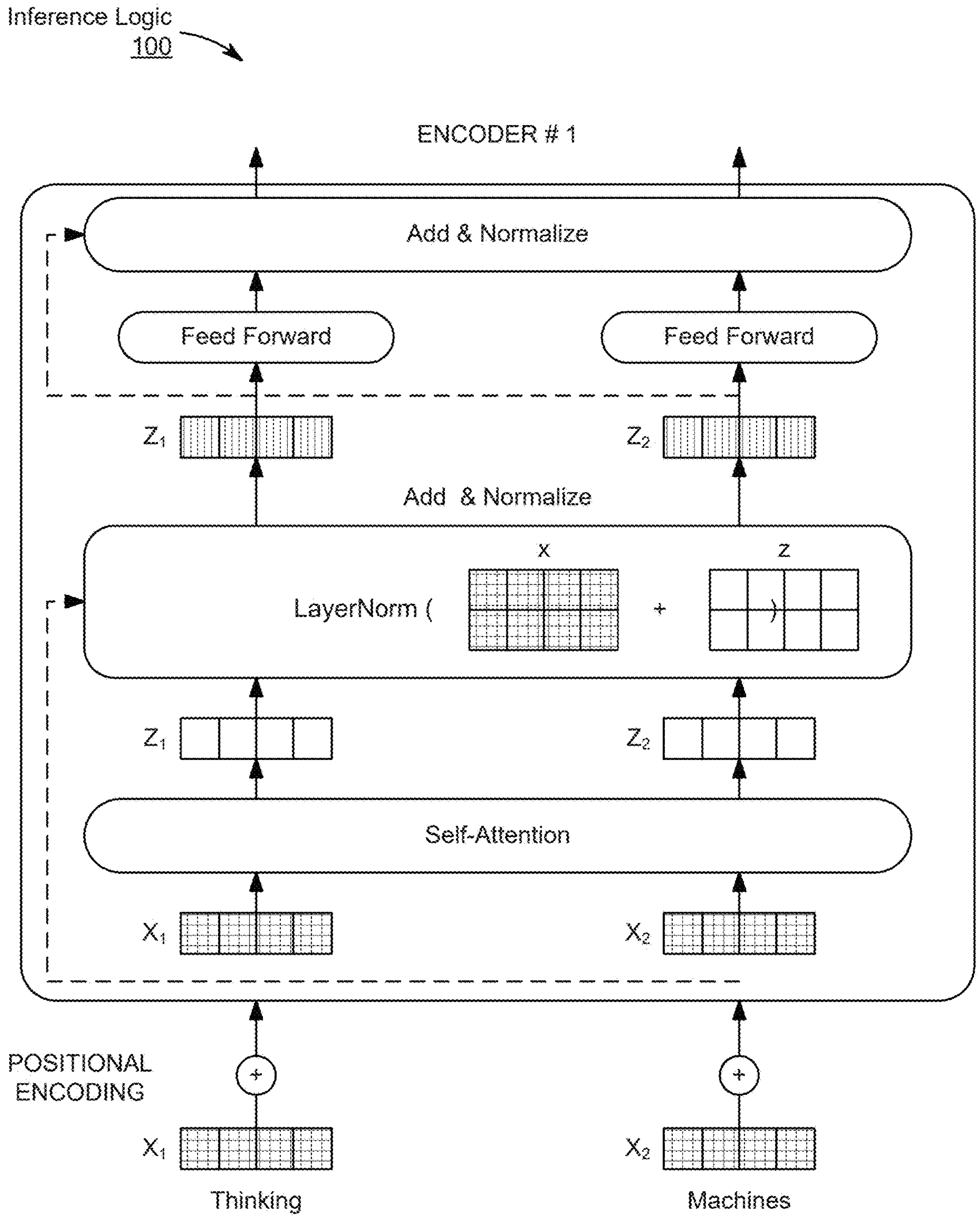
FIG. 6 is a portrayal of one encoder layer of a Transformer network of the networking platform.

FIG. 6 portrays one encoder layer of a Transformer network. Every self-attention layer is surrounded by a residual connection, summing up the output and input of the self-attention. This sum is normalized, and the normalized vectors are fed to a feed-forward layer. Every z vector is fed separately to this feed-forward layer. The feed-forward layer is wrapped in a residual connection and the outcome is normalized too. Often, numerous encoder layers are piled to form the encoder. The output of the encoder is a fixed-size vector for every element of the input sequence.

Just like the encoder, the decoder is built from different decoder layers. In the decoder, a modified version of self-attention takes place. The query vector is only compared to the keys of previous output sequence elements. The elements further in the sequence are not known yet, as they still must be predicted. No information about these output elements may be used.

Encoder-Decoder Blocks of Transformer

Figure 7:
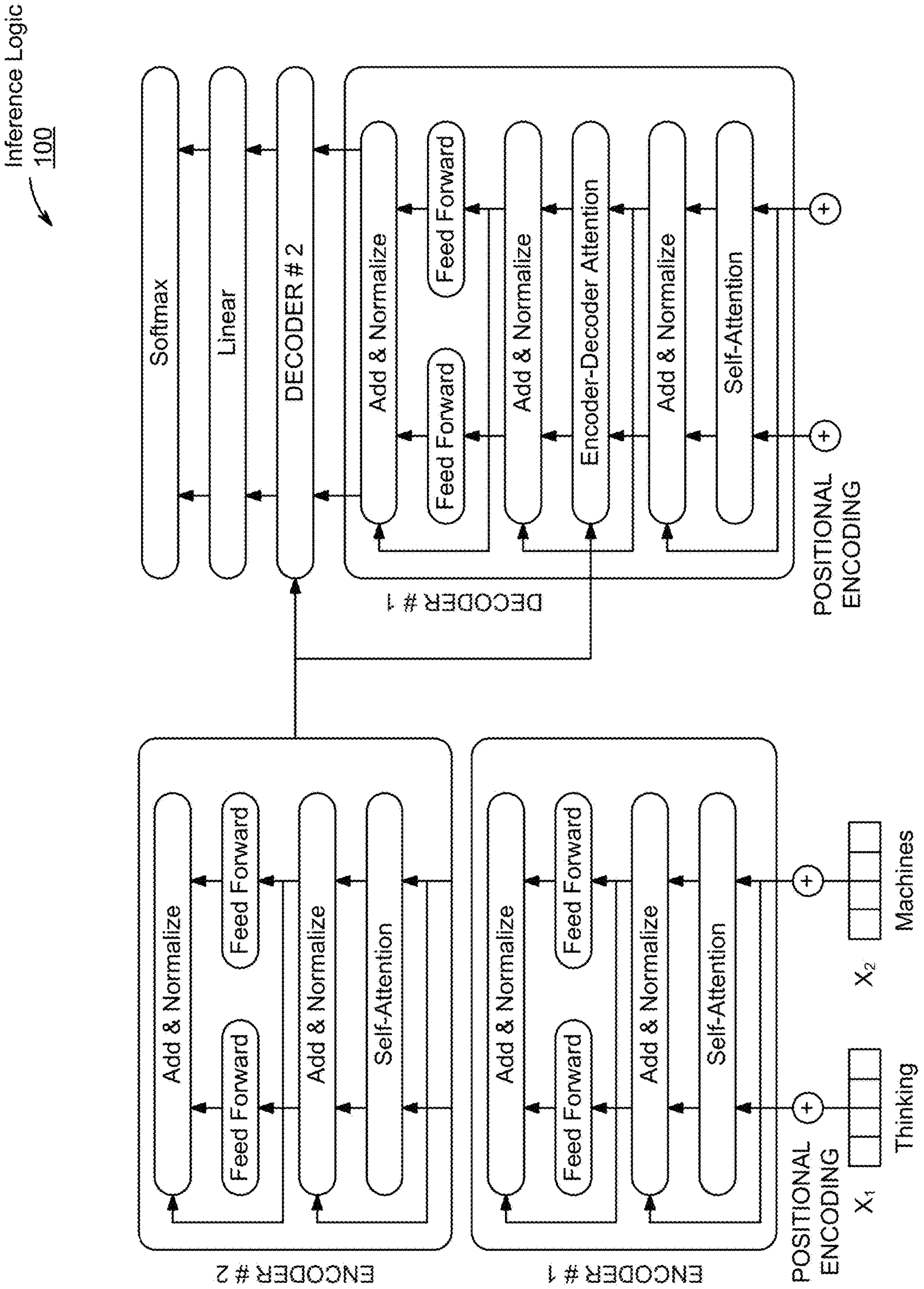
FIG. 7 shows a schematic overview of a Transformer model of the networking platform.

FIG. 7 shows a schematic overview of a Transformer model. Next to a self-attention layer, a layer of encoder-decoder attention is present in the decoder, in which the decoder can examine the last Z vectors of the encoder, providing fluent information transmission. The ultimate decoder layer is a feed-forward layer. All layers are packed in a residual connection. This allows the decoder to examine all previously predicted outputs and all encoded input vectors to predict the next output. Thus, information from the encoder is provided to the decoder, which could improve the predictive capacity. The output vectors of the last decoder layer need to be processed to form the output of the entire system. This is done by a combination of a feed-forward layer and a SoftMax function. The output corresponding to the highest probability is the predicted output value for a subject time step.

For some tasks other than translation, only an encoder is needed. This is true for both document classification and name entity recognition. In these cases, the encoded input vectors are the input of the feed-forward layer and the SoftMax layer. Transformer models have been extensively applied in different NLP fields, such as translation, document summarization, speech recognition, and named entity recognition. These models have applications in the field of biology as well for predicting protein structure and function and labeling DNA sequences.

In operation, such transformer-based models, attention mechanisms, and other inference workflows may be invoked by the networking platform to analyze heterogeneous data, generate targeted insights, coordinate multicast communications, adapt subsequent trial iterations and/or perform other analyses and functions in real time.

Vision Transformer

In the networking platform, vision transformer (ViT) architectures may be employed to process image-based and visual biometric data, such as facial scans, posture imagery, or other sensor-derived visual inputs, used to generate or refine multimodal profiles of evaluators or consumers. ViT architectures may be used to process image based and visual data from heterogeneous data sources for downstream analyses. For example, visual features extracted by a vision transformer may be combined with non-visual signals, including survey responses, wearable-derived metrics, or behavioral data, to form composite multimodal profiles that inform evaluator sorting, targeted evaluations, and consumption insights within the networking platform.

There are extensive applications of transformers in vision including popular recognition tasks (e.g., image classification, object detection, action recognition, and segmentation), generative modeling, multimodal tasks (e.g., visual-question answering, visual reasoning, and visual grounding), video processing (e.g., activity recognition, video forecasting), low-level vision (e.g., image super-resolution, image enhancement, and colorization) and 3D analysis (e.g., point cloud classification and segmentation).

Figure 8B:
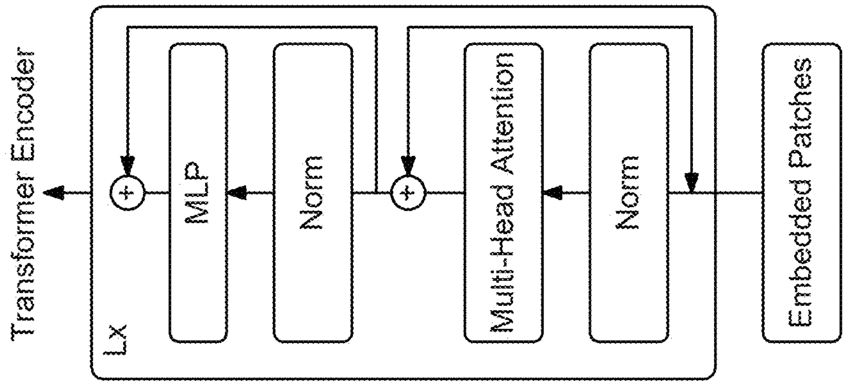
FIGS. 8A and 8B depict different aspects of a Vision Transformer (ViT) of the networking platform.
Figure 8A:
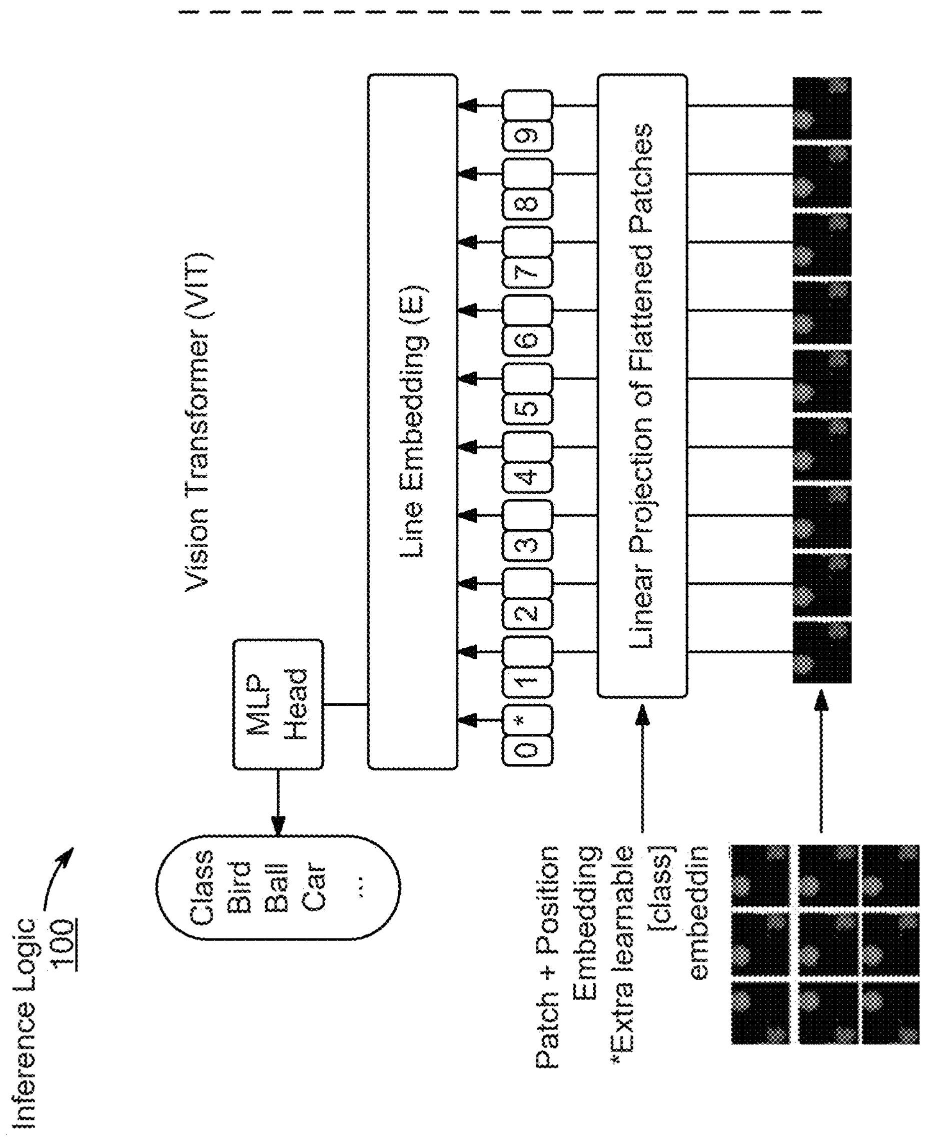
Figures 9A, 9B, 9C, 9D:
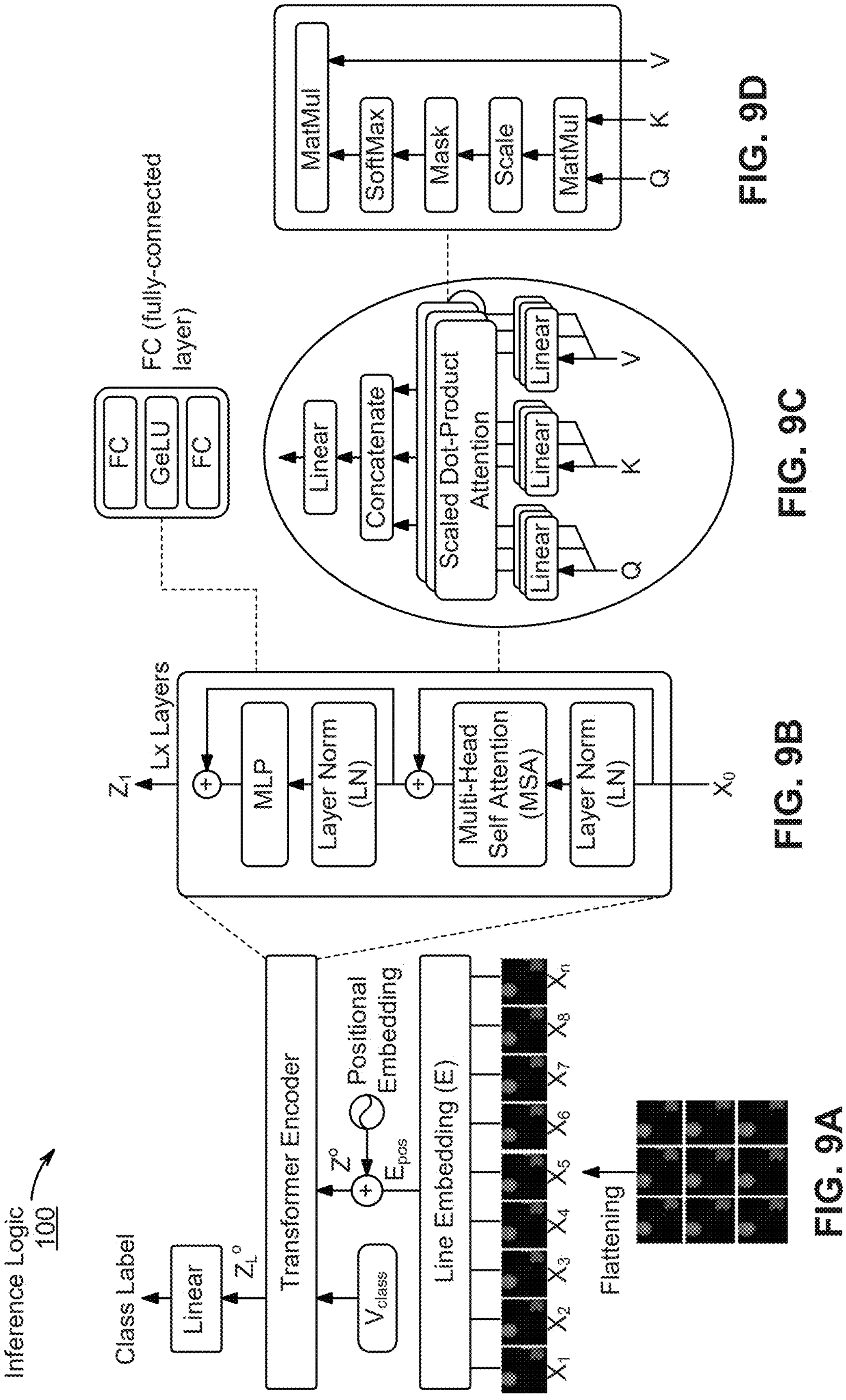
FIGS. 9A, 9B, 9C, and 9D illustrate a processing flow of the Vision Transformer (ViT).

Transformers were originally developed for NLP and worked with sequences of words. In image classification, we often have a single input image in which the pixels are in a sequence. To reduce the computation required, Vision Transformers (ViTs) cut the input image into a set of fixed-sized patches of pixels. The patches are often 16×16 pixels. They are treated much like words in NLP Transformers. ViTs are depicted in FIG. 8A and FIG. 8B, as well as FIG. 9A, FIG. 9B, FIG. 9C and FIG. 9D. Unfortunately, important positional information is lost because image sets are position-invariant. This problem is solved by adding a learned positional encoding into the image patches.

The computations of the ViT architecture can be summarized as follows. The first layer of a ViT extracts a fixed number of patches from an input image (FIG. 8A). The patches are then projected to linear embeddings. A special class token vector is added to the sequence of embedding vectors to include all representative information of all tokens through the multi-layer encoding procedure. The class vector is unique to each image. Vectors containing positional information are combined with the embeddings and the class token. The sequence of embedding vectors is passed into the Transformer blocks. The class token vector is extracted from the output of the last Transformer block and is passed into a multilayer perceptron (MLP) head whose output is the final classification. The perceptron takes the normalized input and places the output in categories. It classifies the images. This procedure directly translates into the Python Keras code shown in FIG. 10.

When the input image is split into patches, a fixed patch size is specified before instantiating a ViT. Given the quadratic complexity of attention, patch size has a large effect on the length of training and inference time. A single Transformer block comprises several layers. The first layer implements Layer Normalization, followed by the multi-head attention that is responsible for the performance of ViTs. In the depiction of a Transformer block in FIG. 8B, we can see two arrows. These are residual skip connections. Including skip connection data can simplify the output and improve the results. The output of the multi-head attention is followed again by Layer Normalization. And finally, the output layer is an MLP (Multi-Layer Perceptron) with the GELU (Gaussian Error Linear Unit) activation function.

ViTs can be pretrained and fine-tuned. Pretraining is generally done on a large dataset. Fine-tuning is done on a domain specific dataset.

Domain-specific architectures, like convolutional neural networks (CNNs) or long short-term memory networks (LSTMs), have been derived from the usual architecture of MLPs and suffer from so-called inductive biases that predispose the networks towards a certain output. ViTs stepped in the opposite direction of CNNs and LSTMs and became more general architectures by eliminating inductive biases. A ViT can be seen as a generalization of MLPs because MLPs, after being trained, do not change their weights for different inputs. On the other hand, ViTs compute their attention weights at runtime based on the particular input.

The following detailed description is made with reference to the figures. Example implementations are described to illustrate the technology disclosed, not to limit its scope, which is defined by the claims. Those of ordinary skill in the art will recognize a variety of equivalent variations on the description that follows. Reference will now be made in detail to the exemplary implementations of the technology disclosed, examples of which are illustrated in the accompanying drawings. Wherever possible, the same reference numbers will be used throughout the drawings to refer to the same or like parts.

Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general-purpose signal processor or a block of random-access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

Language Models and Artificial Intelligence Agents

The language models, prompting techniques, agentic workflows, and retrieval-augmented generation mechanisms described in this section are employed as control, orchestration, and analytical support layers within the networking platform, and do not themselves constitute the core invention. In particular, such models and agents may be invoked to manage data flow, coordinate tool access, generate structured outputs, or assist with analytics execution, while the networking platform governs participant interaction, multicast communication, and recursive learning.

The following detailed description of the figures provides a technical exposition of large language model (LLM)-based agents, language modeling methodologies, enhancement techniques, integration protocols, and computational infrastructure. Large language model-based agents differ fundamentally from backpropagation-driven deep learning systems because their core behavior is governed not primarily by parameter updates, but by inference-time control structures that operate through prompting, contextual conditioning, and dynamic retrieval. Whereas legacy deep learning models rely on supervised datasets, gradient descent, and static weight modification to effect behavioral change, LLM-based agents adapt their operation through system prompts, hierarchical instruction scaffolds, retrieval-augmented generation (RAG) pipelines, low-rank adaptation (LoRA) overlays, Model Context Protocol (MCP) tool interfaces, chain-of-thought reasoning, self-consistency decoding, reinforcement learning from human feedback (RLHF), plan-and-execute orchestration, introspection mechanisms, multimodal grounding, session-specific memory embeddings, and distributed multi-agent coordination frameworks.

An AI agent (also referred to as an agent or an artificial intelligence agent) is a stateful control architecture that models perception, decision, and action over an environment. It uses one or more LLMs as inference engines inside its policy but augments them with persistent state, memory subsystems, tool interfaces, orchestration logic, and policy enforcement mechanisms that are not part of the underlying language model itself.

In LLM-native systems, the primary locus of computation shifts from offline training to runtime orchestration. System prompts define persistent operational policies; RAG injects real-time, externally maintained knowledge into the model's attention space; LoRA modules provide orthogonal, dynamically loadable specialization layers; and MCP schemas and tool APIs expose external applications and services as structured objects in the model's output vocabulary. Chain-of-thought and self-consistency mechanisms support multi-step internal deliberation and verification prior to committing to actions, while introspection tools enable runtime evaluation and error correction. RLHF further guides adaptive, context-sensitive, reward-aligned behavior.

Multimodal grounding integrates visual, auditory, or structured interface embeddings with textual instructions to generate perceptually aligned action tokens. Session-specific memory stores, retrieval mechanisms, and summarization policies preserve long-horizon task continuity. Concurrent and distributed agent coordination is achieved through model-mediated message tokens and concurrency-control directives, enabling multiple agents to negotiate, resolve dependencies, and execute collaborative workflows in real time. Collectively, these mechanisms enable adaptive, tool-conditioned, continuously evolving behavior that emerges from inference-time context and structured memory rather than from weight-space optimization, establishing a computational paradigm that is categorically distinct from training-centric deep learning architectures and centered on inference-time generative, autonomous agency.

The figures illustrate the evolution of language models from statistical approaches to contemporary large language models, and in particular to LLM-based agents. The description includes prompt-engineering techniques that structure input to optimize model behavior through system prompts defining roles, guidelines, and constraints. Subsequent description and corresponding figures present Retrieval-Augmented Generation (RAG) systems that integrate external knowledge sources with generative models through retriever and generator components, as well as agentic intelligence architectures in which autonomous agents employ memory systems, planning mechanisms, and tool access to enable dynamic decision-making.

The figures further depict inference hardware structures comprising memory modules and computing hardware for neural network operations, with deployment configurations ranging from edge-device systems to distributed data center architectures. Detailed exposition is provided for the Model Context Protocol (MCP), a standardized communication specification enabling AI applications to access external data sources and services through MCP hosts, clients, and servers that expose tools, resources, and prompts. The integrated system architectures that combine prompt engineering, MCP-orchestrated context retrieval, and Low-Rank Adaptation (LoRA) for parameter-efficient model customization are also presented. The description specifies component functionalities, operational workflows, communication patterns, and architectural principles in sufficient detail to enable understanding and implementation by persons having ordinary skill in the art.

Language Models

Language modeling (LM) is a primary technique used to advance the language intelligence of machines. The development of language models can be divided into four main stages: statistical language models, neural language models, pre-trained language models, and large language models (LLMs).

Statistical language models were primarily used in specific tasks (e.g., retrieval or speech processing) in which predicted or estimated token probabilities improved the performance of task-specific pipelines. Neural language models shifted focus toward learning task-agnostic representations (e.g., feature embeddings), thereby reducing the need for manual feature engineering. Pre-trained language models learned context-aware representations that could be fine-tuned or otherwise optimized for downstream tasks.

The latest generation, LLMs, extend these advances by exploiting scaling effects in model capacity (e.g., parameter count, context window size, and training corpus size), and by leveraging transformer-based architectures. In practice, LLMs function as general-purpose task solvers that can be adapted to a broad range of applications via prompting, lightweight adaptation, and orchestration, rather than by task-specific architectural redesign.

Prompt

Figure 11:
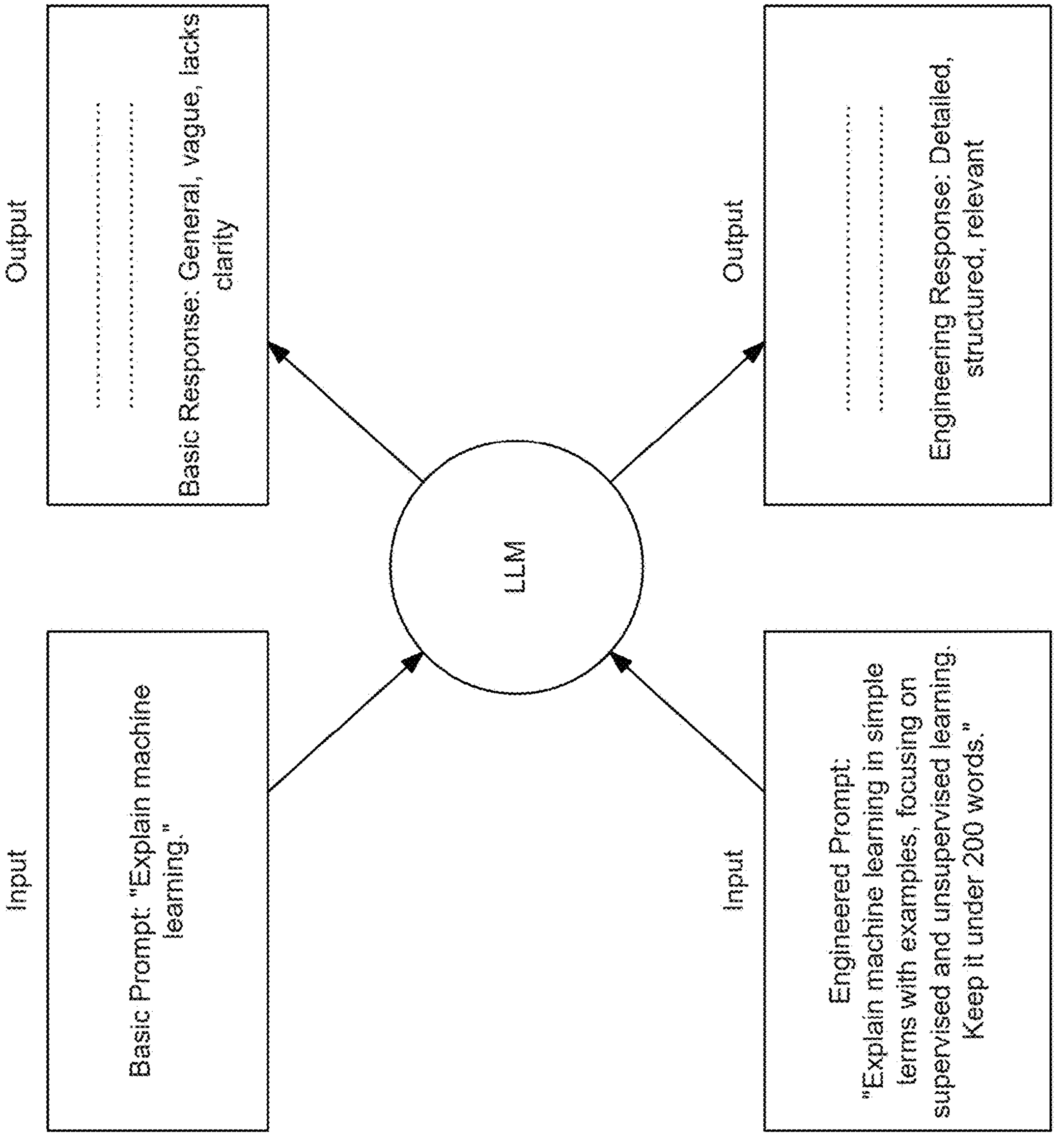
FIG. 11 illustrates a comparison between responses generated by a large language model (LLM) of the networking platform when provided with a basic prompt and when provided with a more sophisticated, engineered prompt.

FIG. 11 illustrates a comparison between responses generated by a large language model when provided with a basic prompt and when provided with a more sophisticated, engineered prompt. This comparison highlights the importance of prompt engineering. A basic prompt tends to produce a basic, often vague response, whereas an engineered prompt tends to yield a more structured, detailed, and higher-quality response.

Prompting is a widely used method for leveraging LLMs to solve diverse tasks. The process of creating an effective prompt is referred to as prompt engineering. Well-structured and context-rich prompts enable LLMs to generate more accurate, relevant, and detailed responses, while poorly specified prompts often result in unstructured, ambiguous, or incomplete outputs. Prompt engineering therefore improves the accuracy, coherence, and factual consistency of LLM responses.

A broad spectrum of prompting techniques is available. At one end of the spectrum, zero-shot prompting (e.g., "Summarize this") provides minimal contextual guidance. At the other end, comprehensive prompt-engineering frameworks supply highly structured prompting strategies, incorporating explicit roles, constraints, examples, and multi-step reasoning scaffolds.

Few-shot prompting lies between these extremes and often yields substantial improvements in response quality. In few-shot prompting, the prompt includes a small number of task examples (input-output pairs), also referred to as few-shot demonstrations. These demonstrations help the LLM internalize the semantic mapping between input and output for the task at hand without requiring parameter updates.

An example of a few-shot prompt is shown below:

```
[
convert each word into its number of letters
Example 1
Word: "Tree"
Output: 4
Example 2
Word: "House"
Output: 5
Example 3
Word: "Ant"
Output: 3
Now complete
Word: "Planet"
Output:
]
```

Formally, let Dk={f(x1, y1), . . . , f(xk,yk)}represent a set of demonstrations with k examples, where f(xk, yk)) is the prompt function that transforms the k-th task example into natural language prompts. Given the task description I, demonstration Dk, and a new input query xk+1, the prediction of the output ŷk+1 generated from LLMs can be formulation as follows:

$$LLM\left(I, f(x1, y1), \ldots, f(xk, yk), f(xk+1, \_) \to \hat{y}_{k+1}\right.$$

Input Answer

Where the actual answer yk+1 is left as blank to predicted by the LLM. In this formulation, the demonstrations serve as in-context training signals, the new input forms the query, and the predicted answer is generated by the model at inference time.

Few-shot prompting is commonly used across a variety of natural language processing (NLP) applications, such as:

- Text Classification: "Classify this new review based on the given positive and negative examples."
- Machine Translation: "Translate these English sentences into Spanish. Now translate the following text."
- Code Generation: "Complete the missing function given these input-output pairs."
- Question Answering: "Answer factual questions based on the provided example Q&A pairs."

System Prompt

System prompts are predefined instructions that guide an LLM's behavior when responding to user queries and thus play a critical role in the effective performance and functionality of an LLM. A system prompt defines the model's role, behavioral constraints, objectives, and style, thereby acting as a soft form of policy shaping within the model's learned distribution.

Operationally, the system prompt functions as input-side control: it steers the model by modifying the contextual information on which the model conditions, without altering the underlying model parameters. System prompts may include proprietary or sensitive information about the organization that owns or operates the model, such as private system instructions, proprietary guidelines, functionality descriptions, architectural details, limitations, permission disclosures, role definitions for different classes of users, and basic safety-guardrail configurations.

An example system prompt is provided below:

"You are a travel itinerary assistant. You will help users create personalized trip plans based on their preferences and input regarding destination, budget, interests, and time constraints. Ensure that each itinerary includes essential details, such as accommodation options, transportation methods, key attractions, dining options, and free-time activities. Consider factors like user preferences for pace, specific requests for cultural experiences, or outdoor adventures if mentioned. Use up-to-date information about the destinations and include safety tips where necessary. Make sure that each itinerary is well-balanced, reasonable in terms of time, and enjoyable for the user."

Guidelines associated with this system prompt may include:

Always prioritize user-driven preferences for destinations and activities.

Deliver a balance between exploration and relaxation within the itinerary.

Offer insights into local culture and practices relevant to the destination.

Help users maximize value for money in booking and planning.

Create itineraries that provide satisfying and meaningful experiences for both family and individual travelers.

Retrieval-Augmented Generation (RAG)

Figure 12:
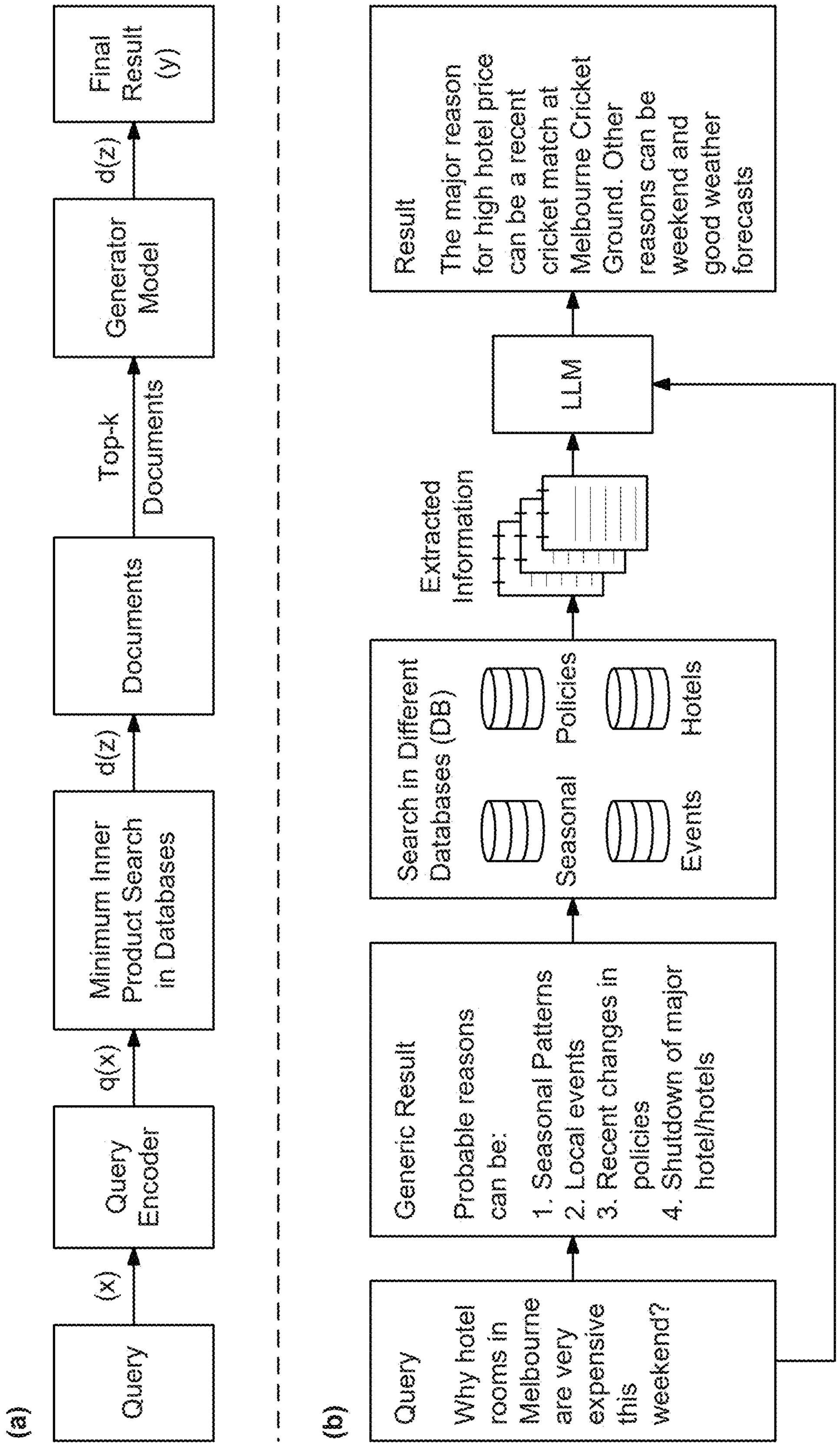
FIG. 12 presents a high-level overview of a Retrieval-Augmented Generation (RAG) workflow of the networking platform.

FIG. 12 illustrates a high-level overview of a Retrieval-Augmented Generation (RAG) workflow. RAG is a technique that enhances the capabilities of large language models by combining their generative power with the ability to access and retrieve information from external knowledge sources. This hybrid approach addresses a key limitation of traditional LLMs, which are constrained by the static nature of their training data. While LLMs excel at generating coherent and contextually relevant text, they may lack access to the most recent information or to specialized knowledge that is not contained in their training corpus.

RAG bridges this gap by combining the strengths of retrieval-based systems and generative models. During the generation process, a RAG system first retrieves relevant documents or information from an external knowledge source, such as a database, knowledge graph, or document collection. The retrieved information is then used to augment the input provided to the LLM, enabling the model to generate responses grounded in factual and contextually relevant knowledge. For example, in open-domain question answering, a RAG system can retrieve relevant passages from a large corpus of documents and then use them as context for generating accurate and detailed answers.

A typical RAG framework comprises two primary components: a retriever and a generator. The retriever identifies and fetches the most relevant information from the external knowledge source, while the generator (the LLM) incorporates this retrieved information into a coherent and contextually appropriate response. This combination allows RAG systems to perform tasks that require broad knowledge and precise reasoning, such as answering complex questions, summarizing lengthy documents, or providing grounded explanations.

One of the principal advantages of RAG is its ability to handle knowledge-intensive tasks with improved accuracy and relevance. By leveraging external knowledge sources, RAG helps ensure that generated responses are not only fluent but also factually accurate and up to date. This makes RAG particularly valuable in domains such as customer support, medical diagnosis, and legal research, where factual precision and access to specialized knowledge are critical.

FIG. 12 presents a high-level schematic of RAG operation. A top portion of FIG. 12, labeled (a), illustrates the RAG framework and the retrieval and generation phases for enhancing LLM responses with external knowledge as described above. A bottom portion of FIG. 12, labeled (b), presents an example use case demonstrating how retrieved content is combined with a user query to produce a grounded response.

Agentic Intelligence

Figure 13:
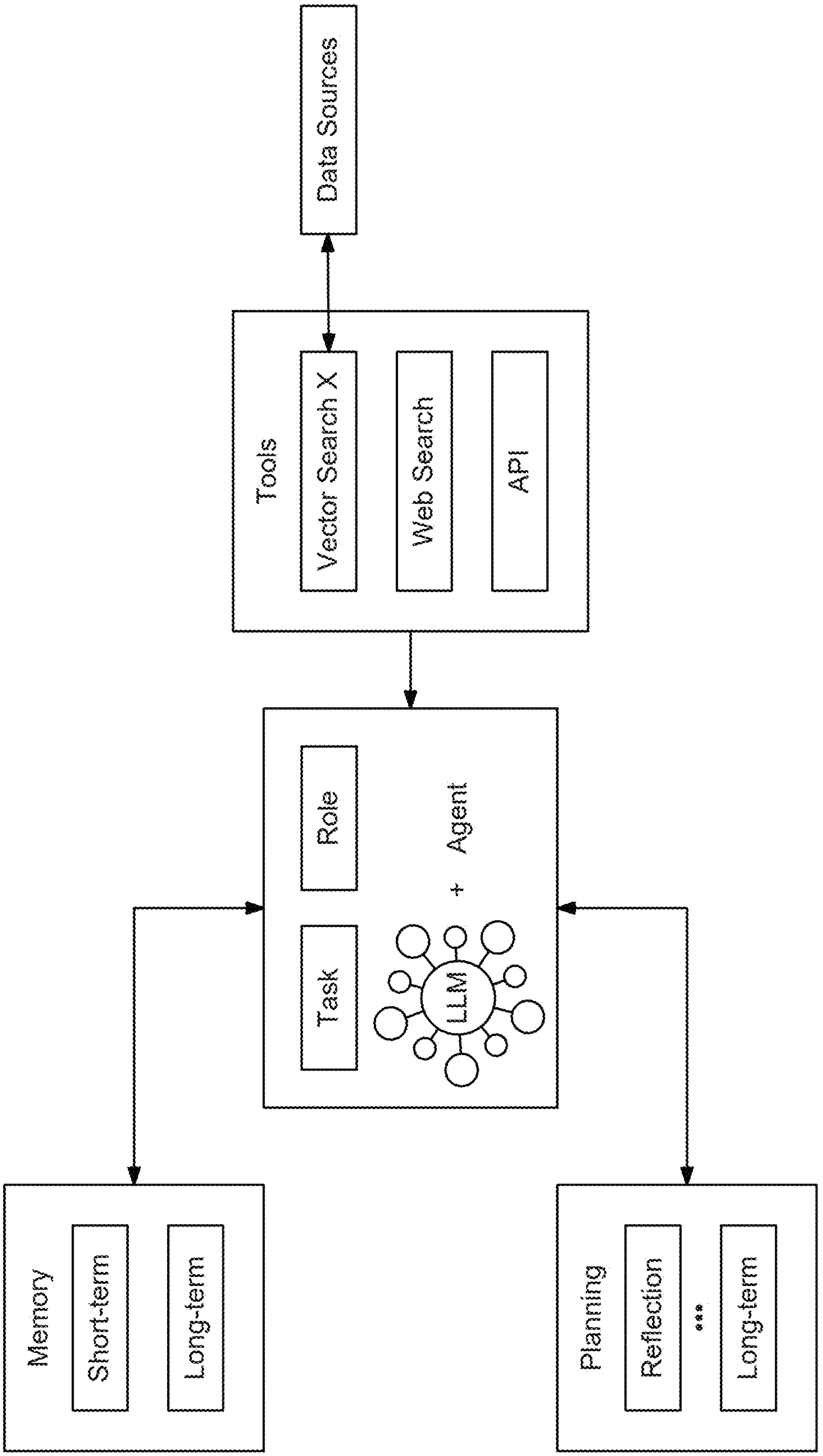
FIG. 13 presents an overview of artificial intelligence (AI) agents of the networking platform.

FIG. 13 illustrates an overview of artificial intelligence (AI) agents. Agentic intelligence forms the foundation of Agentic Retrieval-Augmented Generation (Agentic RAG) systems, enabling them to move beyond the static and reactive behavior of conventional RAG pipelines. By integrating autonomous agents capable of dynamic decision-making, iterative reasoning, and collaborative workflows, Agentic RAG systems exhibit enhanced adaptability, robustness, and precision.

In essence, and as depicted in FIG. 13, an AI agent comprises:

- LLM with defined Role and Task: The LLM serves as the agent's primary reasoning engine and dialogue interface. It interprets user queries, executes internal reasoning, generates responses, and maintains conversational coherence.

- Memory (Short-Term and Long-Term): Memory subsystems capture context and relevant data across interactions. Short-term memory tracks the immediate conversational state and local task context, while long-term memory stores accumulated knowledge, user preferences, and prior agent experiences that can be reused across sessions.
- Planning (Reflection and Self-Critique): A planning component guides the agent's iterative reasoning process through reflection, query routing, error analysis, or self-critique. This component enables the agent to decompose complex tasks into intermediate steps, evaluate alternatives, and refine strategies over multiple interaction turns.
- Tools (Vector Search, Web Search, APIs, etc.): Tool interfaces extend the agent's capabilities beyond pure text generation by enabling access to external resources, real-time data, and specialized computations (e.g., vector search over embeddings, web search, database access, or domain-specific APIs).

Agentic RAG

Agentic RAG combines the capabilities of agentic AI and RAG. In an Agentic RAG system, autonomous, goal-oriented software agents dynamically retrieve, select, and process information. These agents can perform query routing, step-by-step planning, and decision-making, and can invoke other software tools, services, or agents to obtain more accurate or more complete results.

Agentic RAG systems typically maintain explicit memory structures for planning and for recalling previous prompts, user attributes, or session state. This design improves scalability (by orchestrating multiple tools and agents), flexibility (by dynamically selecting strategies based on context), and context awareness (by grounding retrieval and generation in a persistent memory and tool environment).

Key characteristics of Agentic RAG include:

- Autonomous Decision-Making: Agents independently evaluate and manage retrieval strategies based on query complexity, task objectives, and prior outcomes.
- Iterative Refinement: Feedback loops are incorporated to refine retrieval results and generated responses, improving accuracy and relevance over multiple iterations.
- Workflow Optimization: Tasks are orchestrated dynamically, enabling efficient execution in real-time or near-real-time applications, and allowing the system to adapt to resource constraints and latency requirements.

Inference Hardware

The inference hardware, edge-device, and data-center deployment architectures described herein support the scalability, low-latency processing, and real-time feedback required for executing recursive and multicast networkings across distributed participant populations. Moreover, these inference hardware configurations, whether deployed at the edge or within centralized data centers, enable the networking platform to process heterogeneous data streams, update analytics in real time, and iteratively propagate feedback across evaluators, consumers, and formulators at scale.

The lifecycle of an AI model generally involves two distinct phases: a training phase, during which model weights are optimized against a large body of training data, and an inference phase, during which the trained model responds to user prompts or other inputs. In the inference phase, the model is "frozen" (i.e., its weights are fixed) and used to generate outputs, such as predicted token sequences, in response to prompts or context. As model sizes and context windows have increased, the computational and memory requirements during inference have grown substantially, shifting design considerations toward efficiency, low latency, and high throughput. An exemplary system for AI model inference is described below.

Figure 14:
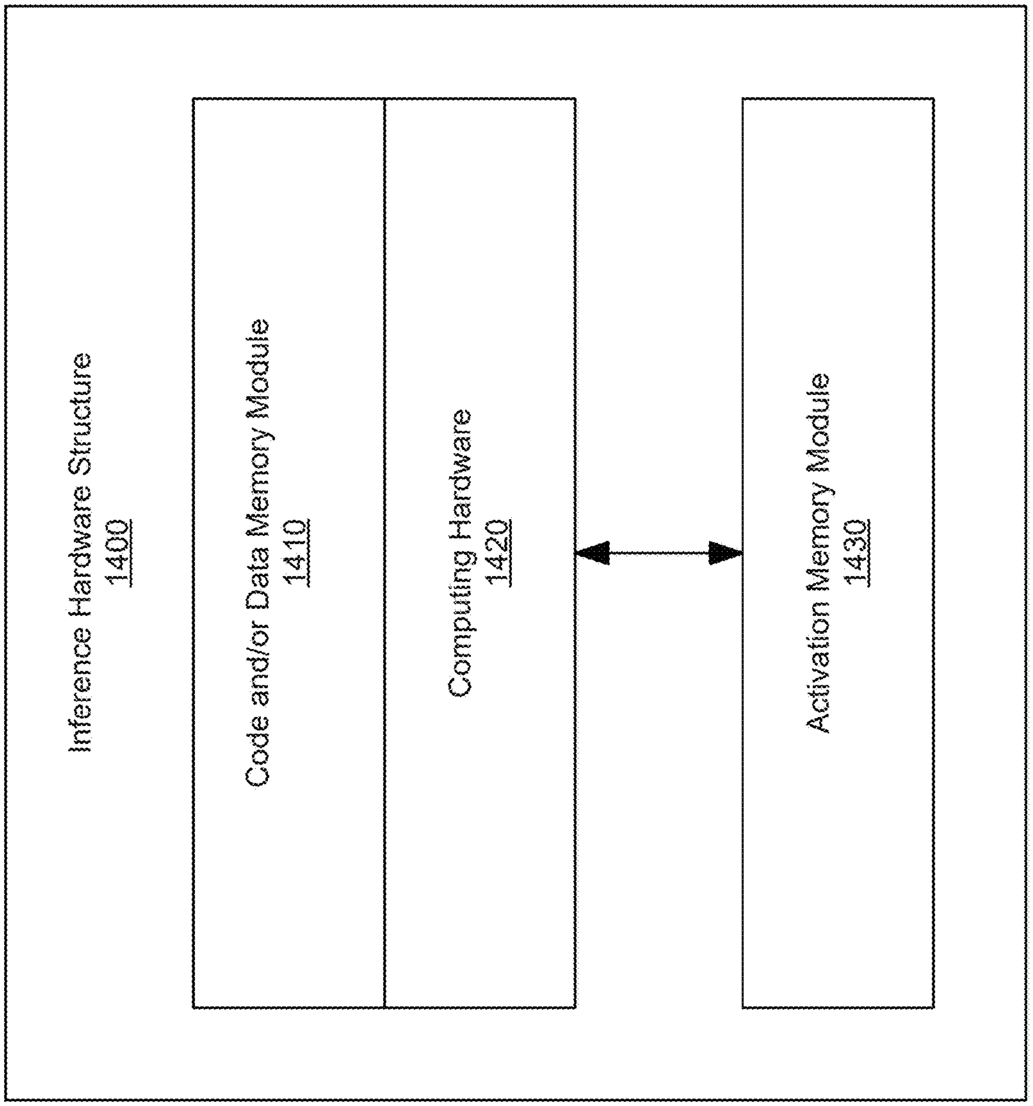
FIG. 14 presents an inference hardware structure used to perform inferencing operations in an example artificial intelligence system of the networking platform.

FIG. 14 shows an inference hardware structure 1400 used to perform inferencing operations in at least one implementation. Inference hardware structure 1400 is described with reference to FIG. 14.

Inference hardware structure 1400 may include a code and/or data memory module 1410 for storing trained model weights, input/output data, and other parameters used to configure neurons or layers of a trained neural network during inference. Inference hardware structure 1400 can include, or be coupled to, code and/or data memory module 1410 for storing graph code or additional software that controls the timing and order in which inference logic is configured. For example, inference logic may be configured by loading weights and other parameters in low-precision numerical formats such as FP16, BF16, FP8, INT8, or INT4.

Code and/or data memory module 1410 can be associated with a dedicated computing resource, such as computing hardware 1420. Computing hardware 1420 may comprise one or more processors that perform mathematical functions, such as linear algebraic operations and matrix computations. These mathematical functions are performed on information stored in code and/or data memory module 1410, producing results that are stored in an activation memory module 1430.

Executable code (e.g., graph code) can load weights and other parameter information into computing hardware 1420. Code and/or data memory module 1410 may be used during forward propagation of input data and/or weight parameters during inference, producing results that may include intermediate values or activations (e.g., one or more output values from a layer or neuron of the trained neural network) stored in activation memory module 1430.

Code and/or data memory module 1410 and activation memory module 1430 may be implemented as separate memory structures, as a combined memory structure, or as partially combined and partially separate structures. Any portion of code and/or data memory module 1410 and/or activation memory module 1430 may comprise other on-chip or off-chip memory, such as a processor's L1, L2, or L3 cache, or system memory. Any portion of these modules may be internal or external to one or more processors or other hardware logic devices or circuits.

Code and/or data memory module 1410 and/or activation memory module 1430 may be implemented using cache memory, dynamic random access memory (DRAM), static random access memory (SRAM), non-volatile memory (e.g., flash memory), high-bandwidth memory (HBM), double-data-rate (DDR) RAM, single-data-rate (SDR) RAM, or other storage technologies. The choice of whether each module (e.g., each code and/or data memory module 1410 and each activation memory module 1430) is internal or external to a processor (e.g., DRAM vs. SRAM vs. flash vs. HBM vs. DDR RAM vs. SDR RAM) may depend on various factors, including available on-chip versus off-chip storage, the latency requirements of inference functions, batch size, and other performance constraints. Code and/or data memory module 1410 and/or activation memory module 1430 may also be associated with larger off-chip storage such as DRAM, NVMe devices, solid-state drives, or disk-based storage to support low-latency inference at scale.

Computing hardware 1420 may comprise one or more processors or other hardware logic devices or circuits. A processor may include one or more of the following: central processing units (CPUs), graphics processing units (GPUs), fixed-function units, or other specialized units. Code and/or data memory module 1410 and activation memory module 1430 may share a processor or other hardware logic device or circuit; alternatively, they may be associated with different processors or hardware logic devices, or with a combination of shared and distinct processors and logic resources.

In some implementations, computing hardware 1420 comprises one or more processors, wherein each processor may include at least one of: an application-specific integrated circuit (ASIC), such as a tensor processing unit (TPU), a neural processing unit (NPU), an inference processing unit (IPU), or other domain-specific processing units. Each processor of computing hardware 1420 may include CPU hardware, GPU hardware, or other hardware such as field-programmable gate arrays (FPGAs), in-memory-compute (IMC) hardware, or other domain-specific hardware. In some implementations, computing hardware 1420 is implemented as a system-on-a-chip (SoC).

Inference hardware structure 1400 may be used in conjunction with ASICs (such as TPUs or NPUs), IPUs, or other domain-specific processing units. In some implementations, inference hardware structure 1400 is used in conjunction with CPU hardware, GPU hardware, or other hardware such as FPGAs or IMC hardware. In other implementations, inference hardware structure 1400 itself may be implemented as a SoC.

Inference hardware structure 1400 may further include hardware logic that directs the use of computational resources in conjunction with weight values, other parameters, input/output data, and other information corresponding to one or more layers of neurons within a trained neural network. In one implementation, inference hardware structure 1400 includes a single memory-module/compute pairing (e.g., code and/or data memory module 1410 paired with computing hardware 1420). In other implementation, inference hardware structure 1400 includes multiple memory-module/compute pairings, with each pairing producing results that are stored in activation memory module 1430.

Inference hardware structure 1400 may further include one or more interconnect interfaces to receive input data, send output data, or transmit data between hardware components (e.g., within a node/server or across racks of servers). Such interconnects may include, for example, PCIe, CXL, NVLink, Ethernet, UALink, or others. These interconnects may carry command signals, dataflow control signals, and memory-transfer operations that regulate the order and timing of inference operations.

Figure 15:
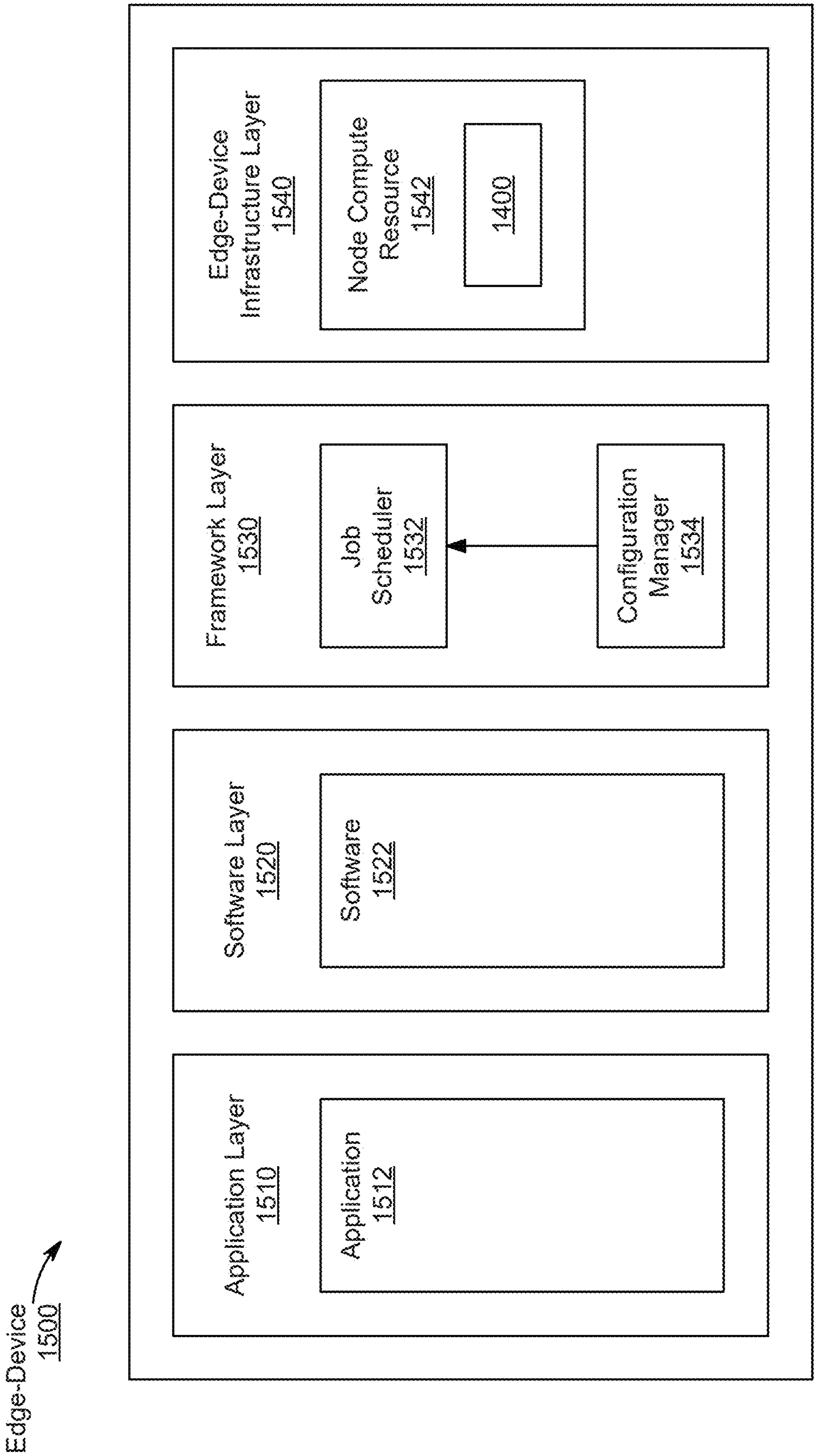
FIG. 15 presents an example schematic of an edge-device inference system.
Figure 16:
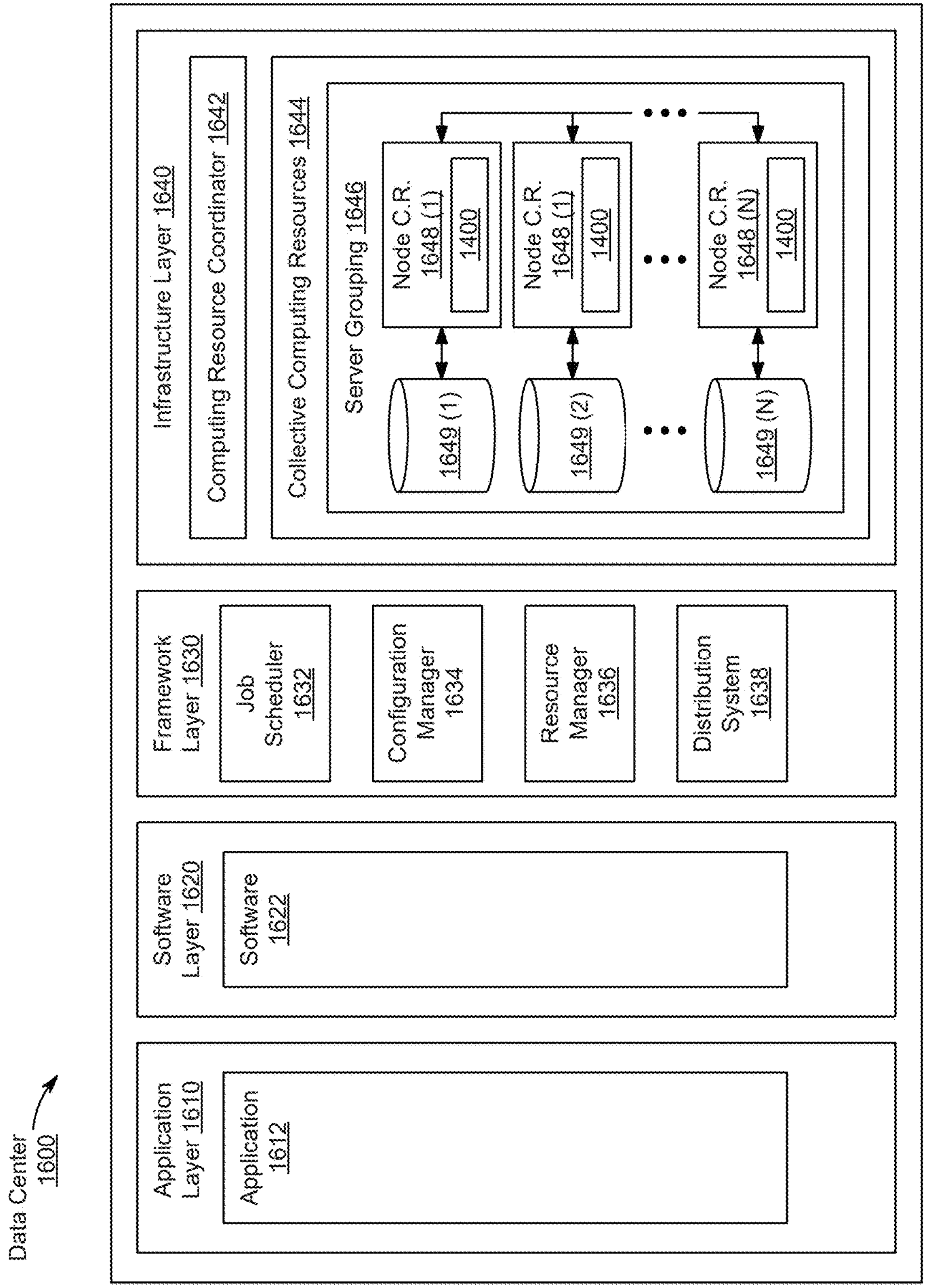
FIG. 16 presents an example schematic of a data center that can execute inference operations.

Inference hardware structure 1400 may operate as a standalone component, for example in an edge-device system as shown in FIG. 15, or may be integrated within a larger computing system, cluster, or data-center environment, as depicted in FIG. 16. In such standalone and/or integrated environments, one or more computing hardware 1420 structures may form a portion of a node computing resource within an infrastructure layer, while software and framework layers coordinate loading of model weights and parameters, dispatch inference workloads, and retrieve predicted outputs. The following sections provide further detail regarding inference hardware within standalone and integrated environments.

Edge-Device Inference System with Inference Hardware

As shown in FIG. 15, an edge-device inference system 1500 is an example of an integrated system for performing inference using a trained model, such as a trained neural network. Edge device system 1500 may ingest data at the edge, providing real-time output data; low latency in such an environment can significantly improve inference performance.

FIG. 15 illustrates an exemplary edge-device inference system 1500. Edge device system 1500 can include an application layer 1510, a software layer 1520, a framework layer 1530, and an edge-device infrastructure layer 1540. These layers cooperate to execute inference operations using a trained neural network with fixed, known weight parameters.

Edge-device infrastructure layer 1540 may include a node compute resource 1542. Node compute resource 1542 comprises inference hardware structure 1400 and may be implemented as a SoC. Node compute resource 1542 may include, in addition to the one or more processors of inference hardware structure 1400, at least one CPU or other processors (including accelerators such as ASICs, GPUs, FPGAs, NPUs, etc.), memory (e.g., DRAM, HBM, flash, DDR RAM, SDR RAM, etc.), network input/output devices (e.g., network interface cards (NICs)), network switches, power modules, cooling modules, and other supporting components.

Framework layer 1530 may include a job scheduler 1532 and a configuration manager 1534. Framework layer 1530 provides a framework to support software 1522 in software layer 1520 and one or more applications 1512 in application layer 1510. Framework layer 1530 can implement a runtime coordination system that adjusts inference execution based on the physical constraints of edge device system 1500. Job scheduler 1532 may assign inference tasks to available compute units in node compute resource 1542, while configuration manager 1534 may configure software layer 1520 and framework layer 1530, load trained model files, configure memory buffers, and establish runtime properties such as quantization settings.

Software 1522 in software layer 1520 may include an operating system, device drivers, local data stores, and service processes configured to receive inference requests, pre-process input data, interface with applications 1512 in application layer 1510 (e.g., machine learning applications), and return predicted outputs.

Applications 1512 in application layer 1510 may include one or more types of applications used by portions of node compute resource 1542. These applications may include machine-learning applications, inference engines, and machine-learning framework software (e.g., PyTorch, TensorFlow) as well as domain-specific applications that rely on inference services.

Inference logic corresponding to inference hardware structure 1400 is used to perform inference operations as described herein in conjunction with FIG. 14. In particular, inference logic within inference hardware structure 1400 can be used in edge device inference system 1500 for operations based, at least in part, on weight parameters of a trained neural network. Edge device inference system 1500 may include tools, services, software, or other resources to predict or infer information using one or more trained machine-learning models.

Data Center Inference System with Inference Hardware

FIG. 16 illustrates a data center 1600 that may include an application layer 1610, a software layer 1620, a framework layer 1630, and an infrastructure layer 1640. Data center 1600 may execute inference operations such as forward-propagation computations to generate predicted outputs from input data, while providing increased efficiency, scalability, and reduced latency.

Data center 1600 can be organized into a multilayer architecture in which infrastructure layer 1640 comprises a computing resource coordinator 1642, collective computing resources 1644, server grouping 1646, and a plurality of node computing resources (node C.R.s) 1648(1)-1648(N), where N is a positive integer. Each node C.R. 1648(*i*) may include one or more CPUs or other processors (e.g., accelerators such as ASICs, GPUs, FPGAs, etc.), memory storage devices 1649(1)-1649(N) (e.g., DRAM, NVMe, solid-state drives (SSDs), or disk-based storage devices), network input/output components, network switches, virtual-machine hosts, power regulation modules, and cooling assemblies. In some implementations, each node C.R. corresponds to a complete physical or virtual server.

Collective computing resources 1644 may include at least one server grouping 1646, representing a logical grouping of node C.R.s such as one or more server racks. Server grouping 1646 may be deployed in a single data-center location (non-distributed) or geographically distributed. Server grouping 1646 and/or collective computing resources 1644 may pool compute, network, or memory resources to process inference workloads.

Computing resource coordinator 1642 configures, allocates, manages, and coordinates each node C.R. and resources within server grouping 1646 and/or collective computing resources 1644. Computing resource coordinator 1642 (e.g., Kubernetes, Slurm, or other resource managers) may coordinate hardware and software resources, such as compute, storage, and network capabilities of infrastructure layer 1640. Computing resource coordinator 1642 may perform software-defined infrastructure control operations to allocate inference workloads in data center 1600.

Framework layer 1630 may include a job scheduler 1632, a configuration manager 1634, a resource manager 1636, and a distribution system 1638. Framework layer 1630 supports software 1622 in software layer 1620 and one or more applications 1612 in application layer 1610. For example, framework layer 1630 may receive inference queries or pre-processed input data from software layer 1620 or application layer 1610 and return predicted outputs for post-processing and delivery to users or client systems.

Job scheduler 1632 may be implemented using a distributed processing framework, such as Apache Spark™, and can leverage distribution system 1638 for large-scale data processing. Distribution system 1638 may provide input data, model files, and other assets needed for inference workloads. Job scheduler 1632 coordinates workloads across the layers of data center 1600. Configuration manager 1634 may configure software layer 1620 and framework layer 1630 (including Spark™ and distribution system 1638), generate configurations specifying model versions, precision formats, and hardware requirements, and provide such configurations to resource manager 1636. Resource manager 1636, in conjunction with computing resource coordinator 1642, identifies suitable node C.R.s 1648(1)-1648(N) for each workload, after which job scheduler 1632 dispatches the workloads to the selected nodes.

Software 1622 in software layer 1620 may include operating systems, database software, model-serving software, data-preparation software, and other components supporting inference operations and integration with applications.

Applications 1612 in application layer 1610 may be used by one or more node C.R.s 1648(1)-1648(N), collective computing resources 1644, and/or distribution system 1638. Applications 1612 may include machine-learning applications, analytics services, or other applications that rely on inference pipelines.

Trained machine-learning models corresponding to one or more trained neural networks can be used within data center 1600 to infer or predict information at scale.

The following description illustrates dataflow through data center 1600. This dataflow includes receipt of user input or pre-processed data, task configuration and scheduling within framework layer 1630, and execution of inference on node C.R.s 1648(1)-1648(N) to return predicted outputs. This discussion demonstrates how the layered architecture of data center 1600 supports efficient processing, parallelism, and low-latency delivery of inference results.

Example: Dataflow through Data Center Inference Hardware

Dataflow through data center 1600 may begin when an inference request is received at application layer 1610, for example as a data stream of user prompts or as data from an edge device. Received text may be stored in system memory (e.g., DRAM). Software layer 1620 may perform tokenization or other pre-processing operations on a host CPU, prepare one or more inference workloads corresponding to the tokenized inputs, and send these workloads to framework layer 1630 for scheduling and execution.

Framework layer 1630 coordinates distribution of the inference workloads. Job scheduler 1632 may consult resource manager 1636 to determine which node C.R.s 1648(1)-1648(N) have sufficient available compute and memory to execute the workloads efficiently. Resource manager 1636, in conjunction with computing resource coordinator 1642, identifies suitable node C.R.s. Model files, weight tensors, and other runtime data may be loaded from distribution system 1638 (e.g., NVMe or a distributed file-system) into DRAM and then into accelerator memory such as HBM.

Execution of inference workloads occurs within the allocated node C.R.s using one or more instances of inference hardware structure 1400. Inference results, including intermediate activations or final predicted outputs, may be returned from node C.R.s to job scheduler 1632, which can aggregate outputs when multiple nodes are involved. Framework layer 1630 then returns predicted outputs to software layer 1620 and/or application layer 1610 for post-processing, formatting, or delivery. The layered architecture of data center 1600 thus supports coordinated data movement and scalable execution of inference workloads.

MCP Architecture

Within the networking platform, the Model Context Protocol (MCP) provides a standardized mechanism by which artificial intelligence agents and analytics modules access, for example, heterogeneous data sources, including evaluator data, consumer feedback, formulation information, and external databases, used throughout networking execution.

Figure 17:
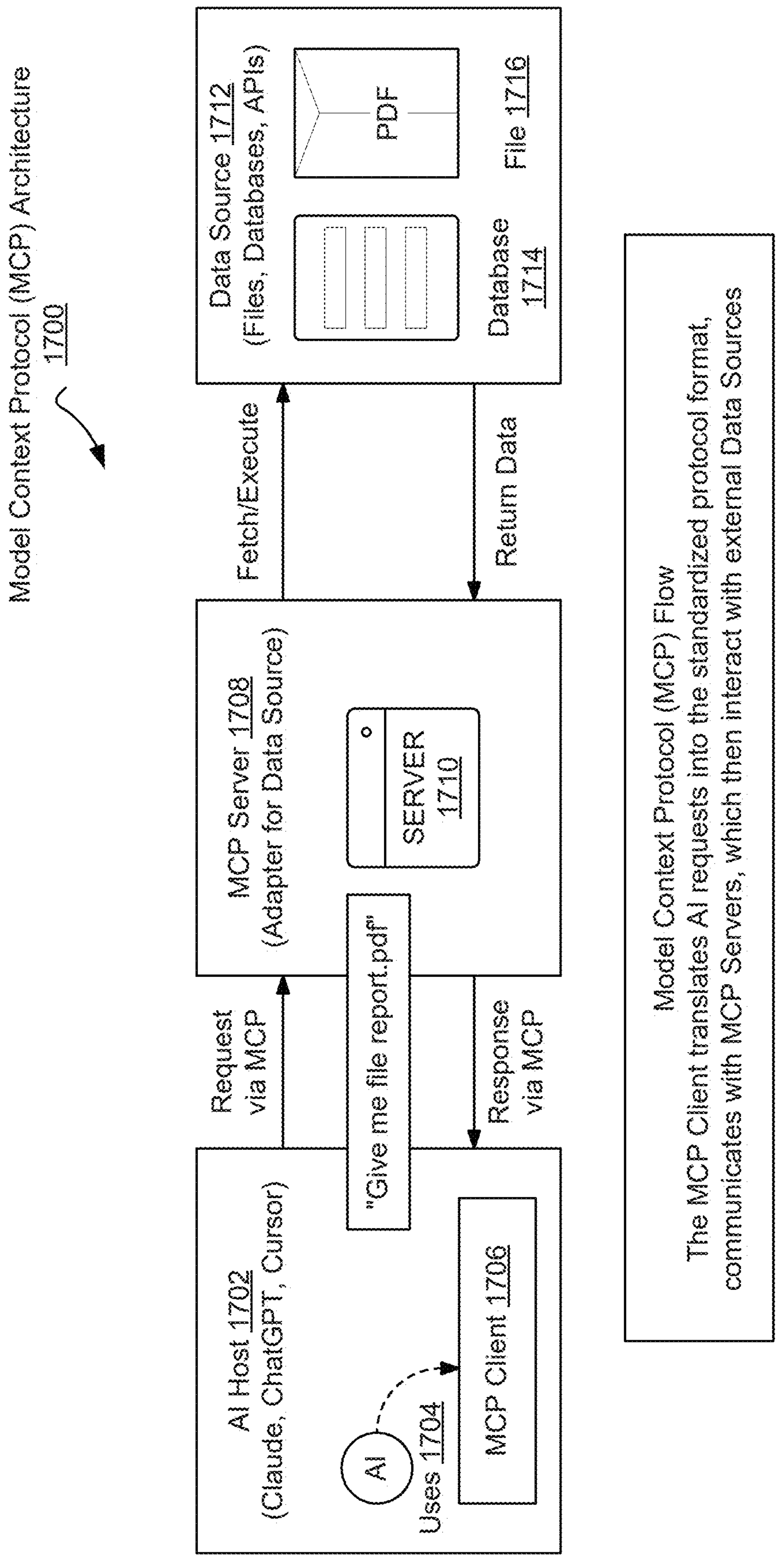
FIG. 17 presents an example system architecture diagram illustrating the Model Context Protocol (MCP) architecture of the networking platform.

FIG. 17 is a system architecture diagram illustrating the Model Context Protocol (MCP) architecture 1700 and data flow between core components for processing AI requests through standardized protocol communication and interaction with external data sources.

The Model Context Protocol addresses the challenge of enabling AI applications to access external data sources, tools, and services in a standardized, secure, and interoperable manner. Traditional AI systems often require custom integration code for each external service, resulting in fragmented implementations and significant maintenance burdens. The MCP architecture solves this problem by introducing a universal protocol that acts as a standardized communication layer between AI applications and external systems, enabling any AI application to communicate with any MCP-compatible server without implementing bespoke integration code for each pairing.

The MCP architecture comprises three core components: an MCP host, an MCP client, and an MCP server, which collaborate to facilitate seamless communication between AI applications, external tools, and data sources. The architecture embodies (i) standardization, via a protocol specification defining message formats and communication patterns; (ii) modularity, via separation between AI logic and data-access logic; (iii) extensibility, via the ability to add new capabilities without modifying existing components; and (iv) security, via built-in authentication and authorization mechanisms.

The AI Host 1702 represents an AI application that provides the environment for executing AI-based tasks while running the MCP client. Examples include Claude Desktop (for AI-assisted content creation), ChatGPT (for conversational AI), and Cursor (for AI-powered integrated development and code-completion). AI Host 1702 integrates interactive tools and data to enable smooth communication with external services, hosts the MCP client, and ensures communication with external MCP servers.

Within AI Host 1702, an AI component 1704 represents the core artificial intelligence model or reasoning engine that generates requests, processes information, and produces outputs. AI component 1704 is operatively connected to MCP Client 1706, indicating that the AI component uses MCP Client 1706 to communicate with external systems. This connection enables AI component 1704 to access external functionalities and data sources, thereby augmenting its inherent knowledge with real-time information, user-specific data, and external computational resources.

MCP Client 1706 operates within the host environment as the protocol implementation layer. MCP Client 1706 acts as an intermediary component, maintaining a one-to-one communication link with a corresponding MCP Server 1708. Operating on behalf of the host, MCP Client 1706 initiates requests to MCP Server 1708, queries available functions, and retrieves responses describing the server's tools, resources, and capabilities. This design allows the host to access and use external functionalities provided by MCP servers 1708 in a uniform manner.

MCP Client 1706 performs request translation by converting high-level AI requests into standardized MCP protocol messages with defined schemas and data types. MCP Client 1706 also performs capability discovery by querying MCP Server 1708 to determine available tools, resources, and prompts. MCP Client 1706 manages connection lifecycle operations, including establishing secure connections, maintaining connection state, implementing authentication flows, and handling errors. MCP Client 1706 processes notifications from MCP servers 1708, providing real-time updates about task progress and system status, and performs sampling to gather data on tool usage and performance to support optimization and informed decision-making. MCP Client 1706 communicates with MCP Servers 1708 via a transport layer that facilitates secure, reliable data exchange.

A request via the MCP communication pathway extends from AI Host 1702 to MCP Server 1708, indicating transmission of requests using the Model Context Protocol. Communication begins with an initial request from MCP Client 1706 querying MCP Server 1708 regarding available functions, tools, resources, and capabilities. The protocol defines a structured message format including a message identifier, operation type, parameters, authentication information, and metadata.

An exemplary request, "Give me file report.pdf," demonstrates a use case in which AI component 1704 requests access to a specific file resource. MCP Client 1706 translates this high-level request into a structured MCP protocol message specifying a resource-retrieval operation, identifying the target resource, including necessary parameters, and providing authentication credentials.

MCP Server 1708 enables the MCP host and client to access external systems and execute operations, functioning as an adapter that mediates access to external data sources. MCP servers 1708 implement an adapter pattern that encapsulates the logic required to interact with specific data sources, translating standardized MCP protocol operations into native operations required by those systems. As a result, adding support for new data sources typically requires only the implementation of a new MCP server 1708, without changes to AI applications or MCP clients 1706.

MCP Server 1708 provides three core capabilities: tools, resources, and prompts. Tools allow MCP Server 1708 to invoke external services and APIs to execute operations on behalf of AI models. When a host application needs to perform an operation, it first queries MCP Server 1708 via MCP Client 1706 to obtain a list of available tools and their capabilities. Based on task context, the host selects an appropriate tool and issues an invocation request via MCP Client 1706. MCP Server 1708 then executes the corresponding operation through an external service or API and returns the result to MCP Client 1706, which forwards the result to the host. For example, if an AI model requires real-time weather data, the host identifies a weather tool from the server's advertised capabilities, MCP Server 1708 performs the API call, and the resulting data is returned to the host.

Unlike traditional function-calling interfaces confined within a single model or framework, MCP tools are described and accessed through a standardized, model-agnostic protocol. This design allows tools to be dynamically discovered, described, and invoked across heterogeneous AI systems, ensuring cross-platform interoperability. MCP tools support bi-directional communication between a host and a service, enabling richer interactions such as asynchronous updates or event streaming. Once configured, these tools follow a supply-and-consume model that promotes modularity and reusability, allowing independently developed tools to interoperate seamlessly and improving system efficiency and extensibility.

Resources provide access to structured and unstructured datasets that MCP Server 1708 can expose to AI models. These datasets may reside in local storage, databases, or cloud platforms. When an AI model requests specific data, MCP Server 1708 retrieves and processes the relevant information, enabling the model to make data-driven decisions. For example, a recommendation system may access customer interaction logs, while a document summarization task may query a text repository. In the "report.pdf" example, MCP Server 1708 uses its resources capability to access the requested file from available sources.

Prompts are predefined templates and workflows that MCP Server 1708 generates and maintains to optimize AI responses and streamline repetitive tasks. They provide consistency in responses and improve task execution efficiency. For example, a customer-support chatbot may use prompt templates to ensure uniform and accurate responses, while an annotation workflow may rely on predefined prompts to maintain consistency in labeling across multiple annotators.

A response via the MCP communication pathway extends from MCP Server 1708 back to AI Host 1702, indicating transmission of responses using the Model Context Protocol. Upon receiving a request, MCP Server 1708 responds with an initial response listing available tools, resources, and prompts that MCP Client 1706 can use. The response message includes a message identifier, status indicator, response payload, and metadata. MCP Client 1706 processes the response and provides it to AI component 1704 within AI Host 1702.

A fetch/execute communication pathway extends from MCP Server 1708 to a Data Source 1712, indicating that MCP Server 1708 invokes external APIs or otherwise executes operations to retrieve and process information from external data sources. MCP Server 1708 may invoke external APIs using whatever protocols, authentication mechanisms, and access methods are required by those data sources. This isolation of data-source-specific details within MCP Server 1708 ensures that MCP Client 1706 and AI Host 1702 remain agnostic to whether data is sourced from SQL databases, REST APIs, file systems, or other sources.

Data Source component 1712 represents external systems and data repositories that MCP Server 1708 can access to fulfill client requests. Data Source 1712 can include three primary categories: files 1716, databases 1714, and APIs. Files 1716 represent file-system resources and local storage containing documents such as PDF files, plain-text files, structured data files, and binary files. Databases 1714 represent database systems that store structured and unstructured data, providing persistent data storage that MCP Server 1708 can query to retrieve information for AI models. APIs represent Internet-based services, web APIs, cloud platforms, and remote computational resources accessible via network protocols.

A return data communication pathway extends from Data Source 1712 back to MCP Server 1708, indicating that retrieved data or operation results are returned from external data sources to MCP Server 1708 for processing and subsequent delivery to MCP Client 1706. This bi-directional data flow shows that MCP Servers 1708 invoke APIs or execute fetch operations to access external data sources and then process and return results through the MCP workflow back to AI Host 1702.

The MCP flow can be summarized as: "The MCP Client translates AI requests into standardized protocol format, communicates with MCP Servers, which then interact with external Data Sources." This captures the essential data flow and transformation in MCP architecture 1700. Translation from AI requests to standardized protocol messages bridges the gap between how AI systems express needs and how protocols structure messages. Communication between MCP Clients 1706 and MCP Servers 1708 occurs via the transport layer according to the protocol specification, enabling interoperability between independently developed components. Interactions between MCP Servers 1708 and external Data Sources 1712 encapsulate the complexity and diversity of backend systems, presenting a uniform interface to clients.

The complete workflow proceeds as follows: AI component 1704 generates a request based on user input or autonomous operation; MCP Client 1706 translates the request into standardized protocol format; MCP Client 1706 transmits the request via MCP to MCP Server 1708, querying available capabilities and requesting operations or data; MCP Server 1708 determines which capabilities are needed; MCP Server 1708 executes a fetch/execute operation to interact with appropriate Data Source 1712; Data Source 1712 processes the operation and returns requested data to MCP Server 1708; MCP Server 1708 processes the returned data and formulates a response; MCP Server 1708 transmits the response via MCP back to AI Host 1702; MCP Client 1706 processes the response and provides it to AI component 1704; and AI component 1704 uses the data or results to complete its task.

For the exemplary request "Give me file report.pdf," AI component 1704 generates a retrieval request; MCP Client 1706 translates it into standardized MCP format specifying a resource retrieval; MCP Server 1708 receives the request and identifies its resources capability; MCP Server 1708 performs a fetch operation targeting file data source 1716; file data source 1716 locates and returns file data to MCP Server 1708; MCP Server 1708 formulates a response containing the PDF or a reference thereto; MCP Server 1708 transmits the response back to AI Host 1702; and MCP Client 1706 delivers the file data to AI component 1704 for display or further processing.

This architecture demonstrates a modular and extensible system in which MCP Client 1706 acts as an intermediary that translates AI requests into standardized protocol messages, maintains a one-to-one communication link with its corresponding MCP Server 1708, and enables seamless integration between AI applications and diverse external systems (including files 1716, databases 1714, and APIs within Data Source 1712). The standardized protocol format ensures cross-platform interoperability, allowing different AI hosts 1702 to communicate with various MCP Servers 1708 and access heterogeneous data sources 1712 via a unified interface. The adapter architecture of MCP Server 1708 provides a consistent abstraction layer that shields AI Hosts 1702 from implementation details of different data sources, enabling AI applications to access files 1716, databases 1714, and APIs through a single standardized protocol without requiring custom integration code for each data source type.

MCP Workflow

Figure 18:
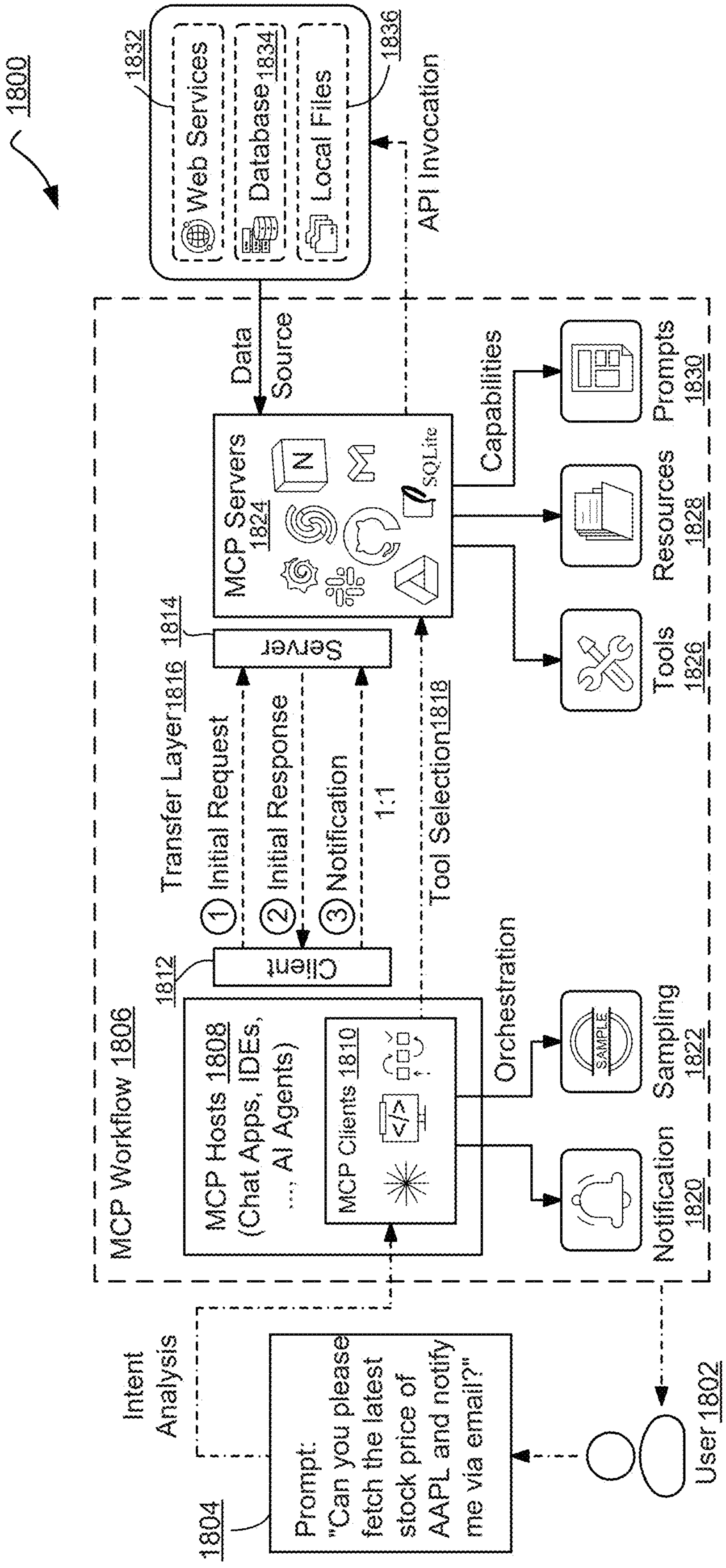
FIG. 18 presents an example system architecture illustrating Model Context Protocol (MCP) workflow of the networking platform.

FIG. 18 is a detailed system architecture diagram illustrating a complete Model Context Protocol (MCP) workflow 1800 and the comprehensive interaction among core components, subcomponents, communication pathways, and external systems for processing user requests through multiple stages, including intent analysis, tool selection, and API invocation.

The system architecture comprises a user entity 1802 operatively connected via a communication pathway to a prompt input interface 1804. User entity 1802 initiates requests and receives notifications from MCP workflow system 1806.

Prompt input interface 1804 presents an exemplary user query: "Prompt: 'Can you please fetch the latest stock price of AAPL and notify me via email?'" This example illustrates a typical use case in which the user requests real-time financial market data for Apple Inc. (ticker AAPL) from external data sources and also requests automatic delivery of the results via email. The example demonstrates that the system can process complex, multi-step requests requiring both data retrieval and subsequent communication actions. Prompt input interface 1804 is operatively connected to MCP workflow system 1806, indicating the initial direction of information flow from the user into the MCP workflow.

MCP workflow system 1806 comprises the three core components of the MCP architecture: MCP host, MCP client, and MCP server, which jointly enable secure, well-managed communication between AI applications, external tools, and data sources. MCP hosts 1808 (labeled "Chat Apps, IDEs, . . . , AI Agents") indicate non-limiting examples of applications functioning as MCP hosts. Examples include Claude Desktop, Cursor, and autonomous AI agents. MCP host 1808 provides the environment for executing AI tasks while running the MCP client; it integrates interactive tools and data to enable communication with external services and establishes the runtime environment required for MCP client operations.

In the host-client-server architecture, the MCP client acts as an intermediary, maintaining a one-to-one communication link with a corresponding MCP server. The MCP client initiates requests, queries available functions, and retrieves responses describing tools, resources, and capabilities, while also processing notifications and performing sampling for optimization purposes. MCP client 1812 communicates with MCP servers 1824 via transport layer 1816, ensuring secure, reliable data exchange between host 1808 and external resources.

An Intent Analysis component indicates that MCP client 1812 analyzes the intent of user prompts. When user prompt 1804 is sent to MCP client 1812, MCP client 1812 interprets semantic content, contextual meaning, and operational requirements to determine the user's intent and required system actions (e.g., retrieve stock data and send email).

An Orchestration component indicates coordination functions performed by MCP client 1812. Orchestration governs sequencing and management of operations as MCP client 1812 interacts with MCP servers 1824 and manages workflow from initial request through final notification.

A Notification feature 1820 indicates notification functionality connected back to user entity 1802. Notifications include task completion confirmations, progress updates, error messages, and result payloads. MCP client 1812 also performs sampling 1822, collecting data about tool usage and performance to support system optimization and resource planning.

Transport layer 1816 facilitates bi-directional data exchange between clients 1812 and servers 1814, managing transmission of initial requests, server responses describing capabilities, and notifications. Within transport layer 1816, communication between MCP client 1812 and MCP server 1814 follows three stages:

Initial Request: Communication flows from MCP client 1812 to MCP server 1814. MCP client 1812 sends an initial request querying MCP server 1814 for available functions, tools, resources, and capabilities. In the AAPL example, the initial request seeks confirmation of available stock-price tools and email-notification tools.

Initial Response: Communication flows from MCP server 1814 back to MCP client 1812. MCP server 1814 responds with an initial response listing available tools, resources, and prompts that MCP client 1812 can use for task execution, such as tools for retrieving stock quotes and sending email notifications.

Notification: A bi-directional notification channel enables ongoing updates between MCP servers 1814 and MCP clients 1812. Once a connection is established, the system maintains a continuous exchange of notifications 1820, ensuring that changes in server status and progress updates are communicated to MCP client 1812 in real time.

The notation "1:1" between "Client" 1812 and "Server" 1814 indicates a one-to-one communication link between an MCP client and its corresponding MCP server during request and response exchange, establishing a dedicated communication relationship for each client-server pair.

A Tool Selection component 1818 within transport layer 1816 indicates tool selection functionality. Based on task context and intent analysis, host 1808 selects appropriate tools from those available on MCP server 1824 and issues invocation requests via MCP client 1812. For the AAPL example, tool selection 1818 would select (i) a financial-data tool capable of accepting a ticker symbol and returning current price information, and (ii) an email-service tool capable of composing and delivering email messages.

MCP servers 1824 are depicted along with icons representing various service integrations (e.g., GitHub, email/messaging, Google Drive, code repositories, SQLite). MCP servers 1824 provide three core capabilities: tools 1826, resources 1828, and prompts 1830. Tools 1826 enable MCP servers 1824 to invoke external services and APIs and return results through a standardized, model-agnostic protocol; resources 1828 provide access to structured and unstructured datasets; and prompts 1830 define templates and workflows to standardize and optimize AI responses.

External data sources include web services 1832 (representing Internet-based services, APIs, cloud platforms, and remote computation), databases 1834 (representing structured and unstructured data repositories), and local files. API invocation 1836 indicates that these data sources are accessed via APIs. MCP server 1824 invokes external APIs, retrieves results, and returns processed data through MCP workflow system 1806.

The complete workflow proceeds as follows: user 1802 sends prompt 1804; MCP client 1812 performs intent analysis; MCP client 1812 selects tools 1826 via MCP server 1824; MCP server 1824 invokes external APIs 1836 to retrieve and process information from web services 1832, databases 1834, and local files; and MCP workflow system 1806 notifies user 1802 of results via notification pathway 1820. Communication follows the structured process of initial request, initial response, and ongoing notifications, enabling high-performance, synchronized interactions with external resources.

For the exemplary prompt "Can you please fetch the latest stock price of AAPL and notify me via email?", user 1802 submits prompt 1804 to MCP client 1812. MCP client 1812 identifies a need for financial-data retrieval and email notification, sends an initial request via transport layer 1816 to MCP server 1814, receives an initial response enumerating available financial and email tools, and coordinates selection of appropriate tools 1826. MCP server 1824 then invokes a financial-data API 1836 with ticker "AAPL," receives current stock price information from web services 1832, returns this data to MCP client 1812, and subsequently invokes an email-service API 1836 to compose and deliver a notification message containing the stock price to the user's email. Notifications 1820 keep user 1802 informed throughout. A one-to-one communication link between MCP client 1812 and MCP server 1814 provides dedicated, reliable communication, while sampling 1822 gathers performance and usage data for optimization.

This architecture demonstrates a modular, extensible system in which MCP client 1812 maintains a one-to-one link with MCP server 1814 and enables seamless integration between AI applications 1808 and diverse external systems including web services 1832, databases 1834, and local files, while ensuring secure, reliable data exchange through transport layer 1816 throughout workflow 1800, from initial prompt 1804 to final notification 1820.

Artificial Intelligence System Architecture

Figure 19:
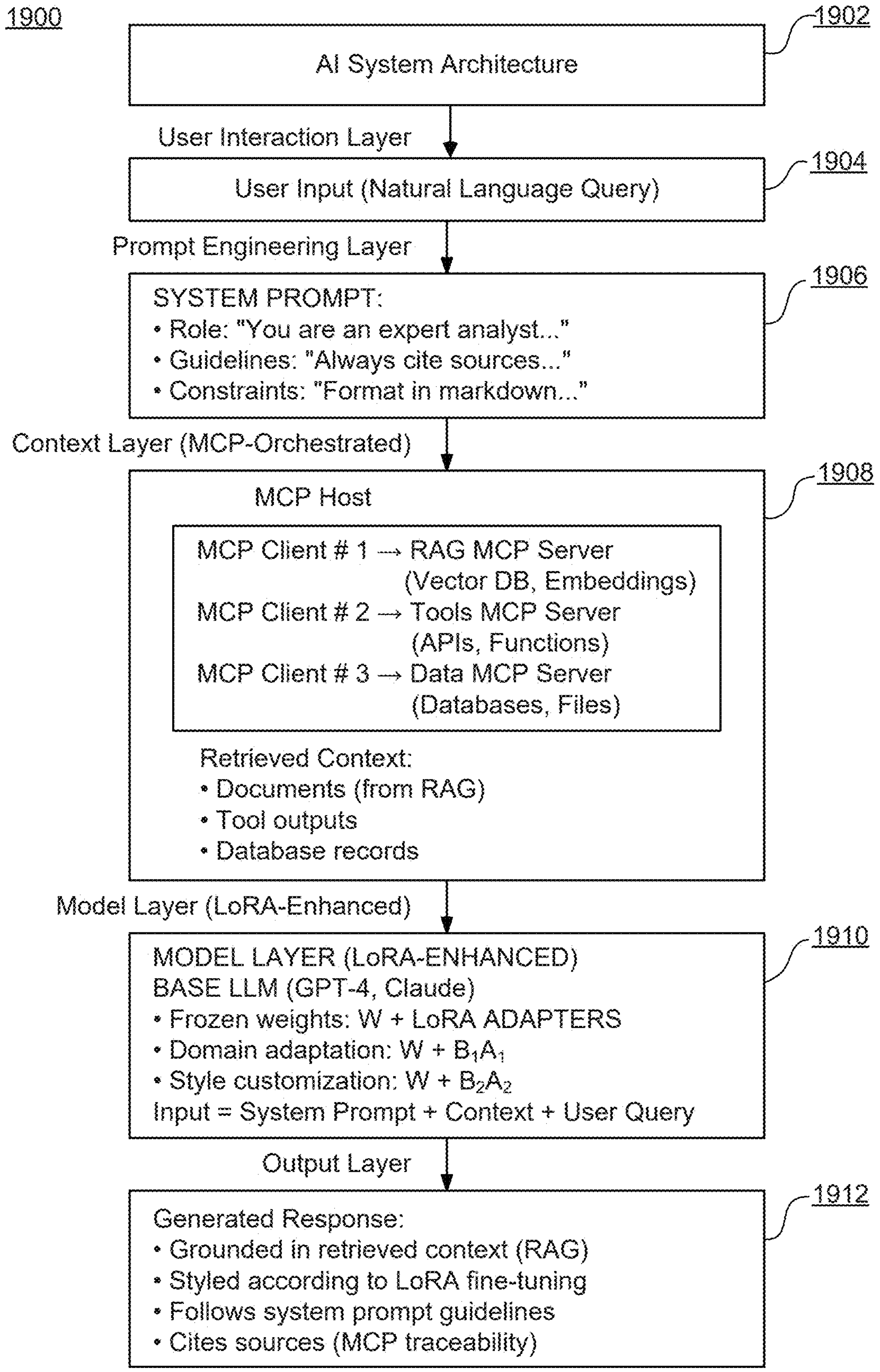
FIG. 19 presents an example artificial intelligence system architecture that integrates multiple technological components to enhance language-model performance of the networking platform.

FIG. 19 illustrates a comprehensive artificial intelligence system architecture 1900 that integrates multiple technological components to enhance language-model performance. The system comprises five principal layers arranged in sequential data flow: a User Interaction Layer, a Prompt Engineering Layer, a Context Layer implementing the Model Context Protocol, a Model Layer enhanced with Low-Rank Adaptation, and an Output Layer.

At the uppermost portion of FIG. 19, User Interaction Layer 1904 receives user input in the form of natural-language queries. Such queries comprise unstructured textual input formulated in human-readable language and serve as the initiating stimulus for subsequent processing. Queries may include interrogative statements, imperative commands, or declarative sentences expressing an informational need or task requirement.

The natural-language query is transmitted from User Interaction Layer 1904 to Prompt Engineering Layer 1906. Prompt Engineering Layer 1906 comprises a system-prompt component that defines operational parameters and behavioral constraints for the language model. The system prompt includes a role definition specifying the persona or expertise domain of the AI agent (e.g., "You are an expert analyst"), guidelines that establish mandatory behaviors (e.g., "Always cite sources"), and constraints specifying output formatting and structure (e.g., "Format in markdown"). This system prompt establishes a persistent behavioral framework that governs response generation across a session or task, providing consistent operational parameters independent of the specific content of individual queries.

The processed query, structured in accordance with system-prompt specifications, is transmitted to Context Layer 1908, labeled "Context Layer (MCP-Orchestrated)." Context Layer 2908 implements the Model Context Protocol and includes an MCP Host application that orchestrates access to external data sources and tools. The MCP Host coordinates and manages multiple MCP client connections, each maintaining a dedicated one-to-one connection with a corresponding MCP server as specified by the MCP architecture.

Within the MCP Host, three MCP clients are illustrated. A first MCP client is connected to a RAG MCP Server that provides access to vector-database storage and embedding generation. The RAG MCP Server performs semantic similarity search by converting textual queries into dense vectors via embedding models, comparing those vectors to pre-indexed document vectors in a vector database, and retrieving documents with high similarity scores. These documents supply contextual information that augments the language model input.

A second MCP client connects to a Tools MCP Server that exposes executable functions extending the language model's capabilities beyond pure text generation. The Tools MCP Server provides access to APIs and computational functions that enable the language model to perform tasks such as mathematical calculations, data transformations, external service invocations, and other programmatic operations. Tools are discoverable via the MCP tool-listing mechanism and invocable via standardized JSON-RPC message exchanges.

A third MCP client connects to a Data MCP Server providing access to structured and unstructured data sources such as relational databases, document stores, and file systems. The Data MCP Server executes queries and retrieves file contents, providing the language model with up-to-date operational data not necessarily present in its pre-training corpus.

Context Layer 2908 aggregates retrieved context from the RAG, Tools, and Data MCP servers. The aggregated context comprises RAG-retrieved documents, tool outputs, and database records or file contents, as explicitly enumerated in FIG. 19. This retrieved context is structured and injected into the language model's input prompt, augmenting the model's pre-trained knowledge with real-time, task-specific, domain-relevant information.

The augmented prompt comprising the system prompt from Prompt Engineering Layer 1906, retrieved context from Context Layer 1908, and the user query from User Interaction Layer 1904—is transmitted to Model Layer 1910, labeled "Model Layer (LoRA-Enhanced)." Model Layer 1910 includes a base LLM (e.g., GPT-4 or Claude) whose pre-trained weights are maintained in a frozen state, represented as matrix W. The frozen weights ensure that original parameters learned during pre-training remain untouched during task-specific adaptation, avoiding the computational and memory cost of full model retraining.

LoRA adapters are operatively coupled to the base LLM to implement Low-Rank Adaptation, a parameter-efficient fine-tuning technique. Each LoRA adapter includes trainable low-rank matrices that, when multiplied, approximate weight updates to the base model without altering W. The figure illustrates two exemplary LoRA adaptations, specifically domain adaptation represented mathematically as W plus $B_1A_1$, and style customization represented mathematically as W plus $B_2A_2$. In these mathematical representations, W denotes the original frozen weight matrix of the base model, while $B_1$, $A_1$, $B_2$, and $A_2$ denote low-rank matrices that are trainable during the adaptation process. The dimensions of the low-rank matrices B and A are substantially smaller than the dimensions of the base weight matrix W, such that the product of B and A provides a low-rank approximation of the weight updates that would be computed during full fine-tuning. Specifically, if the base weight matrix W has dimensions d by d, the low-rank matrices may have dimensions d by r and r by d respectively, where r is the rank hyperparameter and r is much less than d. This dimensional reduction enables parameter-efficient fine-tuning wherein the number of trainable parameters is reduced by factors of one thousand to ten thousand or more compared to full fine-tuning approaches, while maintaining model quality comparable to full fine-tuning on downstream tasks.

The Model Layer 1910 processes an input comprising the system prompt, the retrieved context, and the user query, as explicitly stated in the figure. The processing applies both the frozen base model weights W and the trainable LoRA adapter weights $B_1A_1$ and $B_2A_2$ to generate a contextually-aware, domain-adapted response. The domain adaptation component W plus $B_1A_1$ provides behavioral modifications specific to particular knowledge domains or task categories, while the style customization component W plus $B_2A_2$ provides stylistic and formatting adaptations that ensure consistency with desired output conventions. The combined effect of the frozen base weights W and the low-rank adaptations $B_1A_1$ and $B_2A_2$ produces model outputs that exhibit both the general language understanding capabilities acquired during pre-training and the task-specific behaviors learned during efficient adaptation.

The generated output is transmitted to Output Layer 1912. Output Layer 1912 produces a response exhibiting several distinguishing characteristics: (i) grounding in retrieved context, ensuring that factual content is anchored to information obtained through RAG and other MCP-mediated sources and thereby reducing hallucinations; (ii) styling according to LoRA fine-tuning, which enforces domain-specific terminology and formatting; (iii) adherence to system-prompt guidelines, ensuring compliance with role definitions, operational rules, and formatting constraints; and (iv) source citation through MCP traceability, wherein references to specific documents, database records, or tool outputs that contributed to the response are included for transparency and verifiability.

The architecture in FIG. 19 provides multiple technical advantages over conventional language-model implementations. The MCP-orchestrated Context Layer 1908 enables dynamic access to real-time, updatable information sources without retraining, allowing responses grounded in data created or updated after the model's pre-training cutoff. LoRA in Model Layer 1910 enables parameter-efficient adaptation with significantly fewer trainable parameters while achieving comparable quality to full fine-tuning. Prompt Engineering Layer 1906 ensures behavioral and formatting consistency across diverse queries. The MCP protocol provides modular extensibility, allowing new tools and data sources to be added via new MCP servers without modifying the base model or existing integrations. Structured context management via MCP improves traceability and explainability by attributing responses to specific external sources, facilitating verification and auditing. The layered architecture 1900 enforces a separation of concerns, enabling independent optimization of behavioral adaptation (LoRA), knowledge access (MCP), and operational guidelines (system prompts).

Data flow proceeds sequentially: user input is received at User Interaction Layer 1904 and passed to Prompt Engineering Layer 1906 for application of system-prompt specifications; the structured query is forwarded to Context Layer 1908, where the MCP Host coordinates retrieval of relevant context from multiple MCP servers; the augmented prompt (system prompt+context+query) is then passed to Model Layer 1910 for processing by the base LLM and LoRA adapters; and finally the generated response is output via Output Layer 1912 with grounding, styling, guideline adherence, and source attribution.

Context Layer 1908 implements communication between MCP clients and servers using JSON-RPC 2.0, a stateless, lightweight remote procedure call protocol that uses JSON for message encoding. JSON-RPC 2.0 standardizes requests, responses, and notifications exchanged between MCP clients and servers. Transport mechanisms include STDIO transport for local MCP servers (via standard input/output streams between processes on the same machine) and HTTP with Server-Sent Events for remote MCP servers (HTTP POST requests from client to server and SSE for streaming notifications and progress updates from server to client). The HTTP transport supports distributed deployments and integrates with standardized authentication mechanisms such as OAuth 2.1, wherein access tokens obtained via OAuth flows are included in HTTP headers to authenticate client requests to protected MCP servers.

System architecture 1900 thus provides a comprehensive, modular, and technically advanced implementation for AI applications requiring dynamic knowledge access, parameter-efficient adaptation, and explainable response generation. By integrating prompt engineering in Prompt Engineering Layer 1906, MCP-based retrieval in Context Layer 1908, low-rank adaptation in Model Layer 1910, and structured output in Output Layer 1912, the system produces responses that are simultaneously grounded in authoritative external sources, tailored to domain-specific requirements, consistent with operational guidelines, and traceable to verifiable information sources.

Technical Improvements Over Traditional Machine Learning Techniques

Having described the Model Context Protocol architecture and its integration into a layered AI system, the following description addresses the technical improvements and performance enhancements that LLM-based architectures provide over traditional machine-learning techniques.

Large language models (LLMs) deliver several concrete technical improvements over traditional machine-learning architectures by enabling unified, context-aware processing pipelines that avoid the need for handcrafted feature engineering or rigid data schemas. Classical models (e.g., support vector machines (SVMs), logistic regression, shallow neural networks) typically operate on sparse or fixed-dimensional vectorizations derived from manual feature-engineering pipelines and cannot easily capture long-range dependencies or nuanced semantic relationships without extensive custom preprocessing.

In contrast, LLMs employ transformer-based attention mechanisms capable of jointly modeling heterogeneous inputs—including free-text descriptions, structured clinical data, metadata, and domain-specific features—within a single computational graph. This design supports automatic extraction of latent semantic relationships, implicit reasoning patterns, and long-range dependencies that traditional models cannot represent without significant architectural complexity.

LLMs also support zero-shot and few-shot inference, allowing new tasks and datasets to be accommodated via prompting, without retraining end-to-end pipelines. Parameter-efficient tuning methods such as LoRA and QLoRA further reduce retraining overhead by restricting updates to a small fraction of model parameters. LLM-based workflows can integrate explainability signals (e.g., attention visualizations, prompt-based reasoning traces) directly into prompts, enabling hybrid symbolic-neural reasoning that is difficult to replicate with conventional models.

Moreover, LLMs exhibit improved robustness to class imbalance, temporal domain drift, and missing structured fields by leveraging contextual embeddings instead of relying solely on brittle structured inputs. Collectively, these capabilities constitute specific technical enhancements that materially improve the functioning of underlying computing systems relative to conventional machine-learning approaches.

Specific technical improvements enabled by LLM-based architectures include:

Context-integrated feature extraction: The model dynamically derives semantic, syntactic, and relational information directly from raw unstructured input, eliminating brittle TF-IDF-style pipelines and enabling richer token-level representations.

Cross-modal and cross-source data fusion: LLMs can process heterogeneous inputs—such as narratives, timestamps, medication lists, and structured fields—within a single attention mechanism, improving throughput and reducing the need for multiple complex preprocessing stages.

Parameter-efficient adaptation: Techniques such as LoRA and QLoRA allow rapid domain adaptation using as little as 0.1-1% of parameters, avoiding full-model retraining cycles that are typical of conventional ML workflows.

Long-range dependency modeling: Transformer attention captures relationships across hundreds or thousands of tokens, beyond the receptive-field limits of logistic regression, SVMs with bag-of-words features, and shallow neural networks.

Domain-adaptive prompt conditioning: LLMs can adjust their behavior based on structured prompts, chain-of-thought instructions, or domain-specific reasoning templates without altering model weights, enabling fast task adaptation with no retraining.

Robustness to missing or incomplete structured data: LLMs can compensate for absent features by inferring latent relationships from available context, whereas traditional ML models typically require explicit imputation logic and remain sensitive to missing data patterns.

Together, these capabilities represent concrete, non-conventional technical enhancements that materially improve data processing, inference quality, and system-level functionality beyond what traditional machine-learning architectures can provide.

Accuracy and Performance Improvements Over Traditional Machine Learning Techniques LLM-based architectures also deliver measurable accuracy and performance improvements over traditional machine-learning models across a wide variety of classification, extraction, and prediction tasks. Empirical studies show that transformer-based LLMs often achieve substantially higher accuracy, precision, recall, and F1 scores than classical baselines such as SVMs, logistic regression, convolutional neural networks (CNNs), long short-term memory networks (LSTMs), and rule-based NLP systems.

Across multiple domains including enhancement-approval prediction, sentiment and sarcasm detection, biomedical information extraction, and clinical risk prediction LLMs have been shown to provide double-digit gains in accuracy and significant improvements in minority-class recall, addressing failure modes in which traditional models underperform. When combined with parameter-efficient fine-tuning or structured, multi-layer prompting, LLMs can outperform or closely match state-of-the-art classical models even under challenging evaluation regimes, such as chronologically split test sets or cost-sensitive settings that heavily penalize critical errors like false negatives.

LLMs also demonstrate markedly higher robustness to noisy, ambiguous, or incomplete inputs and can effectively leverage contextual signals (e.g., metadata, rich narratives, and long-form text) that traditional models cannot easily encode. These improvements show that LLM-based architectures not only enhance prediction quality but also materially elevate overall system performance beyond what is achievable with conventional machine-learning techniques.

For example, enhanced transformer models such as HS-BERT achieve approximately 96-98% accuracy on e-commerce comment classification tasks, substantially outperforming SVM, CNN, and Naive Bayes baselines that typically achieve around 70-92% accuracy. In software-engineering workflows, LoRA-tuned LLMs such as Llama 3.1 can improve enhancement-approval prediction accuracy from roughly 64% to 79%, while increasing minority-class ("approved") recall by more than 12 percentage points relative to LSTM- and SVM-based systems.

In clinical and biomedical settings, LLMs such as GPT-4o, PaLM-2, and Llama-2 demonstrate superior extraction accuracy for complex tasks like identifying immunosuppressed patients from free-text notes or extracting patient-reported outcomes, consistently outperforming rule-based NLP pipelines and structured-data ML models. In cost-sensitive medical prediction tasks, LLMs equipped with structured prompts achieve higher recall and lower critical false-negative rates than traditional classifiers, improving performance under real-world risk-weighted metrics.

Even in domains where classical models already perform strongly such as fake-news detection BERT-style language models provide incremental but statistically significant gains, improving accuracy from about 99.81% to 99.98% and F1 scores from approximately 0.9980 to 0.9998.

Collectively, these results demonstrate that LLMs consistently deliver measurable, statistically significant improvements in accuracy, recall, F1 score, robustness, and minority-class performance compared to traditional machine-learning techniques, thereby materially improving the overall functioning and effectiveness of AI-driven computing systems.

The agentic language model workflows, context orchestration mechanisms, and retrieval-augmented inference techniques described above enable the networking platform to dynamically coordinate data ingestion, analysis, and communication across multiple participant classes. As described in the following sections, these capabilities support the recursive and multicast trial workflows through which evaluator data, consumer feedback, and formulation updates are iteratively processed to generate continuously evolving insights.

Computer System

Figure 20:
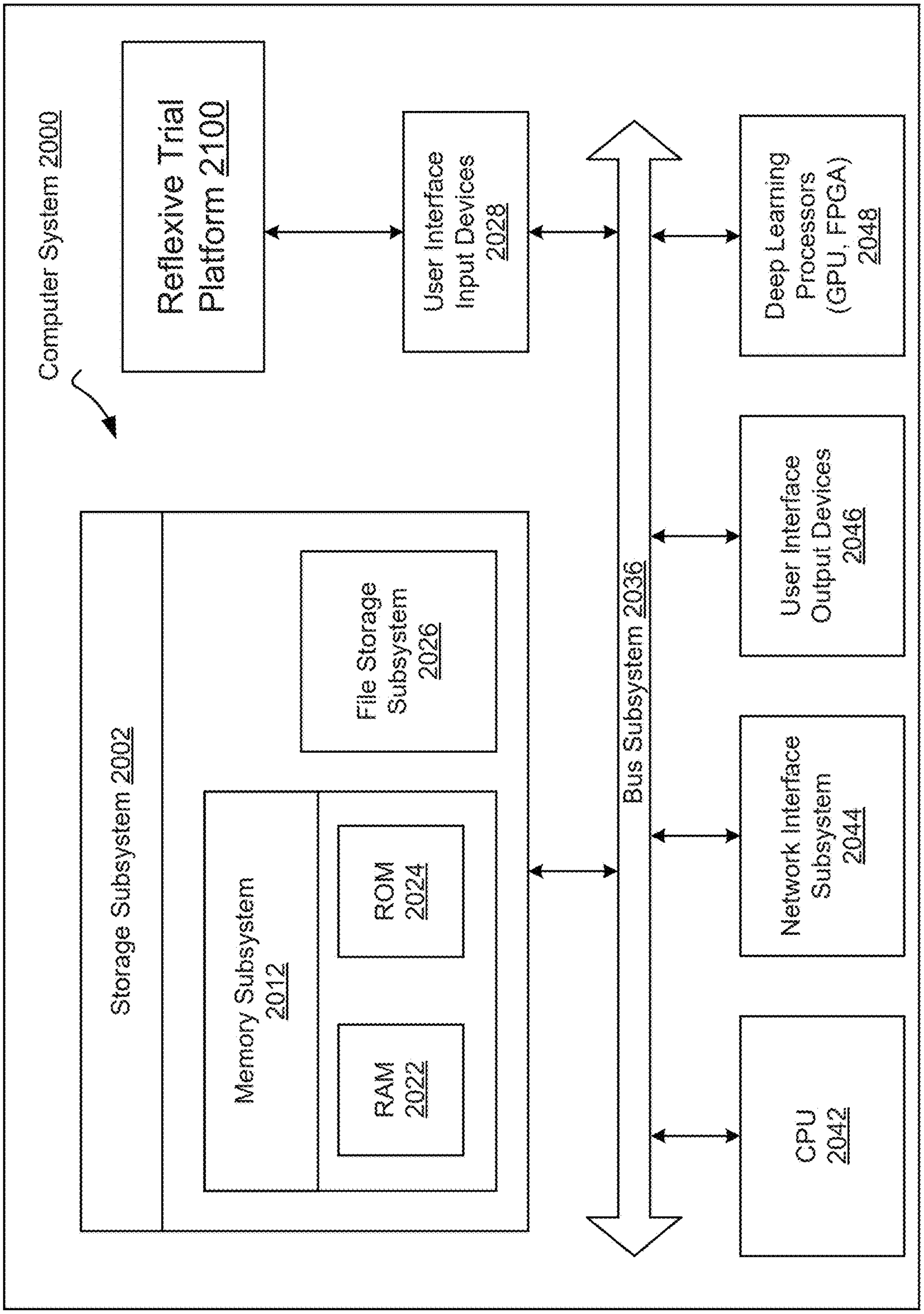
FIG. 20 illustrates an example configuration of a computing device that can be used to implement the systems and techniques of a networking platform described herein.

FIG. 20 shows an example computer system 2000 that can be used to implement the technology disclosed. Computer system 2000 includes at least one central processing unit (CPU) 2042 that communicates with a number of peripheral devices via bus subsystem 2026. These peripheral devices can include a storage subsystem 2002 including, for example, memory devices and a file storage subsystem 2026, user interface input devices 2028, user interface output devices 2046, and a network interface subsystem 2044. The input and output devices allow user interaction with computer system 2000. Network interface subsystem 2044 provides an interface to outside networks, including an interface to corresponding interface devices in other computer systems.

In one implementation, the disclosed mediator system(s) are communicably linked to the storage subsystem 2002 and the user interface input devices 2028.

User interface input devices 2028 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2000.

User interface output devices 2046 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2000 to the user or to another machine or computer system.

Storage subsystem 2002 stores programming and data constructs that provide the functionality of some or all of the modules and methods described herein. These software modules are generally executed by processors 2048.

Processors 2048 can be graphics processing units (GPUs), field-programmable gate arrays (FPGAs), application-specific integrated circuits (ASICs), and/or coarse-grained reconfigurable architectures (CGRAs). Processors 2048 can be hosted by a deep learning cloud platform such as Google Cloud Platform™, Xilinx™, and Cirrascale™. Examples of processors 3048 include Google's Tensor Processing Unit (TPU)™, rackmount solutions like GX4 Rackmount Series™, GX13 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 2012 used in the storage subsystem 2002 can include a number of memories including a main random access memory (RAM) 2022 for storage of instructions and data during program execution and a read only memory (ROM) 2024 in which fixed instructions are stored. A file storage subsystem 2026 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2026 in the storage subsystem 2002, or in other machines accessible by the processor.

Bus subsystem 2036 provides a mechanism for letting the various components and subsystems of computer system 2000 communicate with each other as intended. Although bus subsystem 2036 is shown schematically as a single bus, alternative implementations of the bus subsystem can use multiple busses.

Computer system 2000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2000 depicted in FIG. 20 is intended only as a specific example for purposes of illustrating the preferred implementations of the technology disclosed. Many other configurations of computer system 2000 are possible having more or less components than the computer system depicted in FIG. 20.

In various implementations, a learning system is provided. In some implementations, a feature vector is provided to a learning system. Based on the input features, the learning system generates one or more outputs. In some implementations, the output of the learning system is a feature vector. In some implementations, the learning system comprises an SVM. In other implementations, the learning system comprises an artificial neural network. In some implementations, the learning system is pre-trained using training data. In some implementations training data is retrospective data. In some implementations, the retrospective data is stored in a data store. In some implementations, the learning system may be additionally trained through manual curation of previously generated outputs.

In some implementations, an object detection pipeline is a trained classifier. In some implementations, the trained classifier is a random decision forest. However, it will be appreciated that a variety of other classifiers are suitable for use according to the technology disclosed, including linear classifiers, support vector machines (SVM), or neural networks such as recurrent neural networks (RNN).

Suitable artificial neural networks include but are not limited to a feed-forward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

The technology disclosed may be embodied as a system, a method, and/or a computer program product. The computer program product may include a computer readable storage medium (or media) having computer readable program instructions thereon for causing a processor to carry out aspects of the technology disclosed.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

FIG. 20 is a schematic of an exemplary computing node. Computing node 2000 is only one example of a suitable computing node and is not intended to suggest any limitation as to the scope of use or functionality of implementations described herein. Regardless, computing node 3000 is capable of being implemented and/or performing any of the functionality set forth hereinabove.

In computing node 2000 there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed computing environments where tasks are performed by remote processing devices that are linked through a communications network. In a distributed computing environment, program modules may be located in both local and remote computer system storage media including memory storage devices.

As shown in FIG. 20, computer system/server in computing node 2000 is shown in the form of a general-purpose computing device. The components of computer system/server may include, but are not limited to, one or more processors or processing units, a system memory, and a bus that couples various system components including system memory to processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server typically includes a variety of computer system readable media. Such media may be any available media that is accessible by computer system/server, and it includes both volatile and non-volatile media, removable and non-removable media.

System memory can include computer system readable media in the form of volatile memory, such as random access memory (RAM) and/or cache memory. Algorithm Computer system/server may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces. As will be further depicted and described below, memory may include at least one program product having a set (e.g., at least one) of program modules that are configured to carry out the functions of implementations of the disclosure.

Program/utility, having a set (at least one) of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of implementations as described herein.

Computer readable program instructions for carrying out operations of the technology disclosed may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the technology disclosed.

Aspects of the technology disclosed are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the technology disclosed. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of a general-purpose computer system and associated execution environment is provided as an exemplary computing infrastructure capable of implementing the technology disclosed herein. In particular, the systems, program modules, data structures, and communication mechanisms described above may be configured to support distributed, iterative, and data-driven processes operating across heterogeneous data sources and participant classes, including artificial intelligence and machine learning workloads. By way of example, such workloads may include LLM inference, agentic control logic, and model-mediated access to external tools, databases, or services via standardized context or protocol interfaces, as illustrated in FIGS. 1-19. In some embodiments, these functions may be executed using dedicated inference hardware, accelerator devices, or layered computing architectures that decouple application logic, model execution, and data orchestration. Against this technical backdrop, the following description introduces a networking architecture that leverages such computing capabilities to provide a scalable, multicast, and recursive evaluation framework for wellness products.

Networking Application

This disclosure relates to systems and methods for networking education, development, and management.

Social media and networking applications maintain a significant amount of information on companies, organizations, employees, and other users of these applications. As popularity of these networking applications increases, users have unprecedented access to connect and/or communicate with a vast number of users (e.g., over one million users) previously unavailable to them. Unfortunately, this also results in some users receiving unsolicited communications or connection requests from random users (e.g., spam accounts) providing little or no networking benefit to them. These unsolicited communications have become more burdensome to users of these networking applications thereby reducing overall user satisfaction. Thus, facilitating beneficial and meaningful relationships on a spam-free and advertisement-free platform would thereby increase the overall user satisfaction for these networking applications.

One aspect of the disclosure provides a computer-implemented method that when executed on data processing hardware causes the data processing hardware to perform operations for generating networking recommendations for a plurality of user accounts of a platform (e.g., a networking or social media platform such as a keepwith platform). The operations include obtaining a plurality of user accounts. Each respective user account includes a user profile, a network strategy, and a plurality of primary connections. The network strategy includes at least one of current connections, candidate connections, network goals, networking tasks, networking events, networking introductions, candidate introductions, and an ability to invite users to the platform. Each primary connection defines a primary relationship between the respective user account and a different user account of the plurality of user accounts. The operations also include determining a target user account from the plurality of user accounts and identifying a first user account using one of the plurality of primary connections of the target user account. The operations also include determining a second user account using one of the plurality of primary connections of the first user account. Here, the second user account lacks a primary relationship with the target user account. The operations also include generating a networking recommendation based on text corresponding to the network goal of the target user account and text corresponding to the second user account. The operations also include transmitting a notification that includes the networking recommendation to the user device associated with the first user account.

Implementations of the disclosure may include one or more of the following optional features. In some implementations, the operations further include transmitting the notification including the networking recommendation to a user device associated with the target user account. The networking recommendation may include a recommendation for a user associated with the first user account to initiate an introduction between a user associated with the target user account and a user associated with the second user account.

In some examples, the operations further include receiving, from the user device associated with the first user account, an introduction request to initiate the introduction between the user associated with the target user account and the user associated with the second user account and transmitting the introduction request to a user device associated with the target user account and a user device associated with the second user account. In these examples, the operations may further include receiving an affirmative response from both the user device associated with the target user account and the user device associated with the second user account and generating a primary connection between the target user account and the second user account based on receiving the affirmative responses from both the user device associated with the target user account and the user device associated with the second user account. The operations may further include receiving at least one negative response from either the user device associated with the target user account or the user device associated with the second user account and determining not to generate a primary connection between the target user account and the second user account based on receiving the at least one negative response from either the user device associated with the target user account or the user device associated with the second user account.

In some implementations, determining the networking recommendation includes generating a target natural language processing (NLP) output corresponding to the text of the network goal of the target user account using a neural network model, generating candidate NLP output corresponding to the text of the second user account using the neural network model, and determining a matching score using the targeting NLP output and the candidate NLP output. In these implementations, the operations may further include determining that the matching score satisfies a matching score threshold and transmitting the notification including the networking recommendation based on determining that the matching score satisfies the matching score threshold. The operations may further include training a neural network model. In some examples, each respective user account of the plurality of user accounts further includes a plurality of spheres of influence. In these examples, each respective sphere of influence includes at least one primary connection of the plurality of primary connections, a classification representing a connection type of each primary connection of the at least one primary connections, and a ranking indicating a connection strength for each respective primary connection of the at least one primary connection.

Another aspect of the disclosure provides a system that includes data processing hardware and memory hardware storing instructions that when executed on the data processing hardware causes the data processing hardware to perform operations. The operations include obtaining a plurality of user accounts. Each respective user account includes a user profile, a network strategy, and a plurality of primary connections. The network strategy includes at least one of current connections, candidate connections, network goals, networking tasks, networking events, networking introductions, candidate introductions, and an ability to invite users to the platform. Each primary connection defines a primary relationship between the respective user account and a different user account of the plurality of user accounts. The operations also include determining a target user account from the plurality of user accounts and identifying a first user account using one of the plurality of primary connections of the target user account. The operations also include determining a second user account using one of the plurality of primary connections of the first user account. Here, the second user account lacks a primary relationship with the target user account. The operations also include generating a networking recommendation based on text corresponding to the network goal of the target user account and text corresponding to the second user account. The operations also include transmitting a notification that includes the networking recommendation to the user device associated with the first user account.

Implementations of the disclosure may include one or more of the following optional features. In some implementations, the operations further include transmitting the notification including the networking recommendation to a user device associated with the target user account. The networking recommendation may include a recommendation for a user associated with the first user account to initiate an introduction between a user associated with the target user account and a user associated with the second user account.

In some examples, the operations further include receiving, from the user device associated with the first user account, an introduction request to initiate the introduction between the user associated with the target user account and the user associated with the second user account and transmitting the introduction request to a user device associated with the target user account and a user device associated with the second user account. In these examples, the operations may further include receiving an affirmative response from both the user device associated with the target user account and the user device associated with the second user account and generating a primary connection between the target user account and the second user account based on receiving the affirmative responses from both the user device associated with the target user account and the user device associated with the second user account. The operations may further include receiving at least one negative response from either the user device associated with the target user account or the user device associated with the second user account and determining not to generate a primary connection between the target user account and the second user account based on receiving the at least one negative response from either the user device associated with the target user account or the user device associated with the second user account.

In some implementations, determining the networking recommendation includes generating a target natural language processing (NLP) output corresponding to the text of the network goal of the target user account using a neural network model, generating candidate NLP output corresponding to the text of the second user account using the neural network model, and determining a matching score using the targeting NLP output and the candidate NLP output. In these implementations, the operations may further include determining that the matching score satisfies a matching score threshold and transmitting the notification including the networking recommendation based on determining that the matching score satisfies the matching score threshold. The operations may further include training a neural network model. In some examples, each respective user account of the plurality of user accounts further includes a plurality of spheres of influence. In these examples, each respective sphere of influence includes at least one primary connection of the plurality of primary connections, a classification representing a connection type of each primary connection of the at least one primary connections, and a ranking indicating a connection strength for each respective primary connection of the at least one primary connection.

Networking applications have increased in popularity allowing users to significantly expand their network by accessing a vast number of other users on these platforms. Current networking applications allow users to request a connection with any other user they encounter on the platform. In fact, these applications often emphasize users to connect with as many other users as possible, without truly knowing the other users or having any sort of shared interests. Thus, this approach does not emulate an in-person networking environment where making networking connections with other people usually includes a shared interest or a mutual connection. That is, in the in-person networking environment, oftentimes a mutual connection between two people who do not know one another will make an introduction between the two people. In particular, the mutual connection will make the introduction if they believe the two people have some shared interests. Moreover, since the mutual connection initiates the introduction, there is a credibility associated with the introduction that is not otherwise present in the approach of current networking applications.

Accordingly, implementations herein are directed to systems and methods for networking education, development, and management. More specifically, a networking application obtains a plurality of user accounts each including a network goal and a plurality of primary connections. Each primary connection defines a primary relationship between a respective user profile and a different user profile. The networking application includes a connection identifier that identifies a first user account using one of the plurality of primary connections of a target user account. The connection identifier also determines a second user account using one of the plurality of primary connections of the first user account. Here, the second user account lacks a primary relationship with the target user account.

The networking application also includes a neural network that generates (or does not generate) a networking recommendation based on text corresponding to the target user account and text corresponding to the second user account. That is, the neural network applies natural language processing (NLP) to understand the text of the profiles and determine whether users associated with the profiles would be a good networking match. When the neural network generates the networking recommendation, the networking application transmits a notification including the networking recommendation to a user device. As will become apparent, the user associated with the first user account (e.g., mutual connection) may decide whether to initiate a connection between user associated with the target user account and the second user account. Moreover, both the user associated with the target user account and the user associated with the second user account must consent to the connection before a primary relationship is established between them.

Figure 21:
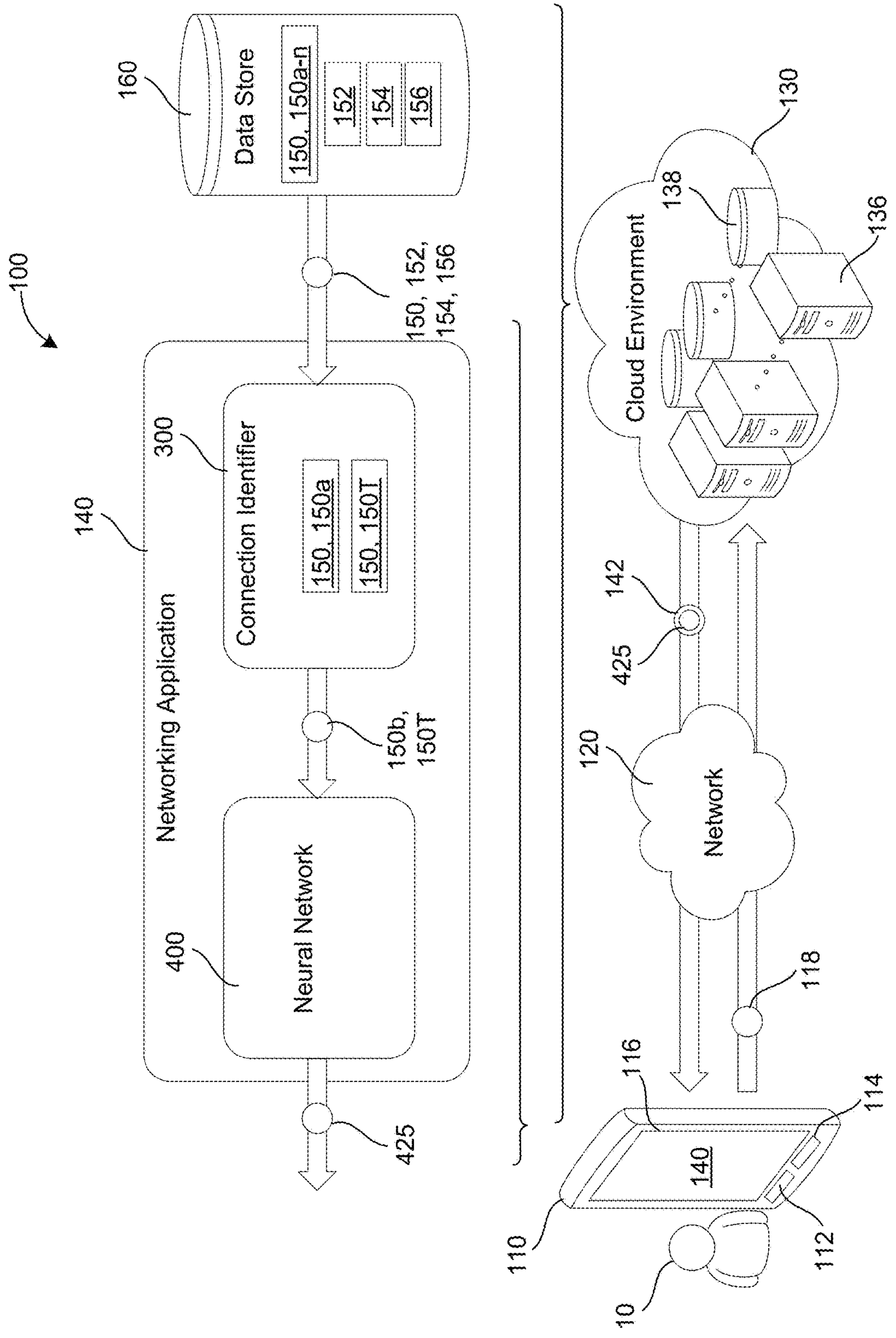
FIG. 21 is a schematic view of an example system for a networking application.

Referring to FIG. 21, in some implementations, an example system 100 includes one or more user devices 110 each associated with a respective user 10 and in communication with a cloud computing environment 130 via a network 120. Moreover, each user device 110 may be in communication with each other user device 110 via the network 120. Each user device 110 may correspond to a computing device, such as, without limitation, a desktop workstation, a laptop workstation, or a mobile computing device (e.g., smart phone, tablet, or wearable device), and includes data processing hardware 112 and memory hardware 114. The cloud computing environment 130 may be a single computer, multiple computers, or a distributed system having scalable/elastic resources, such as processing resources 136 (e.g., data processing hardware) and/or storage resources 138 (e.g., memory hardware). In some implementations, the user device 110 includes a screen 116 with a graphical user interface (GUI) to display a networking application 140 executing on the user device 110. In some examples, the screen 116 of the user device 110 includes a touch screen 116 configured to receive touch inputs from the user 10 to select content displayed on the screen 116 and/or to execute some functionality associated with an area receiving the touch input.

In some implementations, the networking application 140 executes at the cloud computing environment 130 in addition to, or in lieu of, executing at the user device 110. The networking application 140 includes a connection identifier 300 and a neural network 400. The connection identifier 300 obtains a plurality of user accounts 150, 150*a-n* from a data store 160. The data store 160 may be overlain on the storage resources 138 to allow scalable use of the storage resources 138. Each respective user account 150 is associated with a corresponding user 10. The user 10 may represent an individual person or an entity such as a business or non-profit organization. Moreover, each respective user account 150 includes a user profile 152, a network objective 154, and a plurality of primary connections 156 described in greater detail with reference to FIGS. 22 and 23, respectively. Thus, the connection identifier 300 obtains the corresponding network objective 154 and the plurality of primary connections 156 in connection with each user account. The connection identifier 300 determines a target user account 150, 150T from the plurality of user accounts 150. The target user account 150T may be any one of the user accounts 150. As will become apparent, the connection identifier 300 identifies a first user account 150*a* using one of the plurality of primary connections 156 of a target user account 150T and determines a second user account 150, 150*b* using one of the plurality of primary connections 156 of the identified first user account 150*a*.

The neural network 400 receives the target user account 150T and the second user account 150*b* identified by the connection identifier 300 and generates (or does not generate) a networking recommendation 245 based on text corresponding to the target user account 150T and text corresponding to the second user account 150*b*. After generating the networking recommendation 245, the networking application 140 transmits a notification 142 that includes the networking recommendation 425 to the one or more user devices 110. In some instances, the networking application 140 transmits the notification 142 including the networking recommendation 245 to a user device 110 associated with the first user account 150*a*. Additionally or alternatively, the networking application 140 may transmit the notification 142 including the networking recommendation 245 to a user device 110 associated with the target user account 150T. In some implementations, the user device 110 transmits a loss 118 to the networking application 140 indicating a value of the networking recommendation 245. For example, the user 10 associated with the user device 110 may provide value of "4" for the loss 118 when rating how beneficial the networking recommendation 245 was for the user 10 on a scale of 1-5. The networking application 140 may use the loss 118 to train the neural network 400.

Figure 22A:
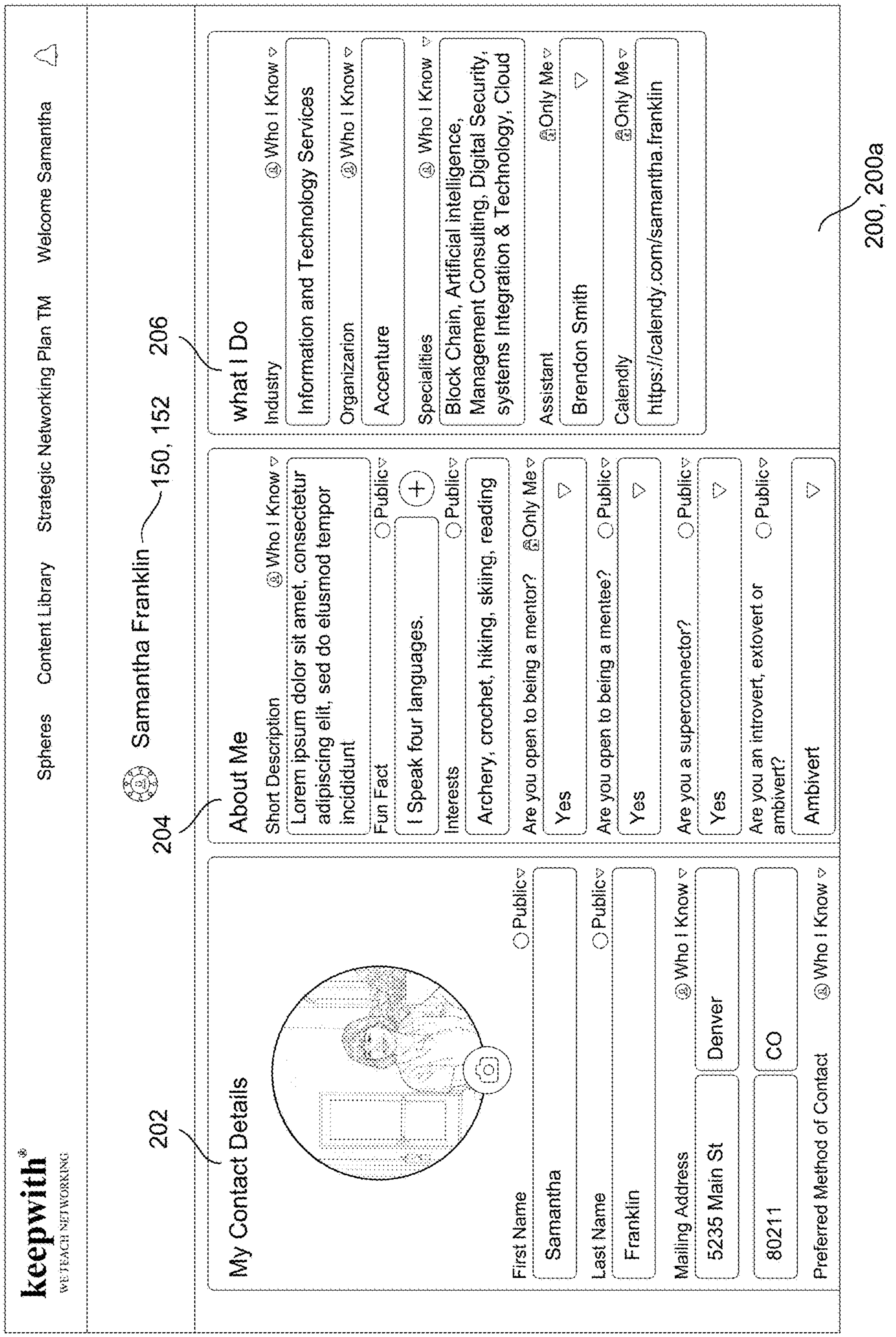
FIGS. 22A-22K are various graphical user interface views of a user account.

FIGS. 22A-22K show various GUI views 200 of an example user accounts 150 that may be displayed to a user 10 via the screen 116 of the user device 110 (FIG. 21). User accounts 150 (e.g., including associated user profile 152, network goal 154, and primary connections 156) may include any information shown in FIGS. 22A-22H and, as will become apparent, the neural network 400 (FIG. 24) may process text corresponding to this information. FIG. 22A shows an example GUI view 200, 200*a* of an expanded user account 150. Here, the user account 150 has a user profile 152 that includes information about the user including contact details 202, an "about me" section 204, and a "what I do" section 206. The contact details 202 may include a name, address, and preferred method of contact for the user. The preferred method of contact may include text, email, or in-application. Notably, if the preferred method of contact is text or email all communications sent by the networking application 140 go directly to the user via text or email whereby the user does not have to manage any in-application messages. Advantageously, by opting for text or email communications, the user does not have to manage a separate inbox of messages.

The "about me" section 204 may include a short description about the user, any fun facts about the user, interests of the user, whether the user is open to being a mentor or mentee, whether the user is a superconnector, or whether the user is an introvert, extrovert, or ambivert. The short description may include any text input by the user that provides a summary about the user. The fun fact may be anything not generally known to others about the user, for example, speaking four languages. Interests may include any interest the user is currently engaged in, or wishes to learn about. A superconnector is a user that maintains contact with thousands of people with various backgrounds.

The "what I do" section 206 includes professional information about the user. That is, professional information may include any industries the user has experience in, organizations the user has been involved with, any professional skills (specialties) the user has, and a link providing access to view and/or schedule a meeting with the user. For instance, the user may have experience in the information and technology services industry with one or more previous employers (organizations). Moreover, the user may have skills of block chain, artificial intelligence, management consulting, digital security, systems integrations and technology, and cloud computing.

Figure 22B:
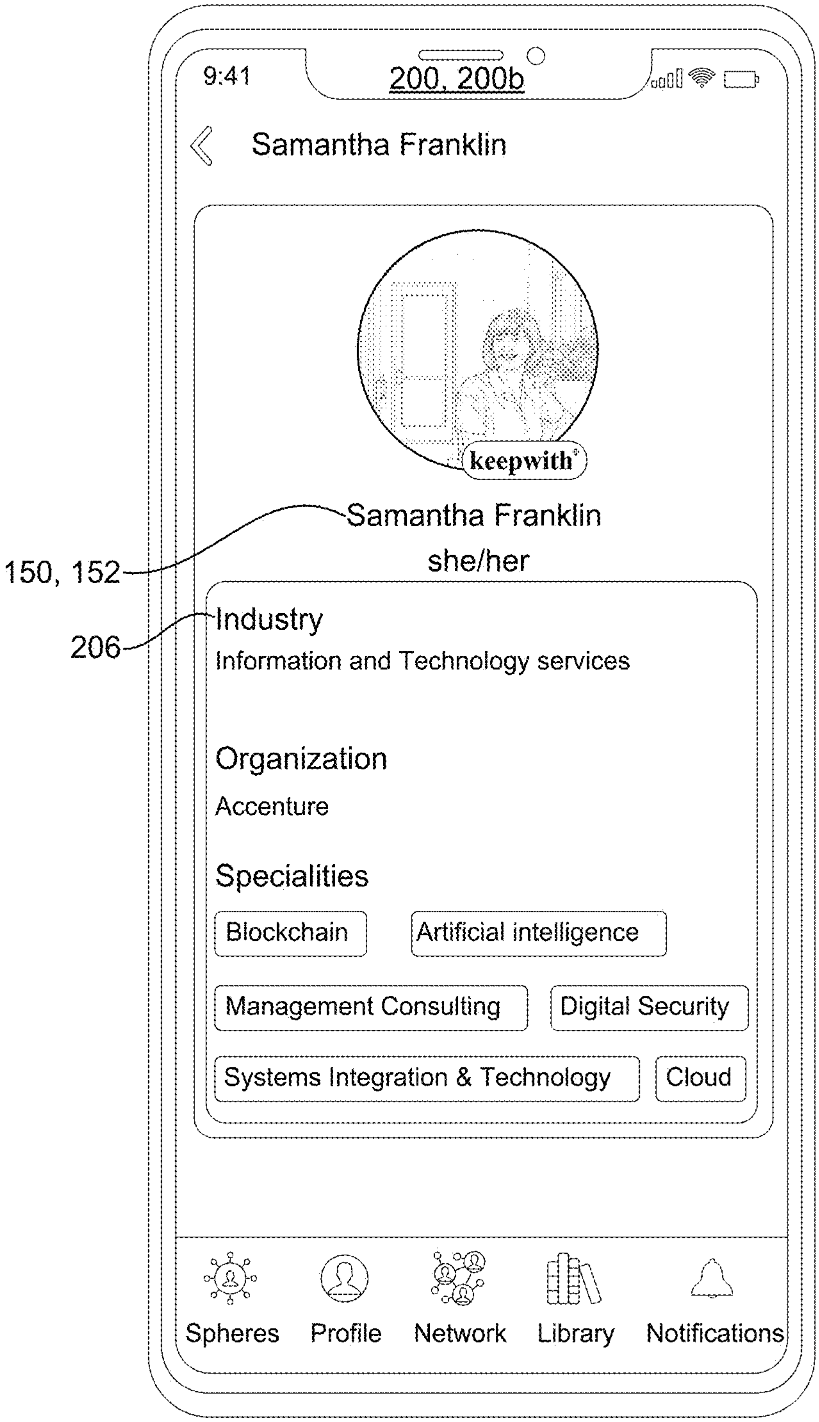

On the other hand, FIG. 22B shows an example GUI view 200, 200*b* of a summarized user profile 152. Here, the example GUI view 200*b* conceals some of the information about the user as opposed to the example GUI view 200*a* (FIG. 22A). The GUI view 200*b* may be shown publicly to all users or to users without a primary relationship. In the example shown, the GUI view 200*b* only shows a portion of the "what I do" section 206 including industry information, organization information, and specialties.

Figure 22C:
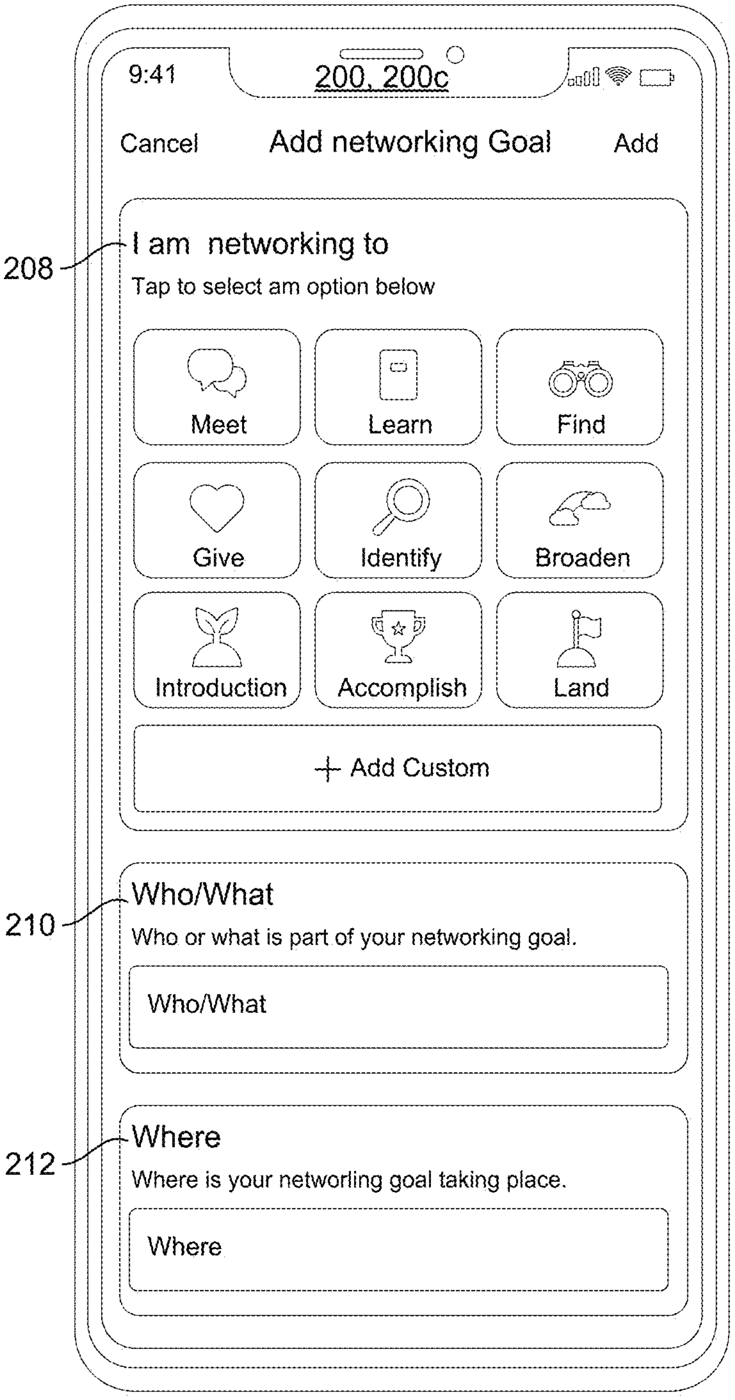
Figure 22D:
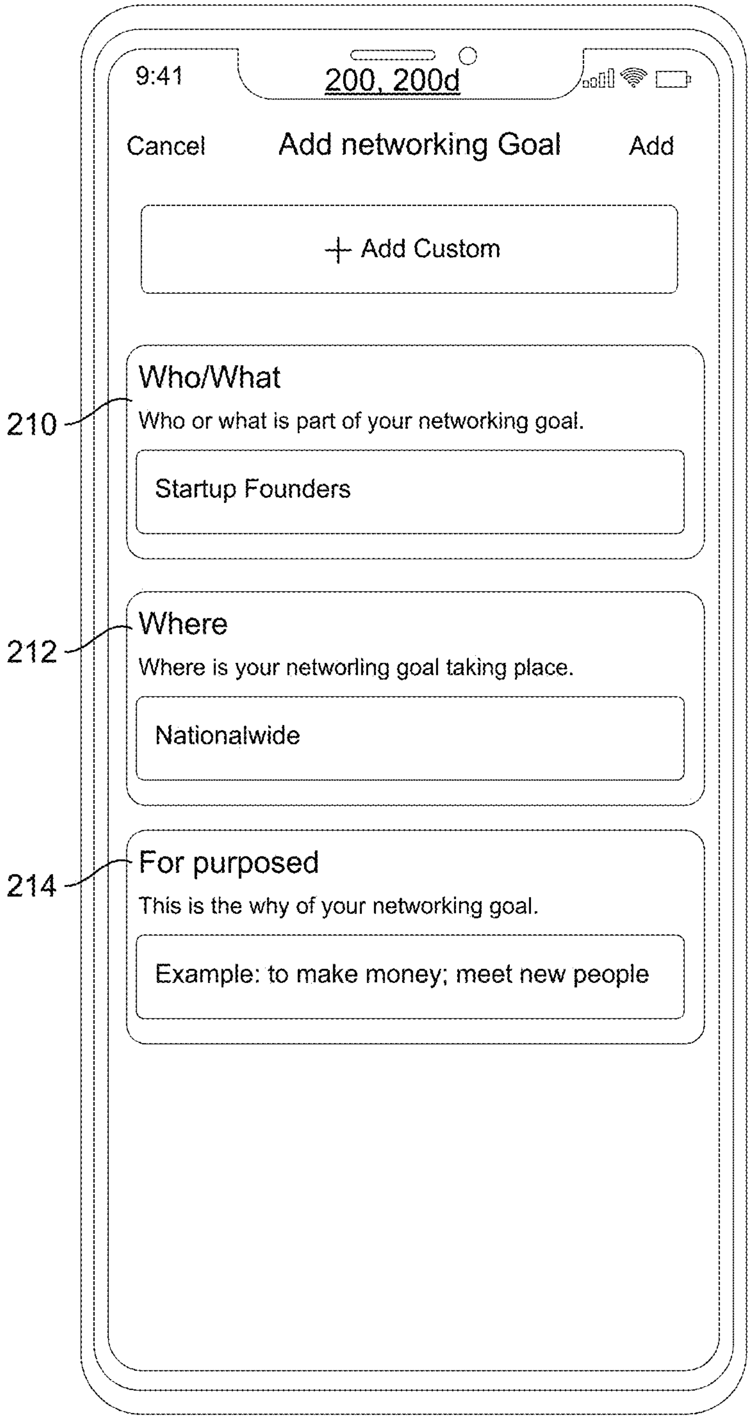

FIGS. 22C and 22D shows example GUI views 200, 200*c* and 200, 200*d*, respectively. As shown, users may add networking objectives 154 (i.e., networking goals) to their user account 150. The network objectives 154 may include an objective type 208, an object 210, a location 212, and an outcome 214. The objective type 208 may include meeting someone, learning a skill, finding a person with certain characteristics, giving through monetary donations or knowledge and time, identifying an event of a particular type, broadening a skill, accomplishing a certain task, landing a position or role, or any other custom objective type 208. For example, learning a skill may include learning a new software application. Landing a position or role may include landing a new job in a different industry or landing a podcast interview. The object 210 of the network objective 154 may include a particular person the user wants to connect with. In some examples, the location 212 may be a city, state, or country associated with the network objective 154. For instance, the network objective 154 may be to meet new clients in Colorado. The outcome 214 (i.e., purpose) may be to increase sales or to meet new people.

Figure 22E:
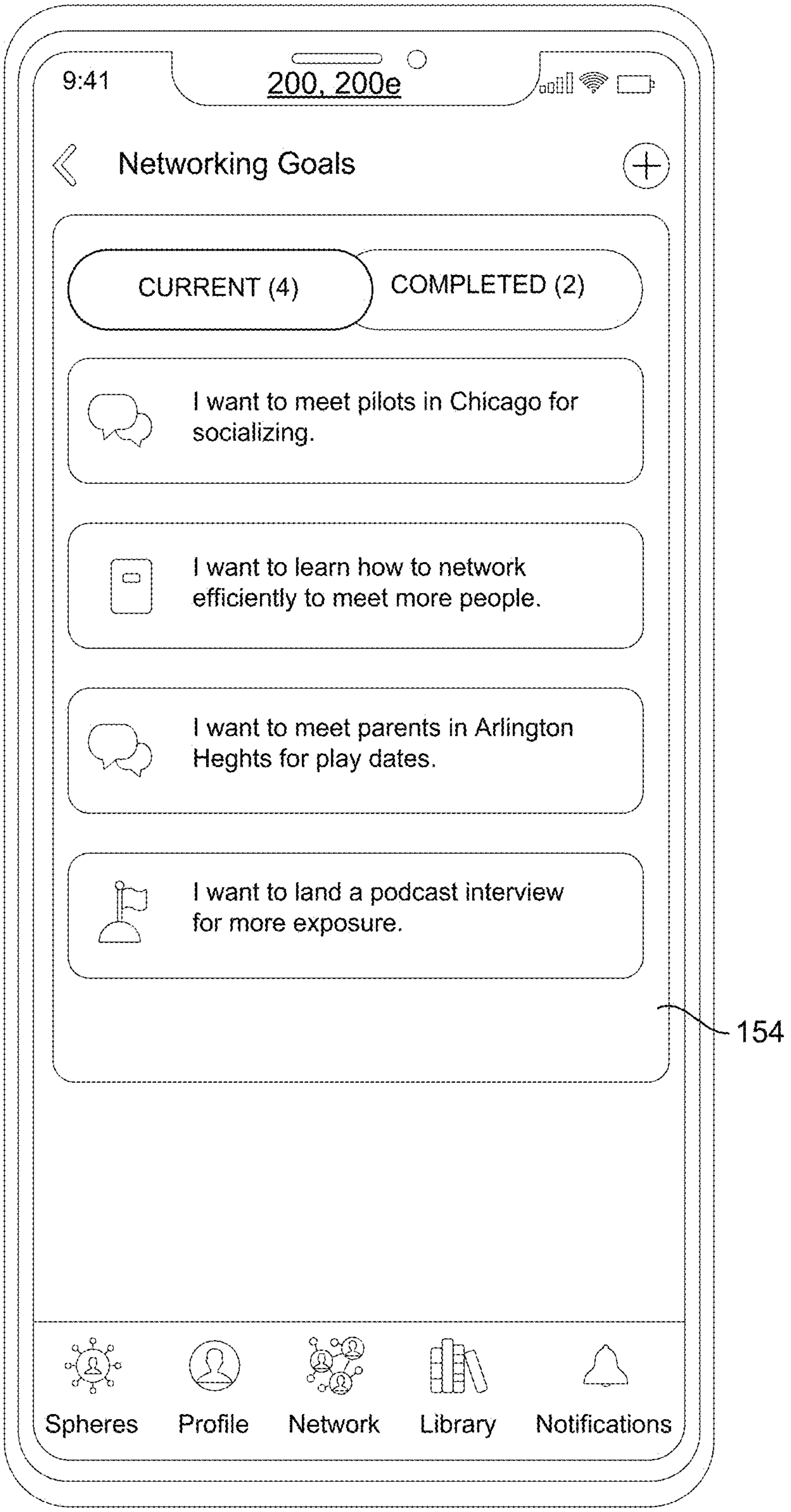
Figure 22F:
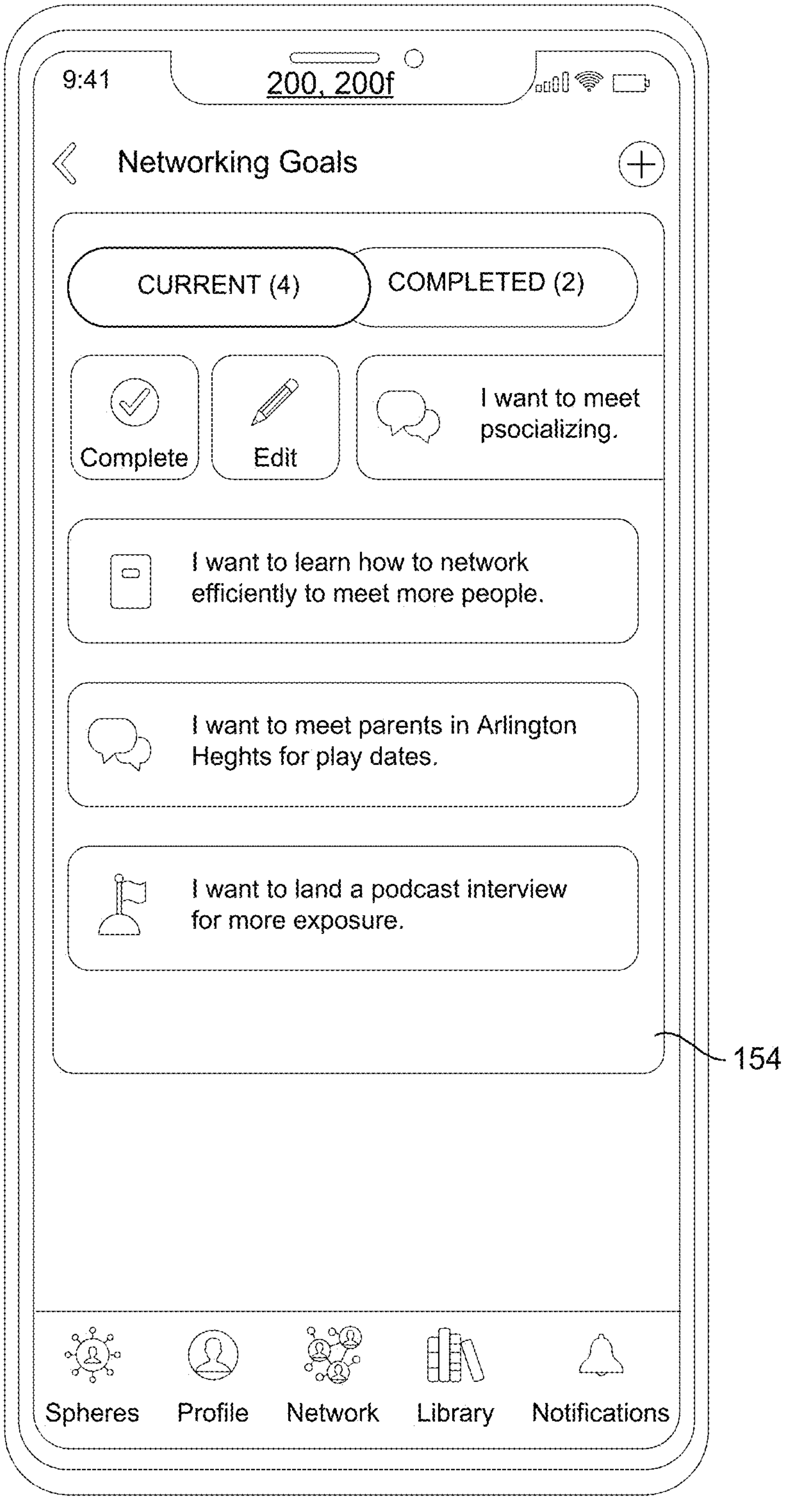

FIGS. 22E and 22F shows example GUI views 200, 200*e* and 200, 200*f*, respectively. Here, the GUI views 200*e*, 200*f* show network objective 154 added to the user account including "I want to meet pilots in Chicago for socializing," "I want to learn how to network efficiently to meet more people," "I want to meet parents in Arlington Heights for play dates," and "I want to land a podcast interview for more exposure." The user may provide user input to edit or mark one of the network objectives 154 as complete. Moreover, the user may view current network objectives 154 and previously completed network objectives 154.

Figure 22G:
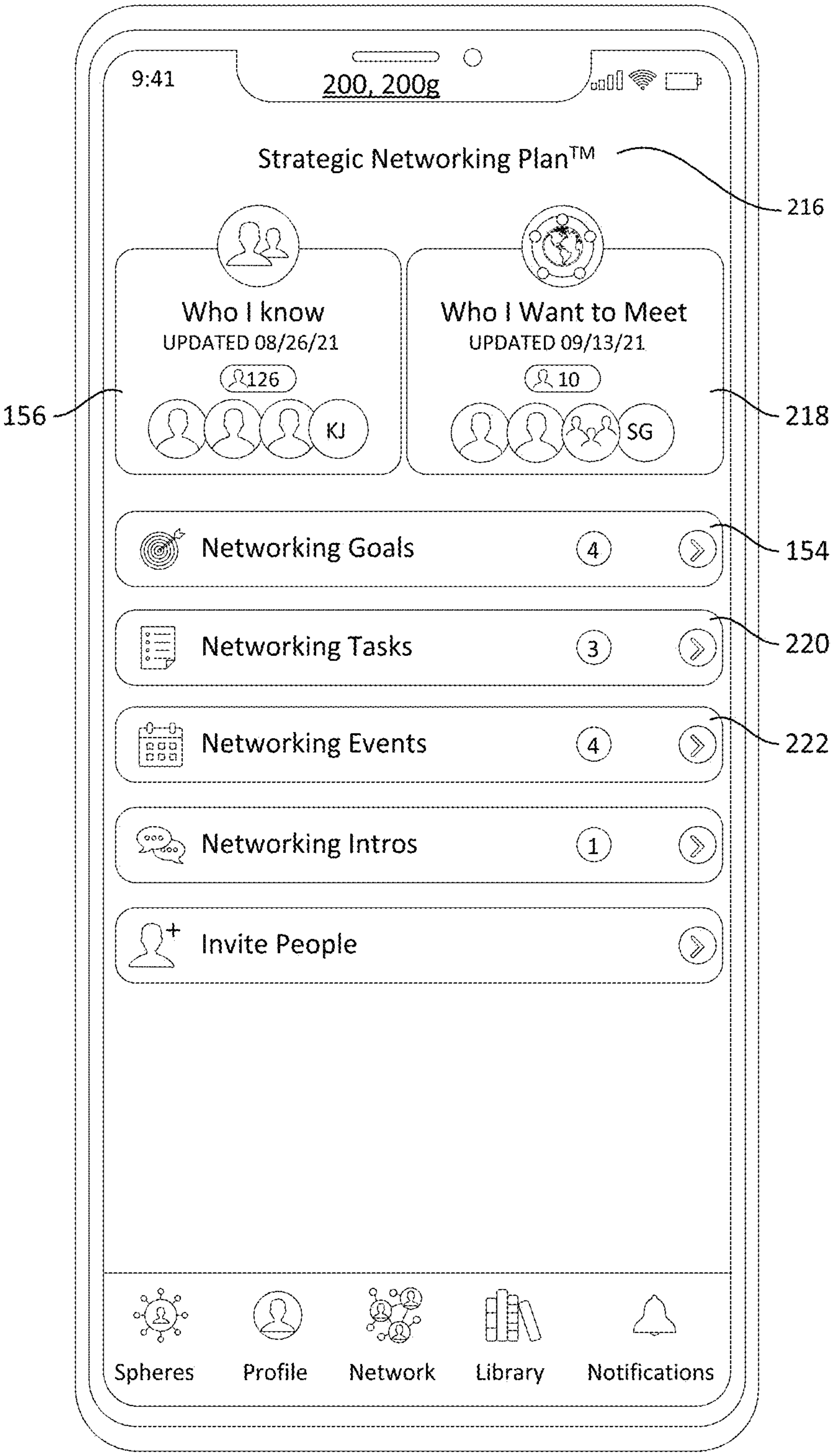
Figure 22H:
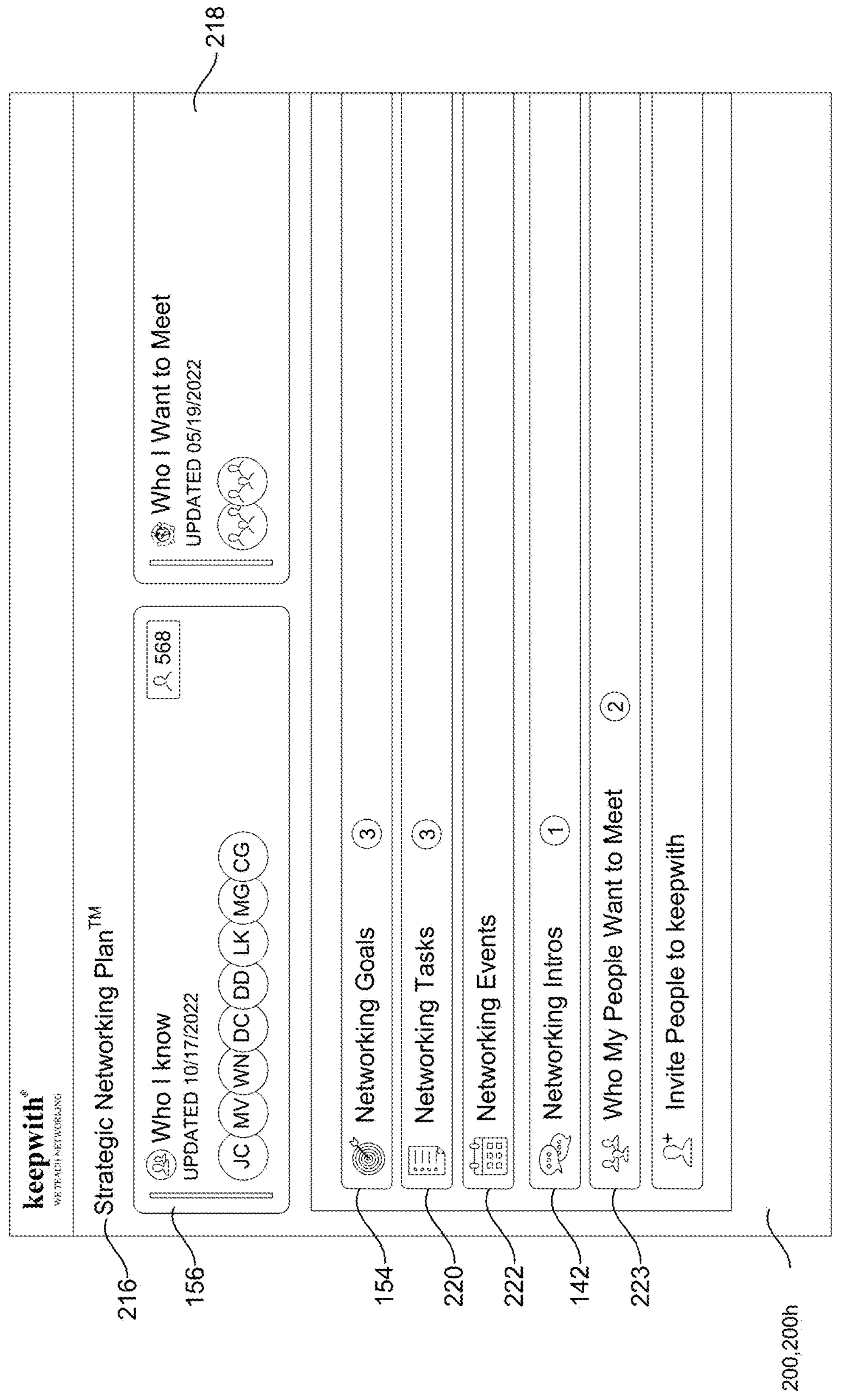
Figure 22I:
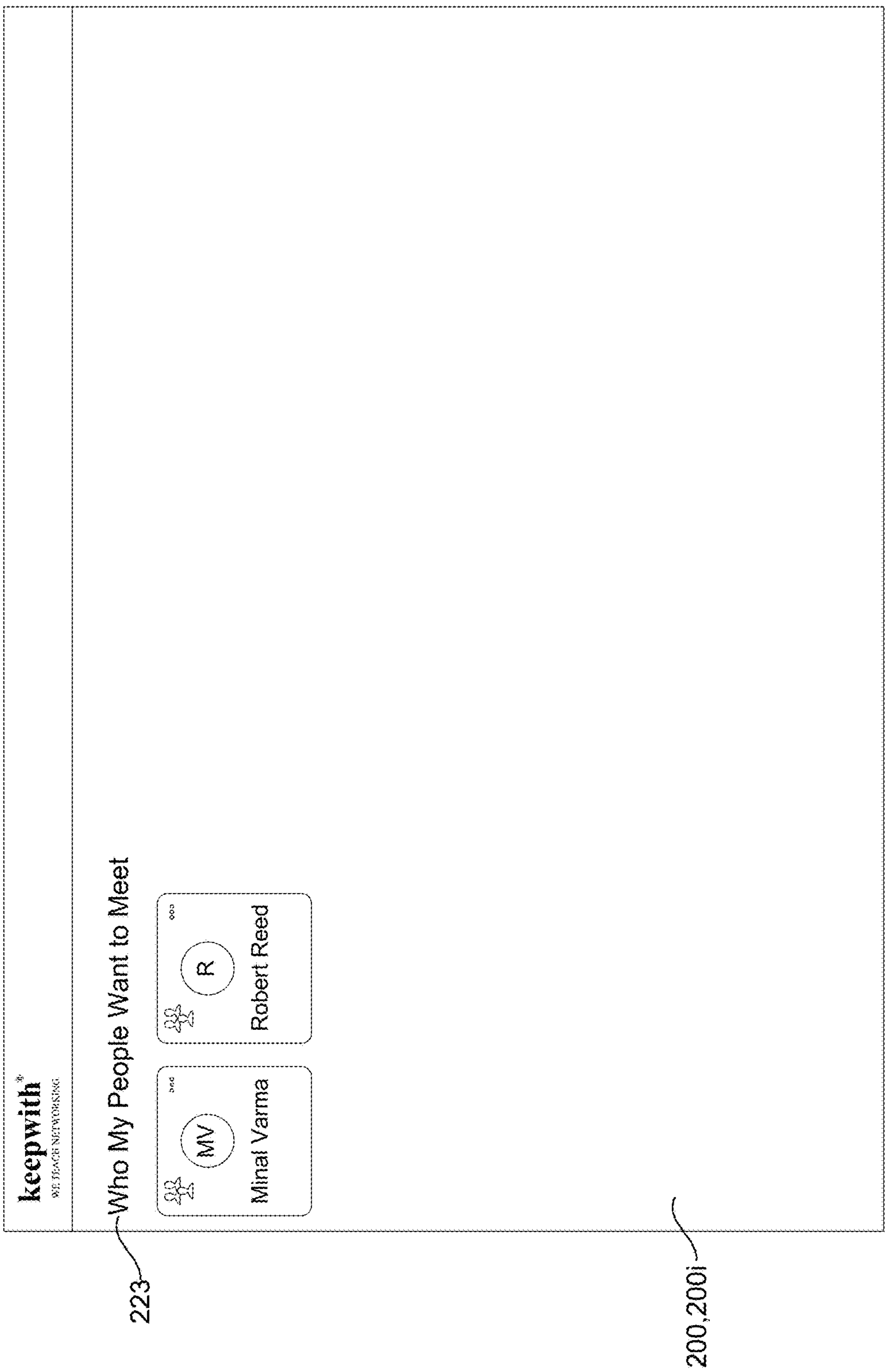

FIGS. 22G and 22H show an example GUI view 200, 200*g*, 200 *h* including a networking strategy (i.e., strategic networking plan) 216 of the user account. In some examples, the networking strategy 216 will include the networking goals 154. The networking strategy 216 includes a list of the primary connections 156 of the user (e.g., who I know or current connections), a list of other user the user wants to meet (e.g., who I want to meet or candidate connections) 218, a list of network objectives 154 of the user, and networking tasks 220 and networking events 222 associated with the network objectives 154. Thus, the networking strategy 216 simply provides the user with an overview of current primary connections and steps (e.g., networking tasks 220 and networking events 222) to achieve the network objectives 154. The networking strategy may give the user an ability to invite users to the networking application (e.g., a keepwith platform) 140.

Figure 22J:
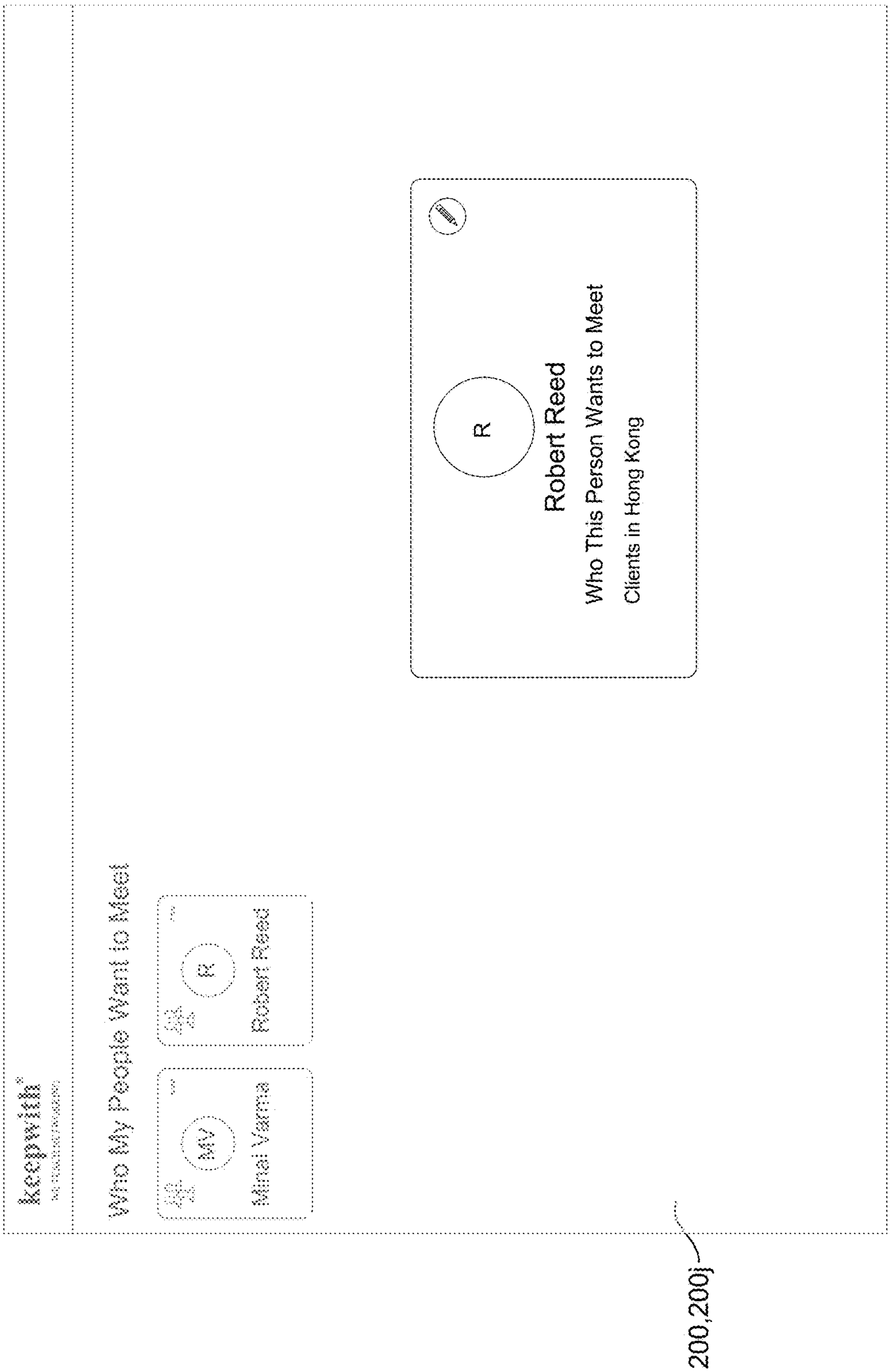

The networking strategy 216 (e.g., strategic networking plan) may also include candidate introductions (e.g., who my people want to meet) 223. FIGS. 221 and 22J show example GUI views 200, 200*i*, 200*j* including the candidate introductions 223. The candidate introductions 223 include other user accounts 150 the respective user account has a primary connection with and information on these other user accounts 150. For example, the candidate introductions 223 include information on a user account 150 of "Robert Reed" that a respective user account 150 has a primary relationship with. FIG. 22J shows information associated with user accounts Robert Reed is interested in meeting, for example, clients in Hong Kong.

Figure 22K:
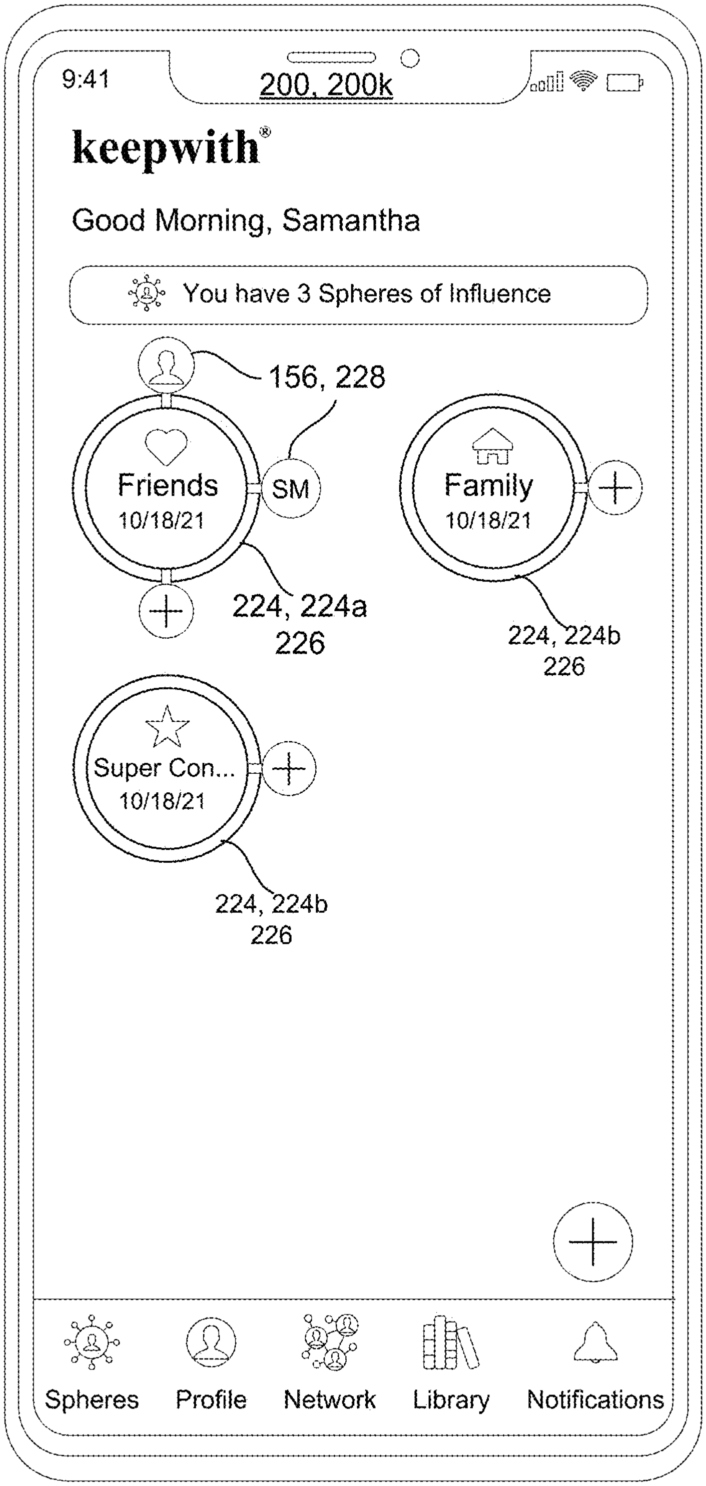

FIG. 22K shows an example GUI view 200, 200*k* including a plurality of spheres of influence 224 of the user account 150. Each respective sphere of influence includes at least one primary connection 156 of the plurality of connections 156 with another user 10 of the plurality of users 10, a classification 226, and a ranking 228. For example, as shown in FIG. 22H the user account 150 includes three spheres of influence 224, 224*a-c* having a classification 226 of friends, family, and superconnectors, respectively. In this example, the friends classification 226 includes two primary connections 156 between the respective user account 150 and other user accounts 150. As such, the respective user account 150 identifies the two primary connections 156 as primary relationship with user accounts of friends of the respective user account 150.

Moreover, each primary connection 156 in the sphere of influence 224 includes the ranking 228 indicating a connection strength between the respective user account 150 and the other user account 150. For example, the user associated with the respective user account 150 may provide a ranking 228 of 0.9 for a first primary connection with a first user and a ranking 228 of 0.4 for a second primary connection with a second user. Here, the ranking 228 of 0.9 represents a greater connection strength between the user associated with the respective user account 150 and the first user as compared to the ranking 228 of 0.4 between the user associated with the respective user account 150 and the second user. Advantageously, the spheres of influence 224 allow users visualize different classifications 226 (e.g., connection type) and the corresponding ranking 228 for each primary connection 156 in the classification 226.

Figure 23:
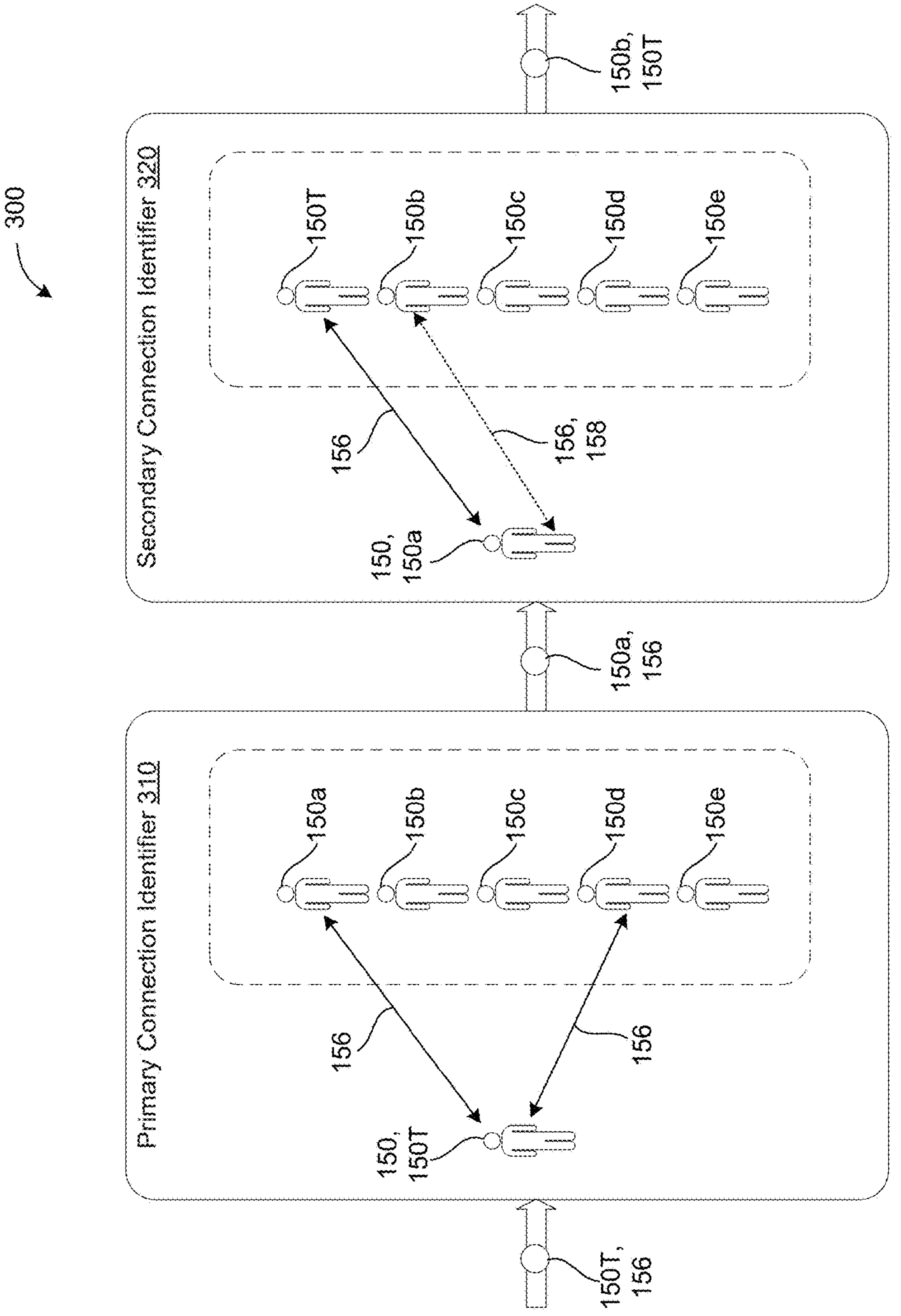
FIG. 23 is a schematic view of an example connection identifier.

Referring now to FIG. 23, the connection identifier 300 obtains the plurality of user accounts 150 and determines the target user account 150T from among the plurality of user accounts 150. Each user account 150 includes a corresponding user profile 152, network goal 154, and one or more primary connections 156. The target user account 150T may be any user account 150 of the plurality of user accounts 150. The connection identifier 300 is configured to identify primary connections 156 and secondary connections 158 for the target user account 150T. Each primary connection 156 defines a primary relationship between two user accounts 150. The primary relationship is a direct connection between the two user accounts 150. The direct connection may include a connection between the two user accounts on the networking application 140 or a connection between the users of the two user accounts on another application of their respective user devices 110 (FIG. 21) such as a contact application or email application. On the other hand, each secondary connection 158 defines a secondary relationship between two user accounts 150. The secondary relationship defines both of the two user accounts having a shared primary relationship with another user accounts 150. Here, the two user accounts 150 lack a primary relationship with one another, but each user account 150 of the two user accounts 150 includes a respective primary relationship with common other user account 150.

The connection identifier 300 includes a primary connection identifier 310 and a secondary connection identifier 320. The primary connection identifier 310 may receive the target user account 150T and the plurality of primary connections 156 corresponding to the target user account 150T. Thus, the primary connection identifier 310 identifies one or more other user accounts 150 having a primary relationship with the target user account 150T using the corresponding plurality of primary connections 156. As shown in FIG. 23, the target user account 150T includes two primary connections 156 (e.g., denoted by the solid double arrow line) with other user accounts 150 of the plurality of users accounts 150, 150*a-e*. Namely, the target user account 150T includes a primary connection 156 with a first user account 150*a* and another primary connection 156 with a fourth user account 152*d*. The use of five user accounts 150 and two primary connections 156 is exemplary only, as it is understood that there may be any number of user accounts 150 in the plurality of user accounts 150 and any number of primary connections 156.

The secondary connection identifier 320 is configured to receive the user accounts 150 identified by the first connection identifier 320 as having a primary connection 156 with the target user account and determine secondary connections 158 for the target user account 150T. Continuing with the example above, the secondary connection identifier 320 receives the first user account 150*a* identified by the primary connection identifier 310 and determines a secondary connection 158 for the target user account 150T with a second user account 152, 150*b*. In particular, the secondary connection identifier 320 identifies the first user account 150*a* having a primary connection 156 with the target user account 150T (e.g., denoted by the solid double arrow line) and another primary connection 156 (e.g., denoted by the dotted double arrow line) with the second user account 150*b*. Using the primary connections 156 of the first user account 150*a*, the secondary connection identifier 320 determines that the second user account 150*b* lacks a primary relationship (e.g., primary connection 156) with the target user account 150T. As such, the dotted double arrow line indicates the primary connection 156 between the first and second user accounts 150*a*, 150*b* and the secondary connection 158 between the target user account 150T and the second user account 150*b*. Stated differently, because the target user account 150T and the second user account 150*b* lack a primary relationship with one another, but both have a shared primary relationship with the first user account 150*a*, the secondary connection 158 exists between the target user account 150T and the second user account 150*b*. The secondary connection identifier 320 transmits the second user account 150*b* and the target user account 150T to the neural network 400.

FIG. 23 shows the secondary connection identifier 320 determining secondary connections 158 for the target user account 150T using only one of the identified primary connections 156 (e.g., first user account 150*a*) of the target user account 150T for the sake of brevity only. That is, it is understood that the secondary connection identifier 320 would repeat this process for all other primary connections 156 (e.g., fourth user profile 152*d*) identified by the primary connection identifier 310. Moreover, it is understood that the connection identifier 300 would repeat this process for all target user accounts 150T (e.g., each user account 150 in the plurality of user accounts 150 that is determined as the target user account 150T).

Figure 24A:
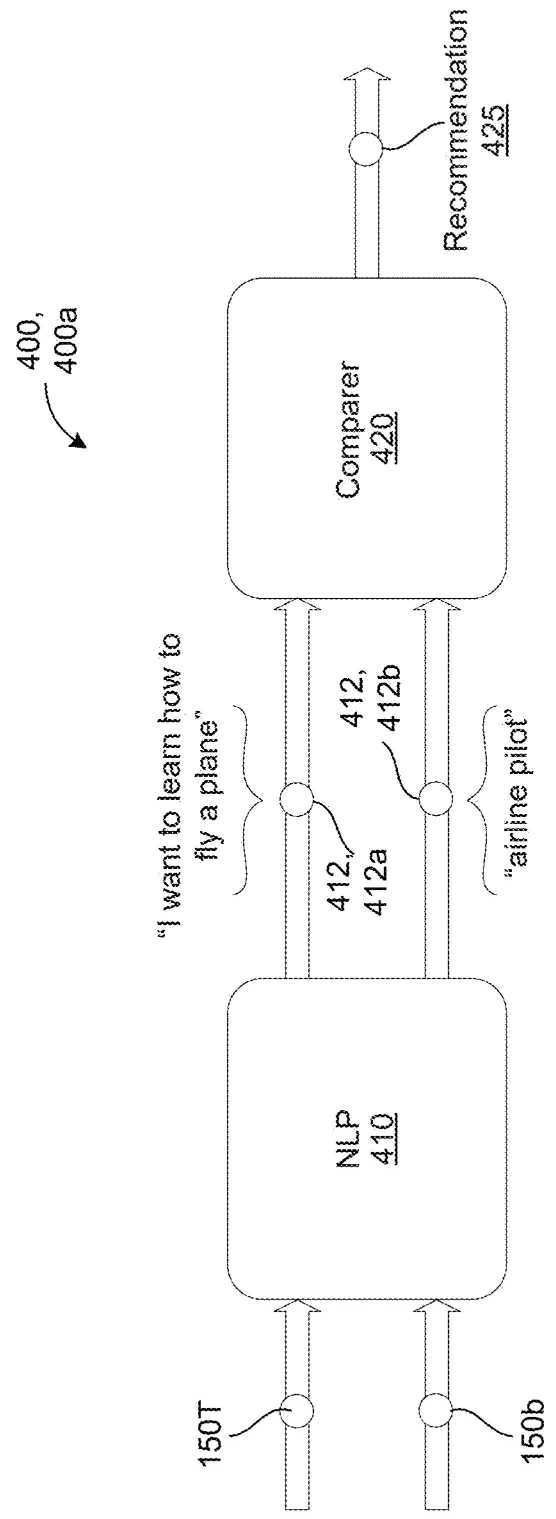
FIGS. 24A and 24B are schematic views of an example neural network.
Figure 24B:
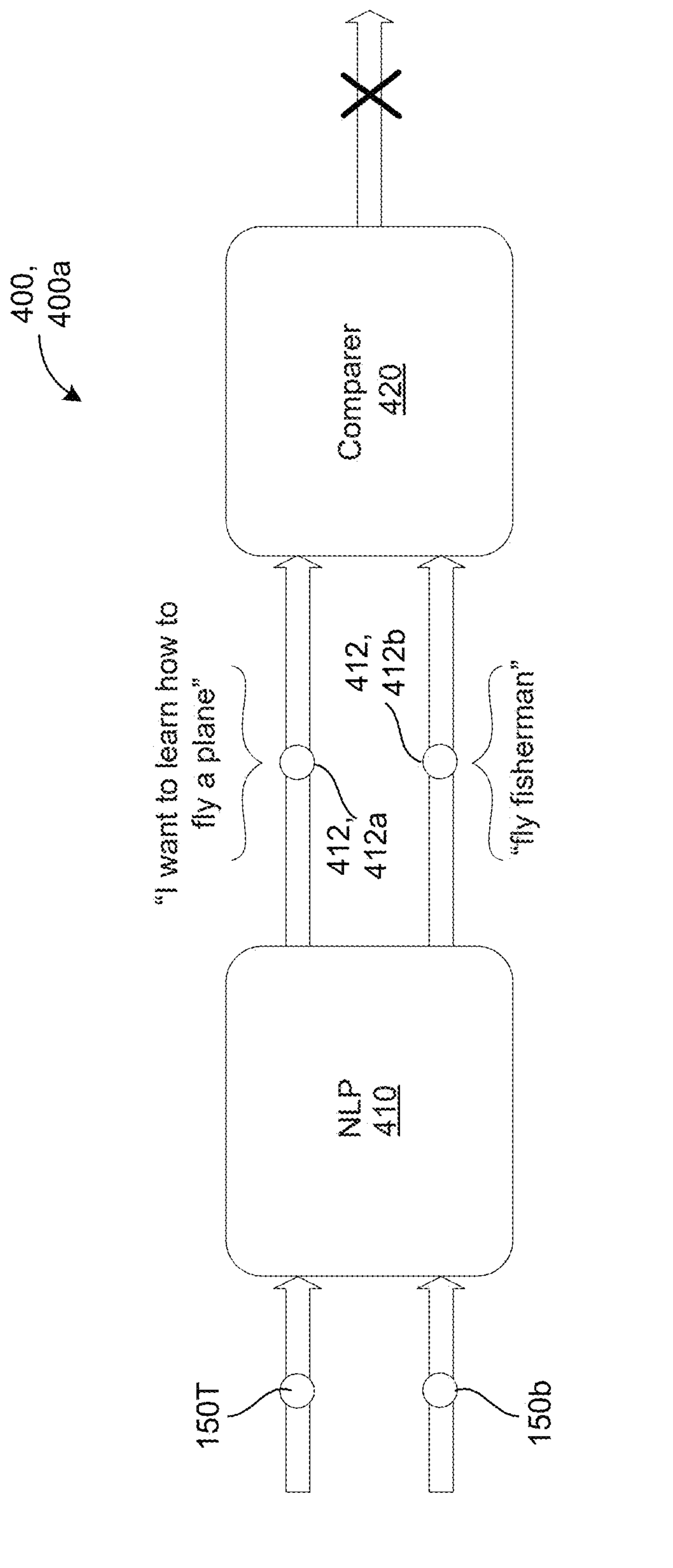

Referring now to FIGS. 24A and 24B, the neural network 400 is configured to determine whether to generate a networking recommendation 425 to initiate an introduction between a user associated with the target user account 150T and a user associated with the second user account 150*b*. The neural network 400 includes a natural language processing (NLP) module 410 and a comparer 420. The NLP module 410 receives the target user account 150T and the second user account 150*b*, and generates corresponding NLP outputs 412. The NLP outputs 412 provide an understanding (e.g., semantic representation) corresponding to text of the user accounts 150 (e.g., text of the user profiles 152) for the neural network 400. Thus, the neural network 400 generates (or does not generate) the networking recommendation 425 based on comparing the NLP outputs 412. In some examples, the NLP module 410 generates multiple NLP outputs 412 for each user account 150. Here, each NLP output corresponds to a respective portion of text of the user account 150.

The NLP module 410 generates a target NLP output 412, 412*a* by applying NLP on text corresponding to the target user account 150T. For instance, the NLP module 410 may apply NLP on text corresponding to the user profile 152 and/or the network objective 154 of the target user account 150T. The NLP module 410 may generate multiple target NLP outputs 412*a* each corresponding to a different portion of text of the network objective 154. Moreover, the NLP module 410 generates a candidate NLP output 412, 412*b* by applying NLP on text corresponding to the second user account 150*b*.

The comparer is configured to receive, as input, the NLP outputs 412 generated by the NLP module 410 and generate (or refrain from generating), as output, the networking recommendation 425 based on comparing the NLP outputs 412. That is, using the NLP outputs 412 the comparer is able to understand from the semantic representations whether an introduction between the target user account 150T and the second user account 150*b* would be beneficial. In particular, the comparer 420 determines a matching score 422 using the target NLP output 412*a* and the candidate NLP output 412*b*. The matching score represents a likelihood that the user associated with the target user account 150T and the user associated with the second user account 150*b* would like to establish a primary relationship with one another. Stated differently, the matching score represents a similarity from the network objective 154 of the target user account 150T and the skills and information of the second user account 150*b*.

Thereafter, the comparer 420 determines whether the matching score satisfies a matching score threshold. In some examples, based on determining that the matching score satisfies the matching score threshold, the comparer 420 generates the networking recommendation 425. In other examples, based on determining that the matching score fails to satisfy the matching score threshold, the comparer 420 refrains from (e.g., does not) generate the networking recommendation 425.

As shown in FIG. 24A, the NLP module 410 of an example neural network model 400, 400*a* receives the target user account 150T and the second user account 150*b* (e.g., identified by the connection identifier 300 in FIG. 23). The NLP module 410 generates a target NLP output 412*a* corresponding to the target user account 200T by applying NLP on text corresponding to the target user account 150T.

For example, the NLP module 410 applies NLP on text of the network objective 154 of the target user account 150T corresponding to "I want to learn how to fly a plane" to generate the target NLU output 412*a*. In this example, the NLP module 410 also applies NLP on text of the second user account 150*b* corresponding to "airline pilot" to generate the candidate NLU output 412*b*. Here, the comparer 420 generates a matching score 422 using the target NLU output 412*a* and the candidate NLU output 412*b* by comparing the semantic representations. That is, the comparer 420 is able to determine (i.e., understand) that the user associated with the second user account 150*b* being an airline pilot may be able to help the user associated with the target user account 150T achieve its network objective 154 of learning to fly a plane. Thus, in this example, the comparer 420 generates the networking recommendation 425 based on determining that the matching score 422 satisfies the matching score threshold.

Referring now to FIG. 24B, the NLP module 410 of an example neural network model 400, 400*b* receives the target user account 150T and the second user account 150*b*. The NLP module 410 generates the target NLP output 412 corresponding to the target user account 200T by applying NLP on text corresponding to the target user account 150T. For example, the NLP module 410 applies NLP on text of the network objective 154 of the target user account 150T corresponding to "I want to learn how to fly a plane" to generate the target NLU output 412*a*. In this example, the NLP module 410 also applies NLP on text of the second user account 150*b* corresponding to "fly fisherman" to generate the candidate NLU output 412*b*. Here, the comparer 420 generates a matching score 422 using the target NLU output 412*a* and the candidate NLU output 412*b* by comparing the semantic representations. That is, the comparer 420 is able to determine (i.e., understand) that the user associated with the second user account 150*b* being an fly fisherman would likely not be able to help the user associated with the target user account 150T achieve its network objective 154 of learning to fly a plane. Thus, in this example, the comparer 420 does not generate the networking recommendation 425 based on determining that the matching score 422 fails to satisfy the matching score threshold denoted by the "X" shown in FIG. 24B.

Figure 25A:
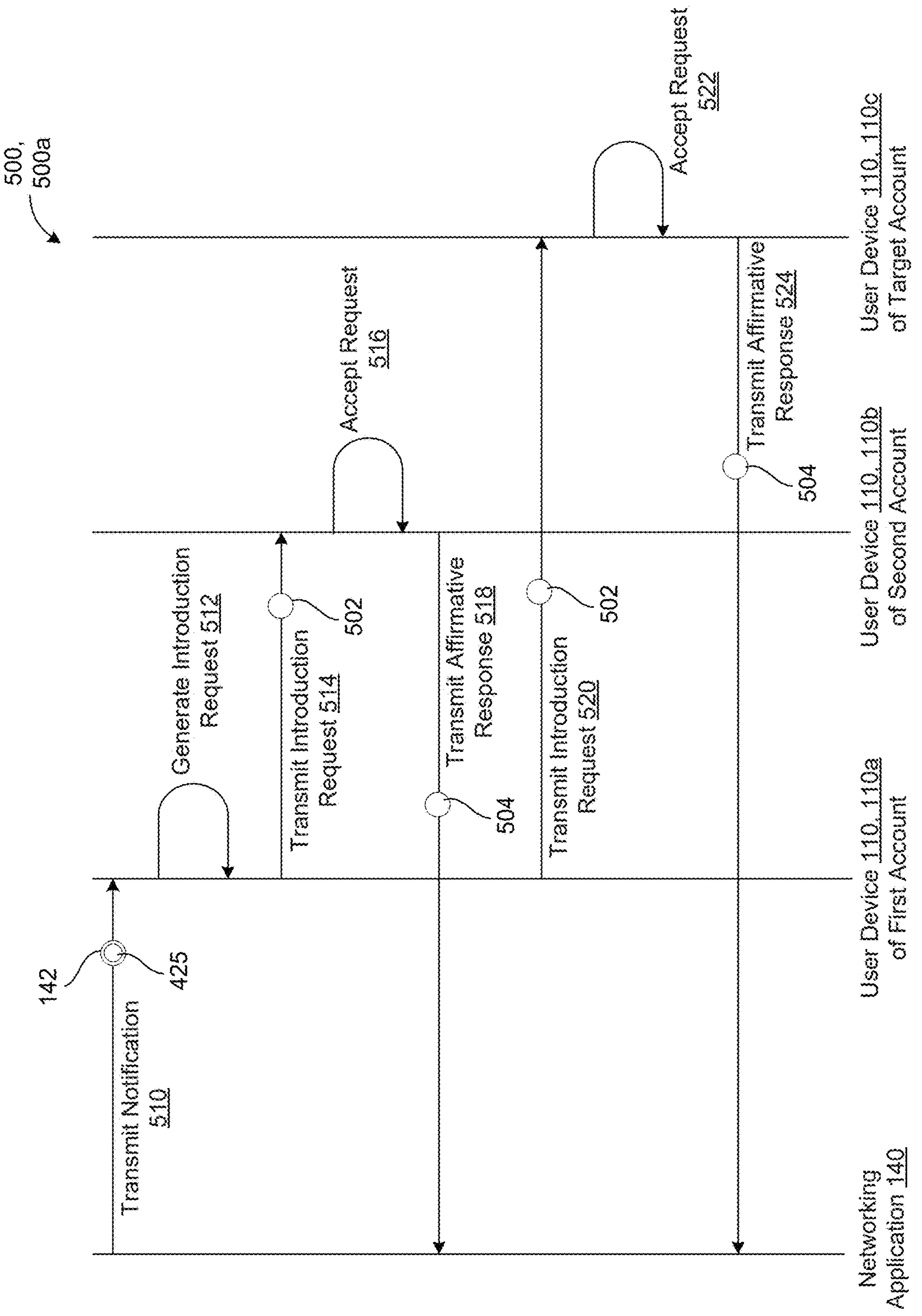
FIGS. 25A and 25B are schematic views of an example sequence diagram for generating a primary connection between a target user account and a second user account.
Figure 25B:
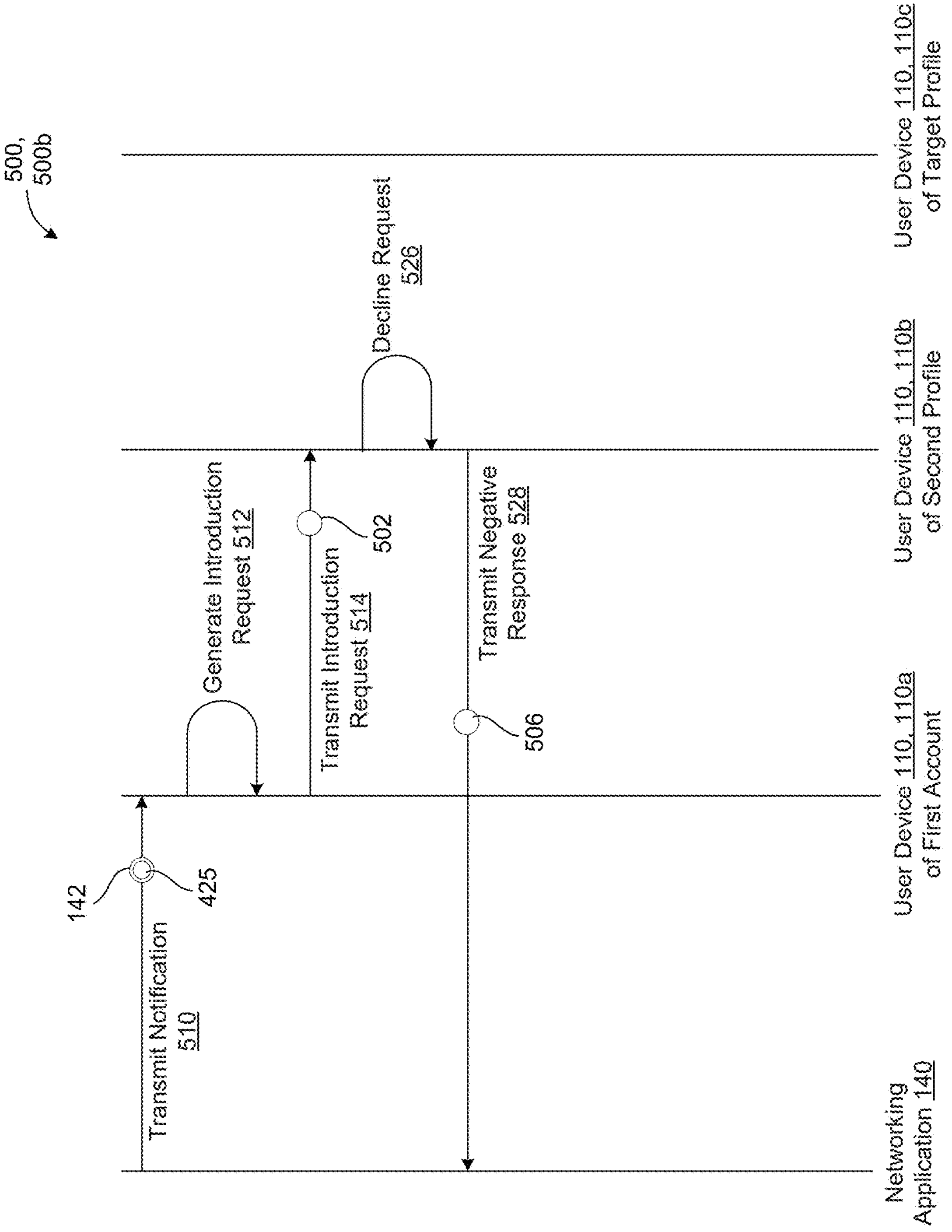

FIGS. 25A and 25B show an example sequence diagram 500 including steps for generating a primary connection (FIG. 25A), or not generating the primary connection (FIG. 25B), between the target user account 150T and the second user account 150*b*. The steps begin at the top of the Y-axis (i.e., the earliest point in time) and proceed in order down the Y-axis. The order of steps is exemplary only, as it is understood that the steps may occur in any order and one or more of the steps may occur simultaneously. The parallel vertical lines represent the networking application 140, a first user device 110, 110*a* associated with the first user account 150*a*, a second user device 110, 110*b* associated with the second user account 150*b*, and a third user device 110, 110*c* associated with the target user account 140T, respectively.

Referring now to FIG. 25A that shows an example sequence diagram 500, 500*a*. At step 510, when the networking application 140 generates the networking recommendation 425, the networking application 140 transmits the notification 142 including the networking recommendation 425 to the first user device 110*a*. For example, the notification 142 may indicate to the user associated with the first user account 150*a* that the second user account 150*b* and lacks a primary relationship with the target user account 150T. Moreover, the notification 142 indicates that the user associated with the second user account 150*b* may be able to help the user associated with the target user account 150T achieve one of its network objectives 154.

At step 512, the first user device 110*a* may generate the introduction request 502 based on user input. That is, the user associated with the first user account 150*a* provides user input at the first user device 110*a* to generate (or not generate) an introduction request 502. The introduction request 502 may indicate that the user associated with the first user account 150*a* wants to initiate an introduction between the user associated with the target user account 150T and the user associated with the second user account 150*b*. Each user may accept or deny the introduction request 502 by providing user input at their respective user device 110.

At step 514, the first user device 110*a* may transmit the introduction request 502 to the second user device 110*b*. Alternatively, the first user device 110*a* may transmit the introduction request 502 to the networking application 140 and the networking application 140 may forward the introduction request 502 to the second user device 110*b* (not shown). At step 516, the user associated with the second user account 150*b* may accept the introduction request 502 by providing an affirmative response 504 to the second user device 110*b*. At step 518, the second user device 110*b* transmits the affirmative response 504 to the networking application 140.

Similarly steps 514-518 are repeated for the target user account 150T. Namely, at step 520, the first user device 110*a* may transmit the introduction request 502 to the third user device 110*c*. At step 522, the user associated with the target user account 150T may accept the introduction request 502 by providing an affirmative response 504 to the third user device 110*c*. At step 524, the third user device 110*c* transmits the affirmative response 504 to the networking application 140. As such, based on the networking application 140 receiving the affirmative responses 504 from both the second user account 150*b* and the target user account 150T (e.g., double opt-in), the networking application 140 generates a primary relationship (e.g., primary connection 156) between the second user account 150*b* and the target user account 150T.

Referring now to FIG. 25B that shows an example sequence diagram 500, 500*b*. Here, steps 510-514 are identical to FIG. 25A. At step 526, however, the user associated with the second user account 150*b* may reject the introduction request 502 by providing a negative response 506 to the second user device 110*b*. At step 528, the second user device 110*b* transmits the negative response 506 to the networking application 140. Notably, based on the networking application 140 receiving the negative response 506 from the second user device 110*b*, the networking application 140 will not generate a primary connection 156 between the second user account 150*b* and the target user account 150T. That is, because generating the primary connection 156 requires an affirmative response from both user accounts 150, if either user account 150 provides the negative response 506 the networking application will not generate the primary connection 156.

Figure 26:
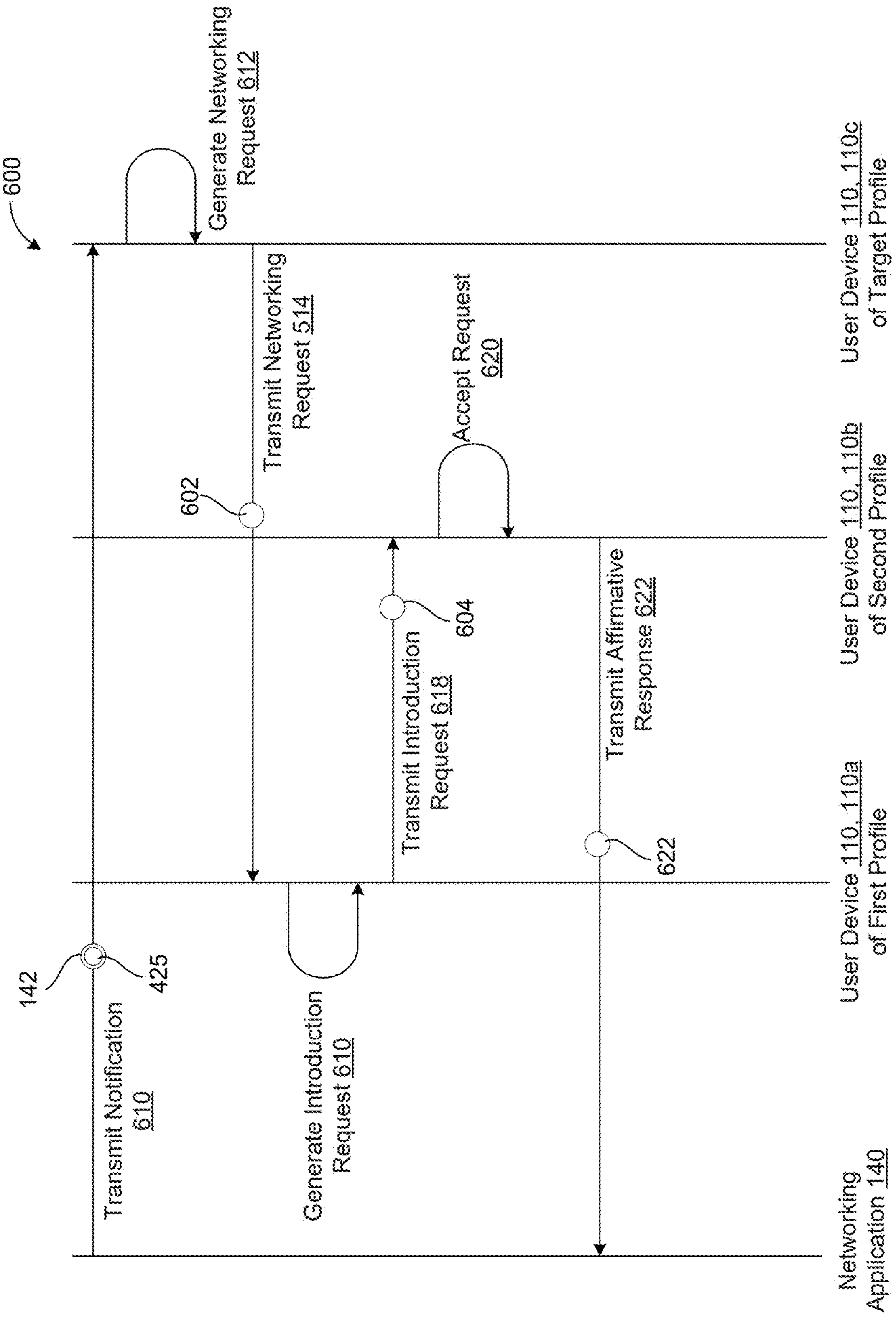
FIG. 26 is a schematic view of another example sequence diagram for generating a primary connection between a target user account and a second user account.

FIG. 26 shows another example sequence diagram 600 including steps for generating a primary between the target user account 150T and the second user account 150*b*. The steps begin at the top of the Y-axis (i.e., the earliest point in time) and proceed in order down the Y-axis. The order of steps is exemplary only, as it is understood that the steps may occur in any order and one or more of the steps may occur simultaneously. The parallel vertical lines represent the networking application 140, a first user device 110, 110*a* associated with the first user account 150*a*, a second user device 110, 110*b* associated with the second user account 150*b*, and a third user device 110, 110*c* associated with the target user account 140T, respectively.

At step 610, when the networking application 140 generates the networking recommendation 425, the networking application 140 transmits the notification 142 including the networking recommendation 425 to the third user device 110*a*. For example, the notification 142 may indicate to the user associated with the target user account 150T that the user associated with the first user account 150*a* has a primary relationship with the user associated with the second user account 150*b*. Moreover, the notification may indicate that user associated with the second user account 150*b* may be able to help the user associated with the target user account 150T achieve its network objective 154.

At step 612, the third user device 110*c* may generate the networking request 602 based on user input. The networking request 602 may indicate to the user associated with the first user account 150*a* that the user associated with the target user account 150T wants an introduction with the user associated with the second user account 150*b*. Notably, because the target user account 150T lacks a primary relationship with the second user account 150*b*, the target user account 150T is unable to directly request a connection with the second user account 150*b*. Instead, the introduction must be facilitated by mutual connection that both user profiles have with the first user account 150*a*.

At step 614, the third user device 110*c* may transmit the networking request 602 to the first user device 110*a*. Alternatively, the third user device 110*c* may transmit the networking request 602 to the networking application 140 and the networking application 140 may forward the networking request 602 to the first user device 110*a* (not shown). At step 616, the first user device 110*a* may generate an introduction request 604 based on user input. That is, the user associated with the first user account 150*a* provides user input at the first user device 110*a* to generate (or not generate) the introduction request 604. The introduction request 604 may indicate that the user associated with the first user account 150*a* wants to initiate an introduction between the user associated with the target user account 150T and the user associated with the second user account 150*b*.

At step 618, the first user device 110*a* may transmit the introduction request 604 to the second user device 110*b*. Alternatively, the first user device 110*a* may transmit the introduction request 604 to the networking application 140 and the networking application 140 may forward the introduction request 604 to the second user device 110*b* (not shown). At step 620, the user associated with the second user account 150*b* may accept the introduction request 604 by providing an affirmative response 606 to the second user device 110*b*. At step 622, the second user device 110*b* transmits the affirmative response 606 to the networking application 140. Here, the networking application 140 may generate the primary connection 156 between the target user account 150T and the second user account 150*b* based on consent from both user accounts. That is, because the target user account 150T generated the networking request 602 and the second user account 150*b* accepted the introduction request 604, both user accounts 150 have consented to the introduction.

Accordingly, as described above, the networking application 140 identifies secondary connections 158 with other user profiles 152 that may match the network objective 154 of the target user account 150T. Even though the target user account 150T lacks a primary relationship with the other user profiles 152 of the secondary connections 158, both the target user account 150T and the other user profiles (e.g., a second user account 150*b*) include a shared primary connection 158 with a first user account 150*a*. As such, the networking application 140 may prompt the first user account 150*a*, via the notification 142, to initiate an introduction between the target user account 150T and the second user account 150*b*.

Advantageously, the initiated introduction from a mutual connection simulates the experience of an in-person networking experience. Moreover, the networking application 140 only generates the notification 142 including the networking recommendation 245 when the text of the second user account 150*b* sufficiently matches the text of the networking objective 154 of the target user account 150T. The networking recommendation must be accepted by both user accounts 150 (e.g., double opt-in required) whereby one of the user accounts cannot establish the connection alone. User accounts 150 cannot view information with other user accounts they do not have a primary relationship with. That is, user accounts can only view information of other user accounts that they do have a primary relationship with.

Figure 27:
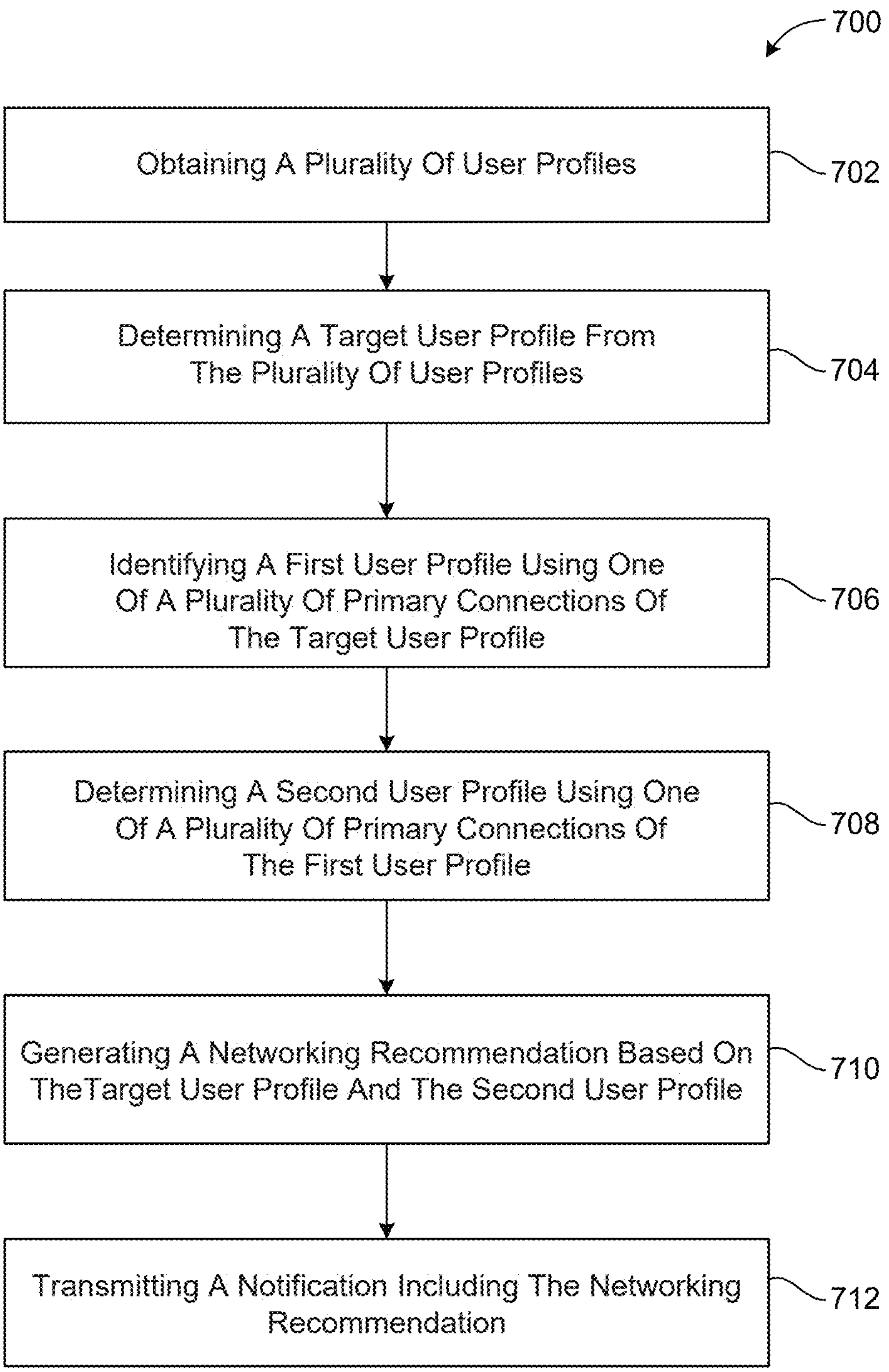
FIG. 27 is a flow chart of an example arrangement of operations for a computer-implemented method of generating a networking recommendation for a user account.
Figure 28:
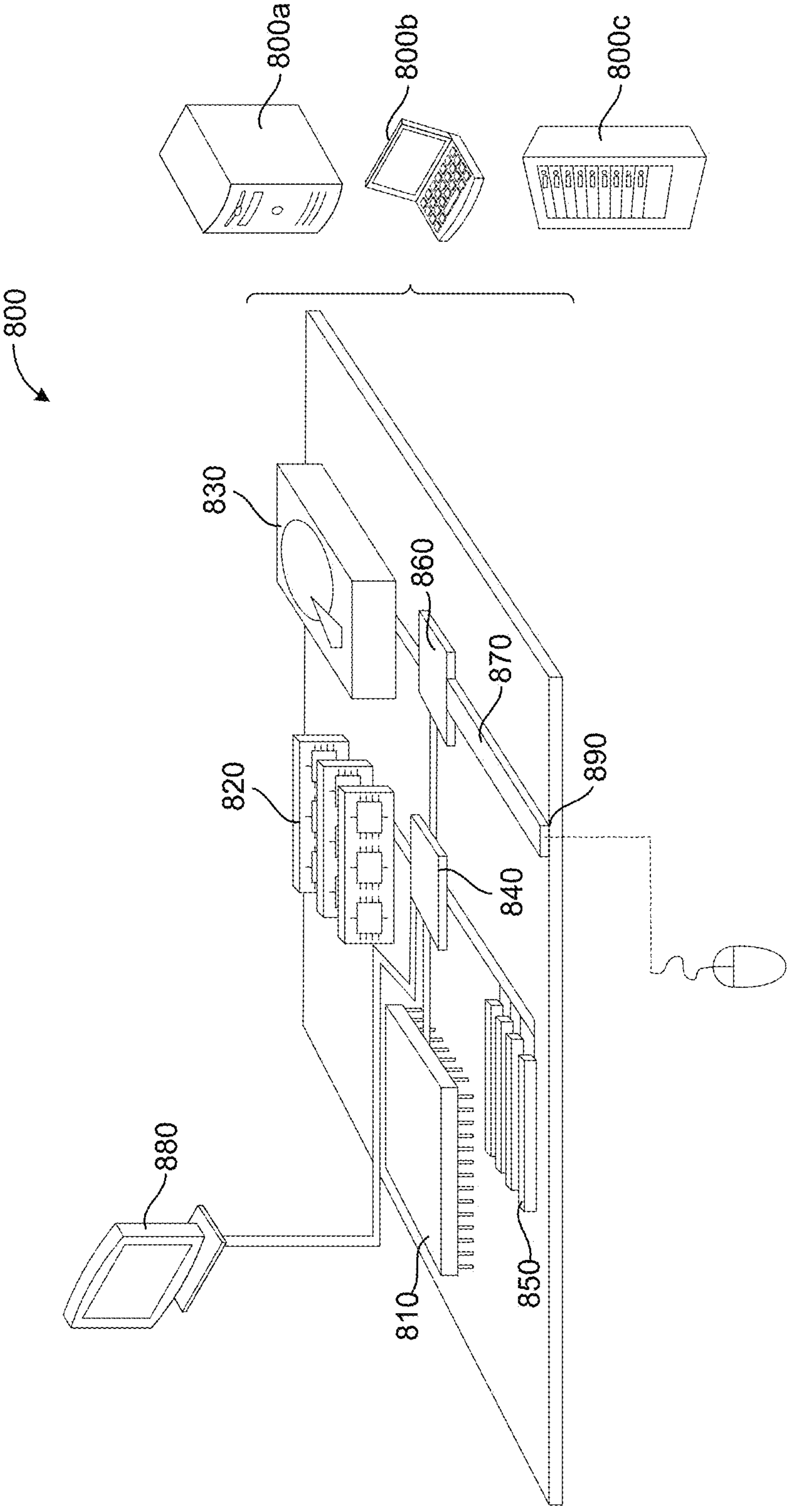
FIG. 28 is a schematic view of an example computing device that may be used to implement the systems and methods described herein.

FIG. 27 is a flowchart of an example arrangement of operations for a computer-implemented method 700 of generating a networking recommendation for a user profile. The method 700 may execute on data processing hardware 810 (FIG. 27) using instructions stored on memory hardware 820 (FIG. 28). The data processing hardware 810 and the memory hardware 820 may reside on the user device 110 and/or the cloud computing environment 130 of FIG. 21 corresponding to a computing device 800 (FIG. 28).

At operation 702, the method 700 includes obtaining a plurality of user accounts 150, 150*a-n*. Here, each respective user account 150 of the plurality of user account includes a user profile, a network goal 154, and a plurality of primary connections 156. Each primary connection 156 defines a primary relationship between the respective user profile 152 and a different user account 150 of the plurality of user accounts 150. At operation 704, the method 700 includes determining a target user account 152, 150T from the plurality of user accounts 150. At operation 706, the method 700 includes identifying a first user account 152, 150*a* using one of the plurality of primary connections 156 of the target user account 150T. At operation 708, the method 700 includes determining a second user account 152, 150*b* using one of the plurality of primary connections 156 of the first user account 150*a*. At operation 710, the method 700 includes generating a networking recommendation 425 based on text corresponding to the network objective 154 of the target user account 150T and text corresponding to the second user account 150*b*. At operation 712, the method 700 includes transmitting a notification 142 that includes the networking recommendation 425 to a user device 110 associated with the first user account 150*a*.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

FIG. 28 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800*a* or multiple times in a group of such servers 800*a*, as a laptop computer 800*b*, or as part of a rack server system 800*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

Clauses

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

A method includes obtaining a plurality of user accounts each including a user profile, a network strategy, and plurality of primary connections. Each primary connection defines a primary relationship between a respective user account and a different user account. The method also includes determining a target user account from the plurality of user accounts and identifying a first user account using one of the plurality of primary connections of the target user account. The method also includes determining a second user account using one of the plurality of primary connections of the first user account. Here, the second user account lacks a primary relationship with the target user account. The method also includes generating a networking recommendation based on text corresponding to the target user account and text corresponding to the second user account. The method also includes transmitting a notification including the networking recommendation to a user device.

We disclose the following clauses:

Clause Set 1

1. A computer-implemented method when executed by data processing hardware causes the data processing hardware to perform operations comprising:

obtaining a plurality of user accounts of a platform, each respective user account of the plurality of user accounts comprising:

a user profile;

a network strategy comprising at least one of current connections, candidate connections, network goals, networking tasks, networking events, networking introductions, candidate introductions, and an ability to invite users to the platform; and a plurality of primary connections, each primary connection of the plurality of primary connections defining a primary relationship between the respective user account and a different user account of the plurality of user accounts;

determining a target user account from the plurality of user accounts;

identifying, using one of the plurality of primary connections of the target user account, a first user account;

determining, using one of the plurality of primary connections of the first user account, a second user account, the second user account lacking a primary relationship with the target user account;

generating, based on text corresponding to the network goals of the target user account and text corresponding to the second user account, a networking recommendation; and transmitting, to a user device associated with the first user account, a notification comprising the networking recommendation.

2. The computer-implemented method of clause 1, wherein the operations further comprise transmitting, to a user device associated with the target user account, the notification comprising the networking recommendation.

3. The computer-implemented method of clause 1, wherein the networking recommendation comprises a recommendation for a user associated with the first user account to initiate an introduction between a user associated with the target user account and a user associated with the second user account.

4. The computer-implemented method of clause 3, wherein the operations further comprise:

receiving, from the user device associated with the first user account, an introduction request to initiate the introduction between the user associated with the target user account and the user associated with the second user account; and transmitting, to a user device associated with the target user account and a user device associated with the second user account, the introduction request.

5. The computer-implemented method of clause 4, wherein the operations further comprise:

receiving an affirmative response from both the user device associated with the target user account and the user device associated with the second user account; and generating a primary connection between the target user account and the second user account based on receiving the affirmative responses from both the user device associated with the target user account and the user device associated with the second user account.

6. The computer-implemented method of clause 4, wherein the operations further comprise:

receiving at least one negative response from either the user device associated with the target user account or the user device associated with the second user account; and determining not to generate a primary connection between the target user account and the second user account based on receiving the at least one negative response from either the user device associated with the target user account or the user device associated with the second user account.

7. The computer-implemented method of clause 1, wherein determining the networking recommendation comprises:

generating, using a neural network model, a target natural language processing (NLP) output corresponding to the text of the network goal of the target user account;

generating, using the neural network model, a candidate NLP output corresponding to the text of the second user account; and determining a matching score using the target NLP output and the candidate NLP output.

8. The computer-implemented method of clause 7, wherein the operations further comprise:

determining that the matching score satisfies a matching score threshold; and transmitting the notification comprising the networking recommendation based on determining that the matching score satisfies the matching score threshold.

9. The computer-implemented method of clause 1, wherein the operations further comprise training a neural network model.

10. The computer-implemented method of clause 1, wherein each respective user account of the plurality of user accounts further comprises a plurality of spheres of influence, each respective sphere of influence comprising: at least one primary connection of the plurality of primary connections;

a classification representing a connection type of each primary connection of the at least one primary connections; and for each respective primary connection of the at least one primary connection, a ranking indicating a connection strength.

11. A system comprising:

data processing hardware; and memory hardware in communication with the data processing hardware, the memory hardware storing instructions that when executed on the data processing hardware cause the data processing hardware to perform operations comprising:

obtaining a plurality of user accounts of a platform, each respective user account of the plurality of user accounts comprising:

a user profile;

a network strategy comprising at least one of current connections, candidate connections, network goals, networking tasks, networking events, networking introductions, candidate introductions, and an ability to invite users to the platform; and a plurality of primary connections, each primary connection of the plurality of primary connections defining a primary relationship between the respective user account and a different user account of the plurality of user accounts;

determining a target user account from the plurality of user accounts;

identifying, using one of the plurality of primary connections of the target user account, a first user account;

determining, using one of the plurality of primary connections of the first user account, a second user account, the second user account lacking a primary relationship with the target user account;

generating, based on text corresponding to the network goals of the target user account and text corresponding to the second user account, a networking recommendation; and transmitting, to a user device associated with the first user account, a notification comprising the networking recommendation.

12. The system of clause 11, wherein the operations further comprise transmitting, to a user device associated with the target user account, the notification comprising the networking recommendation.

13. The system of clause 11, wherein the networking recommendation comprises a recommendation for a user associated with the first user account to initiate an introduction between a user associated with the target user account and a user associated with the second user account.

14. The system of clause 13, wherein the operations further comprise:

receiving, from the user device associated with the first user account, an introduction request to initiate the introduction between the user associated with the target user account and the user associated with the second user account; and transmitting, to a user device associated with the target user account and a user device associated with the second user account, the introduction request.

15. The system of clause 14, wherein the operations further comprise:

receiving an affirmative response from both the user device associated with the target user account and the user device associated with the second user account; and generating a primary connection between the target user account and the second user account based on receiving the affirmative responses from both the user device associated with the target user account and the user device associated with the second user account.

16. The system of clause 14, wherein the operations further comprise:

receiving at least one negative response from either the user device associated with the target user account or the user device associated with the second user account; and determining not to generate a primary connection between the target user account and the second user account based on receiving the at least one negative response from either the user device associated with the target user account or the user device associated with the second user account.

17. The system of clause 11, wherein determining the networking recommendation comprises:

generating, using a neural network model, a target natural language processing (NLP) output corresponding to the text of the network goal of the target user account;

generating, using the neural network model, a candidate NLP output corresponding to the text of the second user account; and determining a matching score using the target NLP output and the candidate NLP output.

18. The system of clause 17, wherein the operations further comprise:

determining that the matching score satisfies a matching score threshold; and transmitting the notification comprising the networking recommendation based on determining that the matching score satisfies the matching score threshold.

19. The system of clause 11, wherein the operations further comprise training a neural network model.

20. The system of clause 11, wherein each respective user account of the plurality of user accounts further comprises a plurality of spheres of influence, each respective sphere of influence comprising:

at least one primary connection of the plurality of primary connections;

a classification representing a connection type of each primary connection of the at least one primary connections; and for each respective primary connection of the at least one primary connection, a ranking indicating a connection strength.

Clause Set 2

1. A computer-implemented method for generating artificial intelligence-based networking recommendations, the method comprising:

obtaining, by data processing hardware, a plurality of user accounts of a networking platform, each respective user account comprising (i) a user profile including profile text, (ii) network goals including goal text, and (iii) a plurality of primary connections defining primary relationships with other user accounts;

selecting a target user account from the plurality of user accounts;

identifying, from the plurality of primary connections of the target user account, a first user account having a primary relationship with the target user account;

identifying, based on primary connections of the first user account, a second user account that lacks a primary relationship with the target user account, such that the target user account and the second user account are secondary connections via the first user account;

invoking an artificial intelligence agent that comprises: (a) a transformer-based large language model (LLM), (b) a memory subsystem configured to store at least one of session state or outcomes of prior introductions, and (c) a tool-interface subsystem configured to access external resources;

generating, using the LLM, (i) a target semantic representation derived from the goal text of the target user account and (ii) a candidate semantic representation derived from the profile text of the second user account;

determining a matching score based on a comparison of the target semantic representation and the candidate semantic representation;

retrieving, by the tool-interface subsystem, context from one or more external data sources for augmenting the LLM, wherein the retrieving is performed under an access-control policy that limits retrieved information about the second user account to information accessible to the first user account via the primary relationship;

generating, by the LLM using the retrieved context, a networking recommendation that identifies a recommended introduction between the target user account and the second user account, the networking recommendation being generated responsive to the matching score satisfying a threshold; and transmitting, to a user device associated with the first user account, a notification comprising the networking recommendation.

2. The method of clause 1, wherein generating the target semantic representation and the candidate semantic representation comprises computing context-aware token representations using self-attention over an input sequence that includes at least a portion of the goal text and at least a portion of the profile text.

3. The method of clause 2, wherein the self-attention comprises multi-head attention in which a plurality of attention heads compute attention in parallel in different representation subspaces and an output of the plurality of attention heads is combined to form the context-aware token representations.

4. The method of clause 1, wherein retrieving the context comprises retrieval-augmented generation (RAG) operations including:

generating an embedding for at least one query derived from the goal text;

performing a semantic similarity search over a vector database storing indexed embeddings for documents or records of the one or more external data sources; and augmenting an input to the LLM with content associated with one or more search results returned by the semantic similarity search.

5. The method of clause 1, wherein retrieving the context and transmitting the notification are performed through a standardized context protocol that supports tool discovery and tool invocation for a plurality of tools exposed by one or more servers.

6. The method of clause 5, wherein the standardized context protocol comprises a host that executes an LLM client, a server that exposes at least one tool or resource, and a message format that comprises JSON-based remote procedure calls.

7. The method of clause 1, wherein the artificial intelligence agent iteratively generates and evaluates candidate recommended introductions by:

generating, using the LLM, a plurality of candidate second user accounts from among secondary connections of the target user account;

scoring respective candidates using the matching score; and selecting the second user account based on at least one of the matching score, the access-control policy, or a network strategy associated with the target user account.

8. The method of clause 1, further comprising applying low-rank adaptation (LoRA) to the LLM by training low-rank matrices that approximate weight updates while keeping base model weights frozen.

9. The method of clause 8, wherein the LoRA comprises a first adapter configured for domain adaptation for networking recommendations and a second adapter configured for formatting or style customization of recommendation outputs.

10. The method of clause 1, wherein the networking recommendation comprises a recommendation for a user associated with the first user account to initiate the recommended introduction between a user associated with the target user account and a user associated with the second user account.

11. The method of clause 10, further comprising:

receiving, from the user device associated with the first user account, an introduction request corresponding to the recommended introduction;

transmitting the introduction request to a user device associated with the target user account and a user device associated with the second user account;

receiving affirmative responses from both the target user account and the second user account; and establishing, based on receipt of the affirmative responses, a new primary connection defining a primary relationship between the target user account and the second user account.

12. The method of clause 1, wherein each respective user account further comprises a plurality of spheres of influence, each sphere of influence including at least one primary connection, a connection-type classification, and a ranking that indicates a connection strength, and wherein identifying the second user account is further based on at least one of the connection-type classification or the ranking.

13. The method of clause 1, wherein the LLM comprises a transformer-based architecture having stacked attention layers and feed-forward layers and is configured to generate the networking recommendation as natural language output.

14. The method of clause 1, further comprising updating at least one parameter of a model used by the artificial intelligence agent based on feedback indicating an acceptance, rejection, or usefulness of at least one prior networking recommendation.

15. The method of clause 1, wherein the network goals comprise at least one of an objective type, an object identifying a person or organization to connect with, a location, or an intended outcome describing a purpose of the network goals.

16. The method of clause 1, wherein the user profile comprises contact information, an about section describing interests or personality characteristics, and professional information comprising at least one of industries, organizations, roles, or skills.

17. The method of clause 1, wherein the LLM processes the goal text and the profile text using positional information associated with tokens to represent an order of tokens within an input sequence.

18. A system for generating artificial intelligence-based networking recommendations, the system comprising: one or more processors; and memory storing instructions that, when executed by the one or more processors, cause the system to:

obtain a plurality of user accounts of a networking platform from a data store, each user account comprising a user profile, network goals, and primary connections defining primary relationships;

identify, for a target user account, a first user account having a primary relationship with the target user account and a second user account that shares a primary relationship with the first user account and lacks a primary relationship with the target user account;

execute an artificial intelligence agent comprising a transformer-based LLM, a memory subsystem, and a tool-interface subsystem;

generate, using the LLM and at least one of retrieved context or stored outcomes in the memory subsystem, a networking recommendation to facilitate an introduction between the target user account and the second user account; and cause transmission, via the tool-interface subsystem, of a notification comprising the networking recommendation to a user device associated with the first user account.

19. The system of clause 18, further comprising a retrieval-augmented generation subsystem configured to retrieve context from one or more external knowledge sources using embedding-based semantic similarity search over a vector database, and to provide the retrieved context to the LLM for generating the networking recommendation.

20. The system of clause 18, wherein the tool-interface subsystem is configured to access external tools, resources, or prompts through a standardized context protocol that supports tool discovery and tool invocation.

21. The system of clause 20, wherein the standardized context protocol comprises a client that maintains a one-to-one communication link with a server exposing tools for at least one of messaging, calendar access, contact access, or file access.

22. The system of clause 18, wherein the memory subsystem comprises short-term memory for tracking an active introduction workflow and long-term memory for storing outcomes of prior introduction workflows, and wherein generating the networking recommendation is based on at least one stored outcome.

23. The system of clause 18, wherein the artificial intelligence agent comprises a planning component configured to generate candidate introductions, evaluate the candidate introductions against one or more constraints, and select an introduction to recommend.

24. The system of clause 18, further comprising at least one low-rank adaptation module coupled to the LLM, the at least one low-rank adaptation module comprising trainable low-rank matrices configured to provide parameter-efficient fine-tuning without modifying frozen base model weights.

25. The system of clause 18, wherein the system is configured to:

receive, responsive to the notification, an introduction request;

transmit the introduction request to devices associated with the target user account and the second user account; and establish a new primary connection between the target user account and the second user account only upon receipt of affirmative responses from both the target user account and the second user account.

26. The system of clause 18, wherein each user account further comprises a network strategy comprising at least one of current connections, candidate connections, networking tasks, networking events, networking introductions, candidate introductions, or an ability to invite additional users to the networking platform.

27. The system of clause 18, wherein each user account further comprises a plurality of spheres of influence that organize primary connections by connection-type classification and connection-strength ranking, and wherein the networking recommendation is further based on at least one sphere of influence.

28. The system of clause 18, wherein the system is configured to generate, for display with the networking recommendation, an explanation output identifying at least one of (i) a connection path through the primary connections used to identify the second user account or (ii) a source of retrieved context used to generate the networking recommendation.

29. A non-transitory computer-readable medium storing instructions that, when executed by one or more processors, cause the one or more processors to perform operations comprising:

instantiating an artificial intelligence agent comprising (i) a transformer-based LLM, (ii) a memory subsystem, and (iii) a tool-interface subsystem configured to access external data sources through a standardized context protocol;

obtaining a plurality of user accounts of a networking platform, each user account comprising a user profile, network goals, and primary connections defining primary relationships;

identifying a secondary connection between a target user account and a second user account that share a common first user account as a primary connection while lacking a primary connection with each other;

generating, using the LLM, semantic representations for text of the network goals of the target user account and text of the user profile of the second user account;

computing a matching score based on the semantic representations;

retrieving, through the standardized context protocol, context from at least one external knowledge source and augmenting an input to the LLM with the context; and generating, when the matching score exceeds a threshold, a networking recommendation for the first user account to facilitate an introduction between the target user account and the second user account, and transmitting a notification comprising the networking recommendation to a user device associated with the first user account.

30. The computer-readable medium of clause 29, wherein the LLM comprises multi-head attention configured to compute context-aware token representations in parallel across a plurality of attention heads.

31. The computer-readable medium of clause 29, wherein the standardized context protocol comprises a host, a client maintaining a one-to-one communication link with a server, and standardized messages that specify tool names, tool inputs, and tool outputs for invoking external services.

32. The computer-readable medium of clause 29, wherein retrieving the context comprises performing embedding-based semantic similarity search over a vector database storing indexed document vectors and providing content associated with one or more search results as additional context to the LLM.

33. The computer-readable medium of clause 29, wherein the operations further comprise applying low-rank adaptation (LoRA) to the LLM for parameter-efficient domain adaptation to networking recommendation tasks.

34. The computer-readable medium of clause 29, wherein establishing a new primary connection between the target user account and the second user account requires receiving affirmative responses from devices associated with both the target user account and the second user account.

35. The computer-readable medium of clause 29, wherein each user account further comprises a plurality of spheres of influence comprising primary connections organized by connection-type classification and connection-strength ranking, and wherein selecting the second user account is further based on at least one sphere of influence.

What is claimed is:

1. A computer-implemented method for generating artificial intelligence-based networking recommendations, the method comprising:

obtaining, by data processing hardware, a plurality of user accounts of a networking platform, each respective user account comprising (i) a user profile including profile text, (ii) network goals including goal text, and (iii) a plurality of primary connections defining primary relationships with other user accounts;

selecting a target user account from the plurality of user accounts;

identifying, from the plurality of primary connections of the target user account, a first user account having a primary relationship with the target user account;

identifying, based on primary connections of the first user account, a second user account that lacks a primary relationship with the target user account, such that the target user account and the second user account are secondary connections via the first user account;

invoking an artificial intelligence agent that comprises: (a) a transformer-based large language model (LLM), (b) a memory subsystem configured to store at least one of session state or outcomes of prior introductions, and (c) a tool-interface subsystem configured to access resources;

generating, using the LLM, (i) a target semantic representation derived from the goal text of the target user account and (ii) a candidate semantic representation derived from the profile text of the second user account;

determining a matching score based on a comparison of the target semantic representation and the candidate semantic representation;

retrieving, by the tool-interface subsystem, context from one or more data sources for augmenting an input to the LLM, wherein the retrieving is performed under an access-control policy that limits retrieved information about the second user account to information accessible to the first user account via the primary relationship, wherein the access-control policy uses relationship dependencies between the first user account and the second user account as determined from respective user profiles of the first user account and the second user account, wherein the relationship dependencies establish the primary relationship between the first user account and the second user account;

generating, by the LLM using the retrieved context, a networking recommendation that identifies a recommended introduction between the target user account and the second user account, the networking recommendation being generated responsive to the matching score satisfying a threshold; and transmitting, to a user device associated with the first user account, a notification comprising the networking recommendation.

2. The method of claim 1, wherein generating the target semantic representation and the candidate semantic representation comprises computing context-aware token representations using self-attention over an input sequence that includes at least a portion of the goal text and at least a portion of the profile text.

3. The method of claim 2, wherein the self-attention comprises multi-head attention in which a plurality of attention heads compute attention in parallel in different representation subspaces and an output of the plurality of attention heads is combined to form the context-aware token representations.

4. The method of claim 1, wherein retrieving the context comprises retrieval-augmented generation (RAG) operations including:

generating an embedding for at least one query derived from the goal text;

performing a semantic similarity search over a vector database storing indexed embeddings for documents or records of the one or more data sources; and augmenting the input to the LLM with content associated with one or more search results returned by the semantic similarity search.

5. The method of claim 1, wherein retrieving the context and transmitting the notification are performed through a standardized context protocol that supports tool discovery and tool invocation for a plurality of tools exposed by one or more servers.

6. The method of claim 5, wherein the standardized context protocol comprises a host that executes an LLM client, a server that exposes at least one tool or resource, and a message format that comprises JSON-based remote procedure calls.

7. The method of claim 1, wherein the artificial intelligence agent iteratively generates and evaluates candidate recommended introductions by:

generating, using the LLM, a plurality of candidate second user accounts from among secondary connections of the target user account;

scoring respective candidates using the matching score; and selecting the second user account based on at least one of the matching score, the access-control policy, or a network strategy associated with the target user account.

8. The method of claim 1, further comprising applying low-rank adaptation (LoRA) to the LLM by training low-rank matrices that approximate weight updates while keeping base model weights frozen.

9. The method of claim 8, wherein the LoRA comprises a first adapter configured for domain adaptation for networking recommendations and a second adapter configured for formatting or style customization of recommendation outputs.

10. The method of claim 1, wherein the networking recommendation comprises a recommendation for a user associated with the first user account to initiate the recommended introduction between a user associated with the target user account and a user associated with the second user account.

11. The method of claim 10, further comprising:

receiving, from the user device associated with the first user account, an introduction request corresponding to the recommended introduction;

transmitting the introduction request to a user device associated with the target user account and a user device associated with the second user account;

receiving affirmative responses from both the target user account and the second user account; and establishing, based on receipt of the affirmative responses, a new primary connection defining a primary relationship between the target user account and the second user account.

12. The method of claim 1, wherein each respective user account further comprises a plurality of spheres of influence, each sphere of influence including at least one primary connection, a connection-type classification, and a ranking that indicates a connection strength, and wherein identifying the second user account is further based on at least one of the connection-type classification or the ranking.

13. The method of claim 1, wherein the LLM comprises a transformer-based architecture having stacked attention layers and feed-forward layers and is configured to generate the networking recommendation as natural language output.

14. The method of claim 1, further comprising updating at least one parameter of a model used by the artificial intelligence agent based on feedback indicating an acceptance, rejection, or usefulness of at least one prior networking recommendation.

15. The method of claim 1, wherein the network goals comprise at least one of an objective type, an object identifying a person or organization to connect with, a location, or an intended outcome describing a purpose of the network goals.

16. The method of claim 1, wherein the user profile comprises contact information, an about section describing interests or personality characteristics, and professional information comprising at least one of industries, organizations, roles, or skills.

17. The method of claim 1, wherein the LLM processes the goal text and the profile text using positional information associated with tokens to represent an order of tokens within an input sequence.

18. A system for generating artificial intelligence-based networking recommendations, the system comprising:

one or more processors; and memory storing instructions that, when executed by the one or more processors, cause the system to:

obtain a plurality of user accounts of a networking platform from a data store, each user account comprising a user profile, network goals, and primary connections defining primary relationships;

identify, for a target user account, a first user account having a primary relationship with the target user account and a second user account that shares a primary relationship with the first user account and lacks a primary relationship with the target user account;

execute an artificial intelligence agent comprising a transformer-based LLM, a memory subsystem, and a tool-interface subsystem;

retrieve by the tool-interface subsystem, context from one or more data sources for augmenting an input to the LLM, wherein the retrieving is performed under an access-control policy that limits retrieved information about the second user account to information accessible to the first user account via the primary relationship, wherein the access-control policy uses relationship dependencies between the first user account and the second user account as determined from respective user profiles of the first user account and the second user account, wherein the relationship dependencies establish the primary relationship between the first user account and the second user account:

generate, using the LLM and at least one of retrieved context or stored outcomes in the memory subsystem, a networking recommendation to facilitate an introduction between the target user account and the second user account; and cause transmission, via the tool-interface subsystem, of a notification comprising the networking recommendation to a user device associated with the first user account.

19. A non-transitory computer-readable medium storing instructions that, when executed by one or more processors, cause the one or more processors to perform operations comprising:

instantiating an artificial intelligence agent comprising (i) a transformer-based LLM, (ii) a memory subsystem, and (iii) a tool-interface subsystem configured to access data sources through a standardized context protocol;

obtaining a plurality of user accounts of a networking platform, each user account comprising a user profile, network goals, and primary connections defining primary relationships;

identifying a secondary connection between a target user account and a second user account that share a common first user account as a primary connection while lacking a primary connection with each other;

generating, using the LLM, semantic representations for text of the network goals of the target user account and text of the user profile of the second user account;

computing a matching score based on the semantic representations;

retrieving, through the standardized context protocol, context from at least one knowledge source and augmenting an input to the LLM with the context; wherein the retrieving is performed under an access-control policy that limits retrieved information about the second user account to information accessible to the first user account via the primary relationship, wherein the access-control policy uses relationship dependencies between the first user account and the second user account as determined from respective user profiles of the first user account and the second user account, wherein the relationship dependencies establish the primary relationship between the first user account and the second user account; and generating, when the matching score exceeds a threshold, a networking recommendation for the first user account to facilitate an introduction between the target user account and the second user account, and transmitting a notification comprising the networking recommendation to a user device associated with the first user account.

* * * * *